United States Patent [19]

Kobayashi et al.

[11] Patent Number: 5,493,573
[45] Date of Patent: Feb. 20, 1996

[54] BROAD BAND SWITCHING NETWORK

[75] Inventors: Hiroshi Kobayashi, Tokyo; Kunihiko Sekiya; Yoshihiro Hidaka, both of Yokohama; Kazuo Aida, Tokyo; Michiaki Okano, Yokohama; Shigenobu Minami, Ayase; Takashi Ikeda, Kanagawa; Shoichiro Yamasaki, Tokyo; Hideaki Haruyama, Fujisawa; Kazuyoshi Ozawa, Yokohama, all of Japan

[73] Assignee: Kabushiki Kaisha Toshiba, Kanagawa, Japan

[21] Appl. No.: 703,519

[22] Filed: May 20, 1991

[30] Foreign Application Priority Data

May 22, 1990 [JP] Japan ..................... 2-132188

[51] Int. Cl.⁶ .................................. H04L 12/52
[52] U.S. Cl. .................. 370/60; 370/85.6; 370/94.1
[58] Field of Search ................. 370/60, 94.1, 94.3, 370/110.1, 85.6, 109, 108, 53, 58.1, 42, 82, 84, 49.5, 58.2, 58.3, 60.1, 61, 118, 7, 94.2; 340/825.02, 825.50, 825.51; 375/122, 240; 358/426; 348/384

[56] References Cited

U.S. PATENT DOCUMENTS

| | | | |
|---|---|---|---|
| 4,334,306 | 6/1982 | Ulug | 370/94.3 |
| 4,630,254 | 12/1986 | Tseng | 370/60 |
| 4,799,211 | 1/1989 | Felker et al. | 370/17 |
| 5,107,493 | 4/1992 | Eng et al. | 370/60 |
| 5,124,978 | 6/1992 | Chao | 370/60 |
| 5,130,984 | 7/1992 | Cisneros | 370/60 |
| 5,130,985 | 7/1992 | Kondo et al. | 370/60 |
| 5,138,615 | 8/1992 | Lampost et al. | 370/60 |

FOREIGN PATENT DOCUMENTS

| | | |
|---|---|---|
| 0229684 | 7/1987 | European Pat. Off. . |
| 58-218250 | 12/1983 | Japan . |
| 2-195751 | 8/1990 | Japan . |

OTHER PUBLICATIONS

European Search Report, Application No. 91 30 4653, dated Jun. 7, 1993.
K. Y. Eng et al., IEEE International Conference on Communications, vol. 2 (New York, Apr. 2, 1990), pp. 515–520.
N. F. Maxemchuk et al., Proceedings of the IEEE, vol. 78, No. 1 (New York, Jan. 1990), pp. 204–220.
I. Cidon et al., International Conference on Communications, vol. 2 (New York, Apr. 1990) pp. 259–263.

(List continued on next page.)

Primary Examiner—Melvin Marcelo
Assistant Examiner—Dang Ton
Attorney, Agent, or Firm—Finnegan, Henderson, Farabow, Garrett & Dunner

[57] ABSTRACT

Since a transmission route is set in accordance with the number of relaying broad band switching nodes present between two terminating nodes of a plurality of broad band switching nodes, a through-put characteristic, an affecting degree due to occurrence of a defect, the traffic of the entire network is distributed. In addition, when the system is started up, transmission routes with a minimum band width necessary for routing control have been set in all the broad band switching nodes. Whenever a call takes place, a transmission route is set and the band width is variably set by using an intelligent inference mechanism. Moreover, an intelligent distributed control for distributing such an intelligent inference mechanism in the broad band switching nodes is used. Thus, the load of processing a call can be decreased, while the reliability of the network and the improvement of the operating efficiency can be achieved. Furthermore, since the private branch system interface uses a frame which consists of a control window area for controlling its transmission and a cell multiplexing area for multiplexingly transmitting cells, bidirectional transmission between the broad band switching node and a plurality of terminal equipments can be achieved with a single extension transmission line. In addition, since a frame construction which satisfies the ATM method is used, different information transmission speeds can be flexibly selected.

37 Claims, 48 Drawing Sheets

OTHER PUBLICATIONS

P. K. Prasanna et al., IEEE Transactions on Consumer Electronics, vol. 35, No. 2 (New York, May 1989), pp. 86–91.

G. A. Nelson et al., Proceedings of the National Electronics Conference, vol. 43, No. 2/4 (Oak Brook, Illinois, Oct. 1989), pp. 452–455.

A. Grawal, Third International Network Planning Symposium, (New York, Jun. 1986), pp. 207–211.

Eng et al. "A Framework for a National Broadband (ATM/B–ISDN) Network", Int'l Conference on Communications, vol. 2, (Apr. 1990), pp. 515–520.

Maxemchuk et al. "Routing and Flow Control in High Speed Wide–Area Networks"; Proceedings of the IEEE, vol. 78, No. 1, (Jan. 1990), New York, pp. 204–220.

Desimone et al. "Performance of Alternative Man Architectures for High–Speed Data Applications", Int'l Conference on Communications, vol. 4, (Apr. 1990), New York, pp. 1584–1590.

Cidon et al. "Control Mechanisms for High Speed Networks"; Int'l. Conference on Communications, vol. 2, (Apr. 1990), New York, pp. 259–263.

Prasanna et al. "Discussion of Emerging ISDN Standards"; IEEE Transactions on Consumer Electronics, vol. 35, No. 2, (May 1989) NY, pp. 86–91.

Nelson et al. "Broadband—The First Steps"; Proceedings of the National Electronics Confer., vol. 43, No. 2/4 (Oct. 1989) Illinois, pp. 452–455.

A. Agrawal, "Optimizing the Design of a Cluster of Nodes in a Large Packet Networt"; 3rd Int'l Network Planning Symp. (Jun. 1986), pp. 207–211.

European Search Report, Application No. EP 91304653.8, dated May 4, 1994.

"Front End of ISDN", Denki Tsushin (Telecommunication), Nov. & Dec. 1989, vol. 52, No. 515, pp. 80–86 & vol. 52, No. 516, pp. 64–70.-

WHEEL SHAPE NETWORK

100a ～ 100h → "NODE"

FIG. 2

B-DSN (SINGLE CONSTRUCTION)

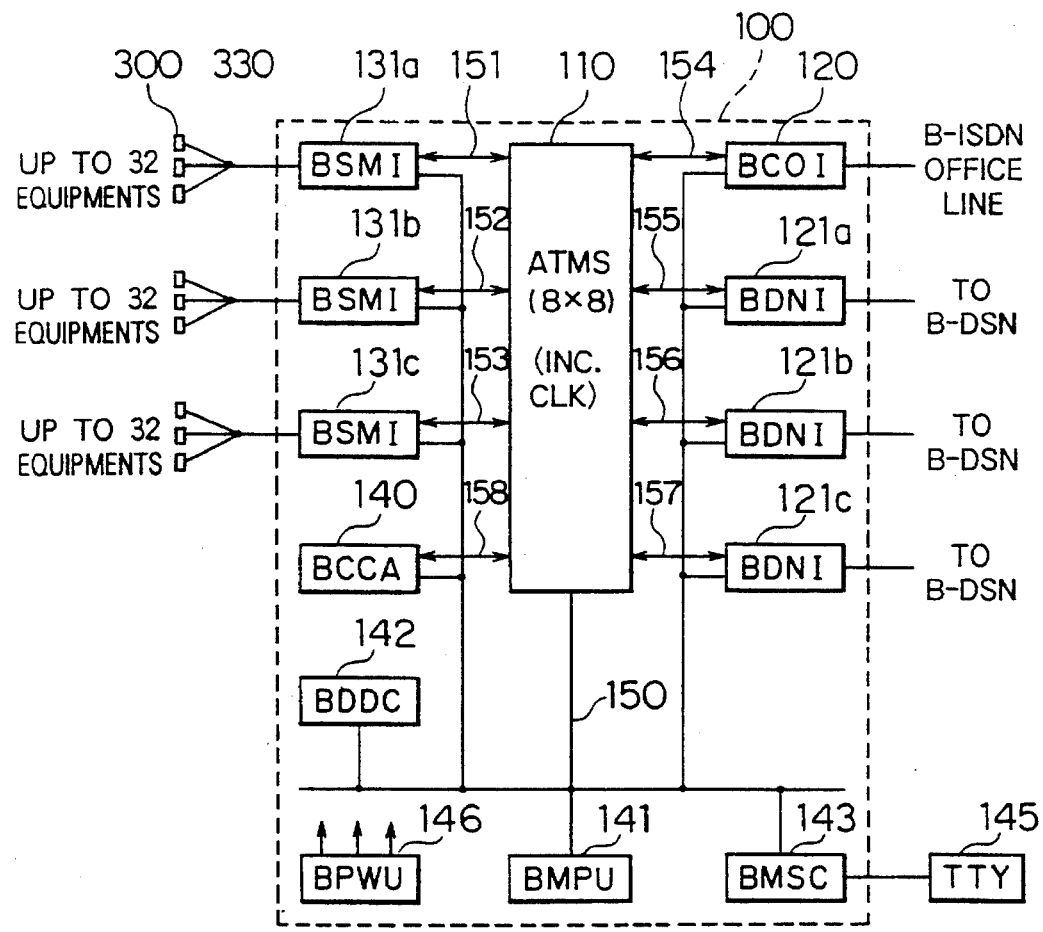

| ATMS | : | 8×8 ATM SWITCH (INC. NETWORK SYNC. CIRCUIT) UNIT |
| --- | --- | --- |
| BCCA | : | CONTROL CELL TRANSMISSION ADAPTATION UNIT |
| BCOI | : | B-ISDN INTERFACE UNIT |
| BDDC | : | AUXILIARY STORAGE |
| BDNI | : | INTER-BDSN CONNECTION INTERFACE UNIT |
| BMPU | : | MAIN CONTROL UNIT |
| BMSC | : | I/O CONTROL UNIT |
| BPWU | : | POWER SUPPLY UNIT |
| BSMI | : | ATM EXTENSION LINE INTERFACE (INC. TDMA CONTROL UNIT) UNIT |
| TTY | : | MAINTENANCE CONSOLE |

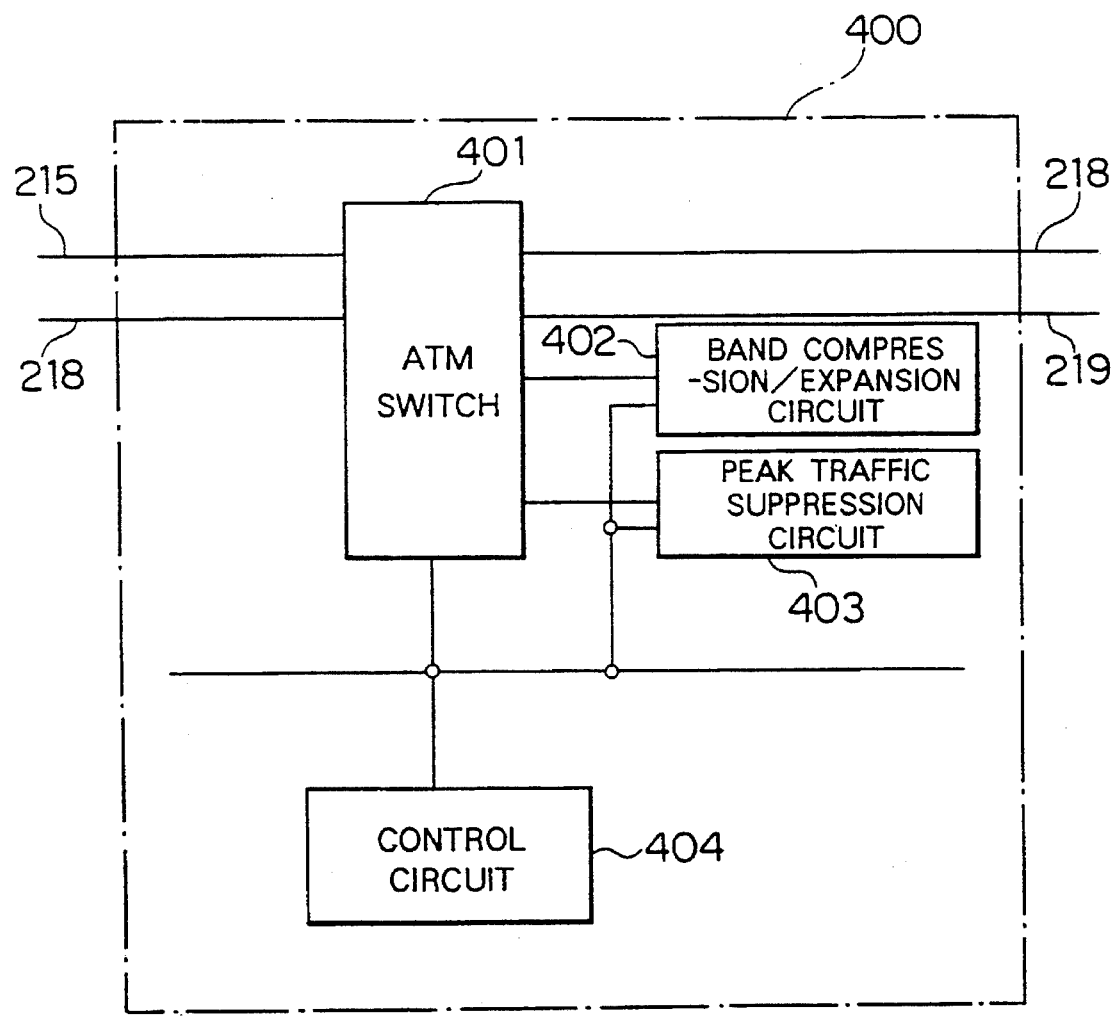

ATM CELL COMPOSITION (USER NETWORK INTERFACE)

THE RELAY NODE EXECUTES A TABLE SEARCH BY USING A VIRTUAL PATH IDENTIFIER (VPI) IN A HEADER, GENERATES ROUTING INFORMATION, AND OUTPUTS A CELL TO A PARTICULAR PORT.
  THE TERMINATING NODE EXECUTES A TABLE SEARCH BY USING A VIRTUAL CHANNEL IDENTIFIER (VCI) IN A HEADER, GENERATES ROUTING INFORMATION, AND OUTPUTS A CELL TO A PARTICULAR TERMINAL.

100a ~ 100h → "NODE"

GRID SHAPED NETWORK

101a ~ 101h → "NODE"

106a ~ 106d → "NODE"

107a ~ 107e → "NODE"

EXAMPLE WHERE LINE CONCENTRATION FUNCTION IS ACCOMMODATED IN EXTENSION LINE INTERFACE

EXAMPLE WHERE LINE CONCENTRATION FUNCTION IS AN EXTERNAL UNIT

100a ~ 100h → "NODE"

100a ~ 100h → "NODE"

100a ~ 100i → "NODE"

FIG. 34
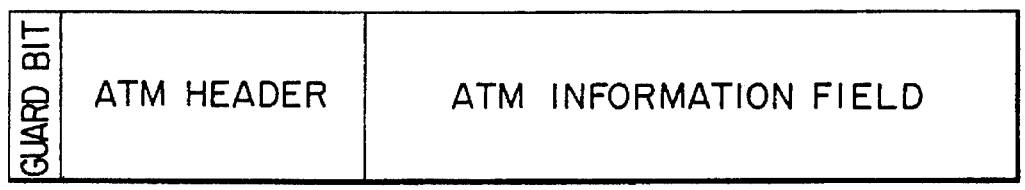
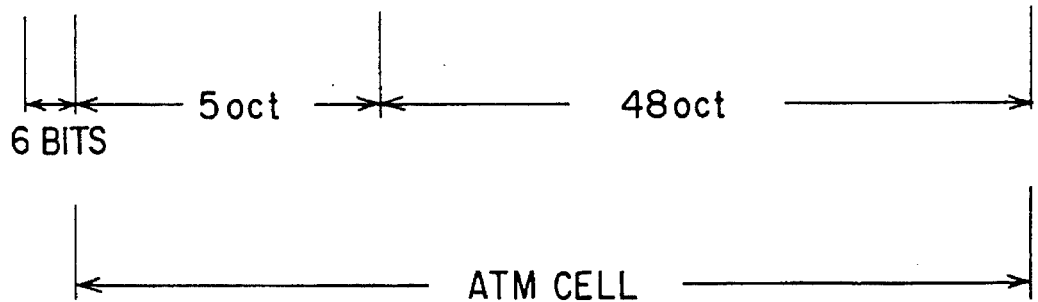

FIG. 35

ASG

| SYN | TEI | DTC | LVC | TSI | RTEI | RES | CRC |
|---|---|---|---|---|---|---|---|
| 8 BITS | 8 BITS | 16 BITS | 16 BITS | 48 BITS | 8 BITS | 400 BITS | 16 BITS |

FIG. 36

RSP

| SYN | TEI | DTC | LVC | TSR | LVD | RES | CRC |
|---|---|---|---|---|---|---|---|
| 8 BITS | 8 BITS | 16 BITS | 16 BITS | 16 BITS | 16 BITS | 32 BITS | 16 BITS |

FIG. 40(a)

| RE-QUEST FLAG / MEDIA TYPE | PEAK TRAFFIC AMOUNT | AVERAGE TRAFFIC AMOUNT | PRECEDENCE CONTROL INFORMATION |
|---|---|---|---|
| | | | |

FIG. 40(b)

| NUMBER OF TIME SLOTS USED IN (N − 3)TH FRAME | NUMBER OF TIME SLOTS USED IN (N − 2)TH FRAME | NUMBER OF TIME SLOTS USED IN (N − 1)TH FRAME | NUMBER OF TIME SLOTS USED IN (N)TH FRAME |
|---|---|---|---|
| | | | |

FIG. 40(c)

| RE-QUEST FLAG / MEDIA TYPE | PEAK TRAFFIC AMOUNT | AVERAGE TRAFFIC AMOUNT | PRECEDENCE CONTROL INFORMATION | BUFFER STORAGE AMOUNT |
|---|---|---|---|---|
| | | | | |

LONG TERM DEMAND ESTIMATION OF
BROAD BAND ISDN IN WEST GERMANY
(IEEE Commu. Magazine, 1987, Vol.24, No.11)

BROAD BAND SWITCHING NETWORK

BACKGROUND OF THE INVENTION

1. Field of the Invention

The present invention relates to a broad band switching network focusing on an in-company use based on so-called broad band ISDN using ATM (Asynchronous Transfer Method) technology.

2. Description of the Related Art

Efforts for integrating individual service networks such as telephone networks, data networks, FAX networks, and so forth which have been developed and constructed over 100 years of history into one network system with ISDN (Integrated Services Digital Network) have been made throughout the world.

As the first step for constructing the ISDN system, narrow band ISDN systems have been operated in advanced countries including Japan since 1988. In addition, besides integration with a broadcasting network by using a broad band ISDN based on the ATM technology, the engineering developments of the ISDN network have been initiated by CCITT (International Telegraph and Telephone Consultative Committee) and promoted in major laboratories in the world.

Nevertheless, most of developments of the broad band ISDN and ATM engineering have been focused on the construction of public networks such as developments of office broad band ISDN switching equipments and so-called MAN (Metropolitan Area Network) including DQDB (Distributed Queued Dual BUS) which has been studied by IEEE 802 Standardization Committee and Owell Ring which has been developed by BTR Company, England. In other words, thus far, the developments of the ISDN network focusing on in-company use are small.

FIG. 46 is a schematic showing a long term demand estimation of the broad band ISDN in West Germany. The figure represents the relationship between the cost ratio of broad band ISDN against narrow band ISDN (horizontal axis) and the number of subscribers (vertical axis), respectively.

According to the figure, when the cost ratio becomes 3 or less, the ISDN will be rapidly spread out in general homes. When the cost ratio is higher than 3, the use of the ISDN will be limited to companies. In the broad band ISDN, ultra high speed subscriber network interface of 155.52 Mbps or 622.08 Mbps is supplied to general users by using latest technologies such as optical fiber cables as well as the ATM technology. However, at present time, the cost reduction of key components for achieving the broad band ISDN, such as optical communication parts and ultra high speed logical circuits (LSI) including ECL has not been satisfactorily accomplished in comparison with that of semiconductor memory devices. To satisfactorily accomplish the cost reduction, it would take more 10 years. It is estimated that the cost of CPU, memory, and CMOS logic circuits will be reduced into $1/16$ in the forthcoming five years. In contrast, the cost of the key components of the broad band ISDN such as optical communication parts, ultra high speed logic circuits, and analog circuits will be reduced into $1/4$ at most. In addition, such cost reduction of the key components of the ISDN is calculated by considering remarkable demand thereof as a precondition. Thus, unless the demand is strong, neither the cost reduction nor technology development would be accomplished.

Thus, it is necessary to accomplish the broad band ISDN service satisfying the needs in companies by means of the current technologies at a reasonable cost. In addition, if the satisfactory demand of company use is estimated by the accomplishment of the ISDN service, the engineering development and cost reduction of the above mentioned key components will be promoted and thereby the broad band ISDN service will be also acceleratingly spread out to general home users. In other words, to utilize and spread out a broad band ISDN, it is necessary to practically accomplish a private brunch switching system based on the broad band ISDN for the company use at a reasonable cost.

According to the related art, the private branch switching systems based on the broad band ISDN are roughly categorized as a centralized switching method, a distributed switching method with hierarchical network, and a LAN method.

In the case of the centralized switching method, with one private branch exchange (PBX), calls are centralized and switched. Thus, depending on the capacity of calls, various types of exchanges should be provided. Consequently, the accomplishment of the compatibility of software among the models (equality of services) becomes difficult (particularly, as the capacity of switch increases, functions being added by the users tend to become large). To maintain the compatibility, too much labor and cost would be required. In particular, the ATM switch which switches calls at an ultra high speed of 155.52 Mbps or 622.08 Mbps might be accomplished with a CMOS technology. However, the power consumption of the switch would become large (for example, even a small ATM switch of 8×8 would consume a power of 10 W; a large ATM switch of 1000×1000 would consume a power of 10 KW). In addition, countermeasures against heat radiation such as a heat pipe and high density heat exchanger would be required and thereby the cost would be increased. Moreover, when the large capacity model were redundantly constructed, the size of the equipment would become large like that of a super computer. It would prevent general company users from employing the equipment.

On the other hand, in the distributed switching method with a hierarchical network shown in FIG. 47, as exemplified with a so-called fourth generation PBX ("Front End of ISDN", "DENKI TSUSHIN (Telecommunication)", November 1989 and December 1989), a plurality of DSN's (Distributed Switching Nodes) 2 are connected to a higher rank network 1 composed of an optical loop network, each DSN being controlled so that the entire system operates as one exchange. Thus, since the number of DSN's can be increased and decreased when necessary, only one model of the equipment can cover a wide capacity range.

Nevertheless, to accomplish the distributed switching method with the hierarchical network, besides the development of distributed switching nodes, a high rank network should be developed and thereby the number of development steps would be remarkably increased. In addition, in the high rank network, the cost of stations 3 forming an ultra high speed optical loop network of 1.6 Gbps or 6 Gbps would become expensive. Thus, the capacity of the distributed switching nodes 2 should be large so that the cost of the stations 3 could be covered (that is, the cost of the stations could be ignored). Thus, beside a redundant construction of the distributed switching nodes 2, various countermeasures of reliability such as duplicate homing arrangement of the connections of the stations 3 should be taken. In such an arrangement, each DSN is connected to two stations, one of which is active. When a defect takes place in the active station, it becomes inactive and the inactive station becomes active. Thus, the entire system would become much expensive.

In the LAN method, for example, as shown in FIGS. 48 and 49, since an optical bus 4 of 155.52 Mbps is shared with a plurality of access units 5 and terminal equipments 6, the number of access units 5 and terminal equipments 6 connectable to the optical bus 4 is inevitably limited. In a large scale system, besides the same problem as the above distributed switching method, another problem of occurrence of a serious defect would take place if a plurality of access units 5 have defects. In addition, since the access units 5 forming the system are distributedly disposed at a user site, the maintenance work including power supply control becomes complicated. In particular, since optical connectors connecting optical fibers have been precisely produced, they might be often exposed to dust due to the user's operations and thereby a communication failure would frequently take place.

As was described above, when the broad band switching system focusing on the company use in the conventional method were constructed, the number of production steps would be increased and thereby the cost would be raised and a critical problem with respect to reliability and maintenance would arise. Thus far, practical countermeasure against the above mentioned problems have not been provided.

SUMMARY OF THE INVENTION

According to the present invention, in the company use, due to the fact that long time high traffic calls such as high definition TV hardly take place, the conceptions of the statistic multiplexing effect and virtual channels which are features of the ATM technology are used.

Objects of the present invention are:

(1) to provide a broad band switching network where a plurality of broad band switching nodes are operated as one switch, with satisfactory through-put and reliability satisfying the company use at a reasonable cost, (2) to provide an intelligent distributed routing control method for intelligently controlling a virtual path routed in a plurality of broad band switching nodes, and (3) to provide both an extension line system of broad band switching nodes with satisfactory through-put characteristic and reliability satisfying the company use and a multiple drop connection method at a reasonable cost.

The invention in accordance with claim 1 is a broad band switching network comprising a plurality of broad band input/output ports for multiplexingly transmitting a cell, which consists of information field and a header of a fixed length, a plurality of broad band switching nodes having a switching function for demultiplexing the cell from the plurality of broad band input/output ports by identifying a label value in the header, and a plurality of broad band inter-node transmission lines for transmitting the cell among the plurality of broad band switching nodes through the broad band input/output port, whereby the plurality of broad band inter-node transmission lines are provided in accordance with particular conditions, the transmission routes being set in accordance with the particular conditions.

The invention in accordance with claim 2 is the broad band switching network as set forth in claim 1, whereby the particular conditions are determined in accordance with an equally distributed degree of the traffic on the plurality of broad band inter-node transmission lines, the number of relaying broad band switching nodes of the plurality of broad band switching nodes present between two terminating broad band switching nodes, a through-put characteristic, and an affecting degree due to occurrence of a defect.

The invention in accordance with claim 3 is the broad band switching network as set forth in claim 1, whereby the plurality of broad band inter-node transmission lines are made of a non-hierarchical network where the plurality of broad band nodes disposed in a peripheral portion and a center portion are connected in a wheel shape.

The invention in accordance with claim 4 is the broad band switching network as set forth in claim 1, whereby the plurality of broad band inter-node transmission lines are mode of a non-hierarchical network where the plurality of broad band switching nodes disposed in a peripheral portion and a center portion are connected in a diamond cut shape.

The invention in accordance with claim 5 is the broad band switching network as set forth in claim 1, whereby the band width of the broad band inter-node transmission lines is varied in accordance with a traffic condition of the network.

The invention in accordance with claim 6 is the broad band switching network as set forth in claim 1, whereby part of the plurality of broad band input/output ports are connected to an extension line interface for connecting a plurality of terminal equipments, an office line interface for connecting broad band office lines, and a dedicated line interface for connecting broad band dedicated lines.

The invention in accordance with claim 7 is the broad band switching network as set forth in claim 6, whereby the extension line interface accommodates a plurality of terminal equipments with multiple drop connections through optical passive coupler.

The invention in accordance with claim 8 is the broad band switching network as set forth in claim 6, whereby the extension line interface accommodates a plurality of terminal equipments with multiple drop connections using an active line concentration function.

The invention in accordance with claim 9 is the broad band switching network as set forth in claim 6, whereby the broad band dedicated lines or the broad band office lines and the broad band switching nodes are connected through both means for compressing and extending the band width of information of the broad band dedicated lines and means for suppressing the peak traffic on the broad band dedicated lines.

The invention in accordance with claim 10 is the broad band switching network as set forth in claim 6, whereby the switching function comprises means for outputting a cell relayed by the broad band switching nodes to a desired broad band input/output port in accordance with a virtual path identifier in a label of the cell and means for outputting a cell which is output to one of the extension line interface, the office line interface, and the dedicated line interface to a desired broad band input/output port in accordance with a logical channel identifier in the label of the cell at a broad band switching node.

The invention in accordance with claim 11 is the broad band switching network as set forth in claim 1, whereby the switching function is composed of a combination of both a cell switch which is operated in a broad band asynchronous transmission mode and a broad band line switch.

The invention in accordance with claim 12 is the broad band switching network as set forth in claim 1, whereby the two terminating broad band switching nodes of a transmission node share an incoming call process and an originating call process.

The invention in accordance with claim 13 is the broad band switching network as set forth in claim 1, whereby routing paths for setting transmission routes are always provided among the plurality of broad band nodes.

The invention in accordance with claim 14 is the broad band switching network as set forth in claim 1, whereby the broad band inter-node transmission lines are categorized as a single group or a plurality of groups, the broad band switching nodes in each group being connected in a single stroke shape with a multiple wire-core cable housing optical fibers, particular optical fibers of the multiple wire-core cables being led in the broad band nodes, the optical fibers being connected to the input/output ports of the broad band nodes.

The invention in accordance with claim 15 is a broad band switching network comprising a plurality of broad band input/output ports for multiplexingly transmitting a cell, which consists of information field and a header of a fixed length, a plurality of broad band switching nodes having a switching function for demultiplexing the cell from the plurality of broad band input/output ports by identifying a label value in the header, and a plurality of broad band inter-node transmission lines for transmitting the cell among the plurality of broad band switching nodes through the broad band input/output port, whereby a routing control is executed in the manner that transmission routes with a particular band width have been set among the broad band switching nodes when the system is started up, an optimum transmission route being set with the transmission routes being set upon the start-up of the system in accordance with particular conditions when a call takes place, the band width of the transmission route being variably set.

The invention in accordance with claim 16 is the broad band switching network as set forth in claim 15, whereby the routing control is executed in the manner that transmission routes are temporarily set when a call takes place, the determination of whether or not all broad band switching nodes which relay the temporarily set transmission routes meet particular conditions and accept the transmission routes being made, a final transmission route being set after the determination result is valid.

The invention in accordance with claim 17 is the broad band switching network as set forth in claim 15, whereby the setting of the transmission routes upon occurrence of a call and variable band width setting of the transmission routes are executed with an intelligent inference mechanism.

The invention in accordance with claim 18 is the broad band switching network as set forth in claim 17, whereby the intelligent inference mechanism comprises a data base which registers data for setting transmission routes upon occurrence of a call and for variably setting the band width of the transmission routes (hereinafter named "transmission route setting"), first means for processing the transmission route setting in accordance with the data registered in the data base by using a procedure base, second means for inferring the transmission route setting in accordance with data registered in the data base by using a knowledge base, third means for inferring the transmission route setting in accordance with the data registered in the data base by using a case base, fourth means for inferring the transmission route setting by using a search base, and fifth means for learning about the transmission route setting in accordance with the inference results and process results of the second to fourth means and for accordingly updating the data of the data base.

The invention in accordance with claim 19 is the broad band switching network as set forth in claim 18, whereby the data base registers a single or a plurality of transmission routes between particular broad band switching nodes which terminate a call, the first means selecting one of the transmission routes in accordance with a particular procedure.

The invention in accordance with claim 20 is the broad band switching network as set forth in claim 18, whereby the data base registers at least one of a knowledge with respect to periodical change of the traffic, a knowledge with respect to a detection or an estimation of a defect and countermeasures against occurrence of the defect, and a knowledge with respect to traffic equalization of the entire network, deletion of the number of relaying nodes, and through-put characteristic and whereby the second means infers the transmission route setting with the knowledges registered in the data base.

The invention in accordance with claim 21 is the broad band switching network as set forth in claim 18, whereby the data base registers past unsuccessful cases of the transmission route setting selected or inferred by the first means, the second means, or the forth means and whereby the third means infers the transmission route setting registered in the data base.

The invention in accordance with claim 22 is the broad band switching network as set forth in claim 18, whereby the fourth means temporarily sets and searches a plurality of transmission routes upon occurrence of one call and then finally sets a transmission route in accordance with a particular precedence.

The invention in accordance with claim 23 is the broad band switching network as set forth in claim 18, whereby the data base is updated in accordance with information with respect to traffic and defect informed from the plurality of broad band switching nodes when necessary.

The invention in accordance with claim 24 is a broad band switching network comprising a plurality of broad band input/output ports for multiplexingly transmitting a cell, which consists of information field and a header of a fixed length, a plurality of broad band switching nodes having a switching function for demultiplexing the cell from the plurality of broad band input/output ports by identifying a label value in the header, and a plurality of broad band inter-node transmission lines for transmitting the cell among the plurality of broad band switching nodes through the broad band input/output port, whereby one extension transmission line of the broad band switching node is connected to a plurality of terminal equipments with multiple drop connections, information being transmitted bidirectionally between the broad band switching node and the terminal equipments with a frame having a cell multiplexing area which is divided into a plurality of time slots for multiplexingly transmitting the cell and a control window area to which a control signal for controlling the transmission is sent.

The invention in accordance with claim 25 is the broad band switching network as set forth in claim 24, whereby the frame is composed of sub frames equivalent to the maximum number of terminal equipments connected to one extension transmission line.

The invention in accordance with claim 26 is the broad band switching network as set forth in claim 25, whereby the control window area and the cell multiplexing area are provided for each sub frame.

The invention in accordance with claim 27 is the broad band switching network as set forth in claim 24, whereby a delay control area for compensating a transmission delay time necessary for transmission between the terminal equipments and the broad band switching node is provided in the control window area.

The invention in accordance with claim 28 is the broad band switching network as set forth in claim 27, whereby the transmission delay control measures a transmission delay time of the transmission line by using both a transmission timing of a particular control signal which is transmitted by designating a receiving terminal equipment of the broad band switching node and a reception timing of a reply signal which is sent back from the receiving terminal equipment, accordingly obtains a cell transmission timing where a cell transmitted from the terminal equipment is received by the broad band switching node, and informs the result to the terminal equipment.

The invention in accordance with claim 29 is the broad band switching network as set forth in claim 27, whereby the broad band switching node measures in the control window the receiving signal level of a particular signal which is transmitted from the terminal equipment, obtains the transmitting signal level of the terminal equipment so that the receiving signal level is in a particular range, and informs the terminal equipment of the result.

The invention in accordance with claim 30 is the broad band switching network as set forth in claim 24, whereby a time slot control signal for informing the terminal equipment of an allocation of time slots available for information transmission is transmitted to the control window area.

The invention in accordance with claim 31 is the broad band switching network as set forth in claim 30, whereby the allocation of time slots available for the terminal equipment to transmit information is executed in the control window area in accordance with particular information contained in a time slot allocation request signal transmitted from the terminal equipment.

The invention in accordance with claim 32 is the broad band switching network as set forth in claim 30, whereby the allocation of time slots available for the terminal equipment to transmit information is executed by considering the past cases of the number of time slots which have been used by the terminal equipment.

The invention in accordance with claim 33 is the broad band switching network as set forth in claim 31, whereby the allocation of time slots available for the terminal equipment to transmit information is executed in accordance with information amount stored in the terminal equipment or the number of time slots required by the terminal equipment.

The invention in accordance with claim 34 is the broad band switching network as set forth in claim 24, whereby the terminal equipment transmits a time slot allocation request signal available for transmitting information in the control window area.

The invention in accordance with claim 35 is the broad band switching network as set forth in claim 24, whereby the allocation of time slots available for the terminal equipment to transmit information is executed for each time slot in the frame.

The invention in accordance with claim 36 is the broad band switching network as set forth in claim 24, whereby the allocation of time slots available for the terminal equipment to transmit information is executed in the same position of each sub frame.

The invention in accordance with claim 37 is the broad band switching network as set forth in claim 24, whereby the transmission control signal which is transmitted from the broad band switching node is successively transmitted frame by frame only to terminal equipments which are recognized as they are connected to the extension transmission lines.

The invention in accordance with claim 38 is the broad band switching network as set forth in claim 37, whereby the broad band switching node transmits a control signal to all terminal equipments which are recognized as they are connected to the extension transmission lines, transmits a global address control signal which does not allocate a receiving terminal equipment, and recognizes terminal equipments by using a response signal which is sent back from unrecognized terminal equipments which receive the second control signal to the broad band switching node.

The invention in accordance with claim 39 is the broad band switching network as set forth in claim 38, whereby the terminal equipments determine that they are not recognized when they transmits the response signal and do not receive the control signal until they receive the subsequent global address control signal addressed thereto.

The invention in accordance with claim 40 is the broad band switching network as set forth in claim 39, whereby the terminal equipments wait until a reply of the response signal against the global address control signal for the number of times obtained at random when they have made such a determination.

According to the present invention, since a transmission route is set in accordance with the number of relaying broad band switching nodes present between two terminating nodes of a plurality of broad band switching nodes, a through-put characteristic, an affecting degree due to occurrence of a defect, the traffic of the entire network is distributed.

In addition, according to the present invention, when the system is started up, transmission routes with a minimum band width necessary for routing control have been set in all the broad band switching nodes. Whenever a call takes place, a transmission route is set and the band width is variably set by using an intelligent inference mechanism. Moreover, an intelligent distributed control for distributing such an intelligent inference mechanism in the broad band switching nodes is used. Thus, the load of processing a call can be decreased, while the reliability of the network and the improvement of the operating efficiency can be achieved.

Furthermore, since the private branch system interface uses a frame which consists of a control window area for controlling its transmission and a cell multiplexing area for multiplexingly transmitting cells, bidirectional transmission between the broad band switching node and a plurality of terminal equipments can be achieved with a single extension transmission line.

In addition, according to the present invention, since a frame construction which satisfies the ATM method is used, different information transmission speeds can be flexibly selected. Thus, high through-put characteristic and statistic multiplexing effect intrinsic to the ATM method can be accomplished even in the extension line interface.

BRIEF DESCRIPTION OF THE DRAWINGS

FIG. 2 is a schematic showing a construction of a broad band node 100;

FIG. 3 is a schematic showing a construction of a broad band multiplexing unit 400;

FIG. 34 is a schematic showing a construction of DTS and UTS;

FIG. 35 is a schematic showing a format of an ASG signal;

FIG. 36 is a schematic showing a format of an RSP signal;

FIG. 40 (a) is a schematic showing a format of TSR;

FIG. 40 (b) is a schematic showing a table which records past use referenced for allocating a time slot;

FIG. 40 (c) is a schematic showing a format of another TSR;

FIG. 43 (b) is a timing chart showing that a transmission timing of the RSP signal is changed;

FIG. 43 (c) is a timing chart showing a process where the RSP signals from a plurality of AU's collide;

DESCRIPTION OF THE PREFERRED EMBODIMENT(S)

Now, with reference to the accompanying drawings, embodiments of the present invention will be described.

Figure 1:
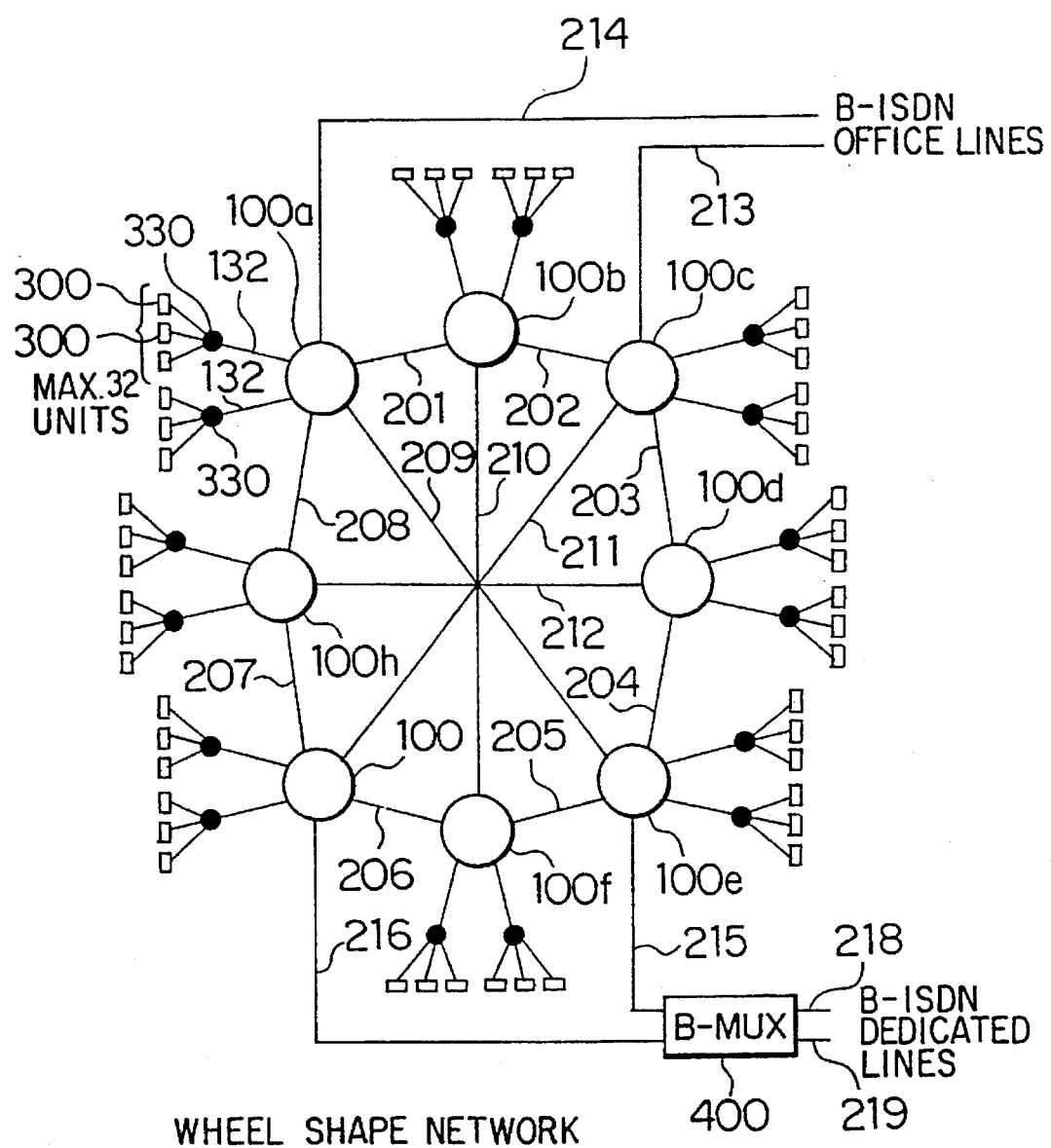
FIG. 1 is a schematic showing a construction of a broad band switching network of an embodiment according to the present invention.

FIG. 1 is a schematic showing a construction of a broad band switching network of an embodiment according to the present invention.

In the broad band switching network, eight broad band switching nodes 100a to 100h are connected in a ring shape through broad band inter-node transmission lines 201 to 208 using optical fiber cables of 155.52 Mbps. In addition, the broad band switching nodes 100a to 100h which are point-symmetrically disposed are connected through broad band inter-node transmission lines 209 to 212. The network shown in FIG. 1 is referred to as a wheel shape network due to its geometric feature.

A plurality of broad band ISDN terminal equipments 300 are connected to the broad band node 100 through an extension line port 132, an photo coupler 330, a multiplexing extension line interface (not shown in the figure), and an access unit (not shown in the figure). In addition, when necessary, the broad band switching node 100 is connected to a broad band ISDN public network through broad band ISDN office line ports 213 and 214. Furthermore, broad band dedicated line ports 215 and 216 are connected to broad band ISDN dedicated lines 218 and 219 through a broad band multiplexing unit 400. In addition, the broad band multiplexing unit 400 can be disposed at the broad band ISDN office ports 213 and 214 when necessary.

FIG. 2 is a schematic showing a construction of the broad band switching node 100.

Extension line interface units 131a, 131b, and 131c for connecting the photo coupler 330, a broad band ISDN office line interface unit 120, broad band inter-node connection interface units 121a, 121b, and 121c are connected to an ATM (cell) switch unit 110 having eight input/output ports through ports 151 to 157. In addition, a control cell transmission adaptation unit 140 for transmitting and receiving control data such as routing control data, call setting control data, maintenance operation data, and defect data between a terminal equipment (including the broad band ISDN office line and the broad band ISDN dedicated line) and the broad band switching node or between the broad band switching nodes is connected to the ATM switch 110 through a port 158.

A main control unit 141, an auxiliary storage unit 142 such as a hard disk, and an I/O control unit 143 which is connected to a maintenance console 145 (which is not always connected to all the broad band switching nodes) are connected to the ATM switch 110 and various interfaces through a control bus 150.

A power supply unit 146 is provided so as to supply powers to the various units of the broad band switching node 100.

FIG. 3 is a schematic showing a construction of a broad band multiplexing unit 400.

As shown in the figure, the broad band multiplexing unit 400 comprises an ATM switch 401 for increasing the operating efficiency of the broad band dedicated lines 218 and 219 or the broad band office lines 213 and 214 and for relaying a cell between offices; a sound/picture information band compression/expansion circuit 402; a peak traffic suppression circuit 403 for suppressing the peak traffic; a control circuit 404, and so forth.

It is also possible to accommodate the broad band multiplexing unit 400 in the broad band switching node as well as providing it as an independent unit. In other words, the broad band multiplexing unit 400 can be unified with the constructing elements of the broad band switching node.

Figure 4:
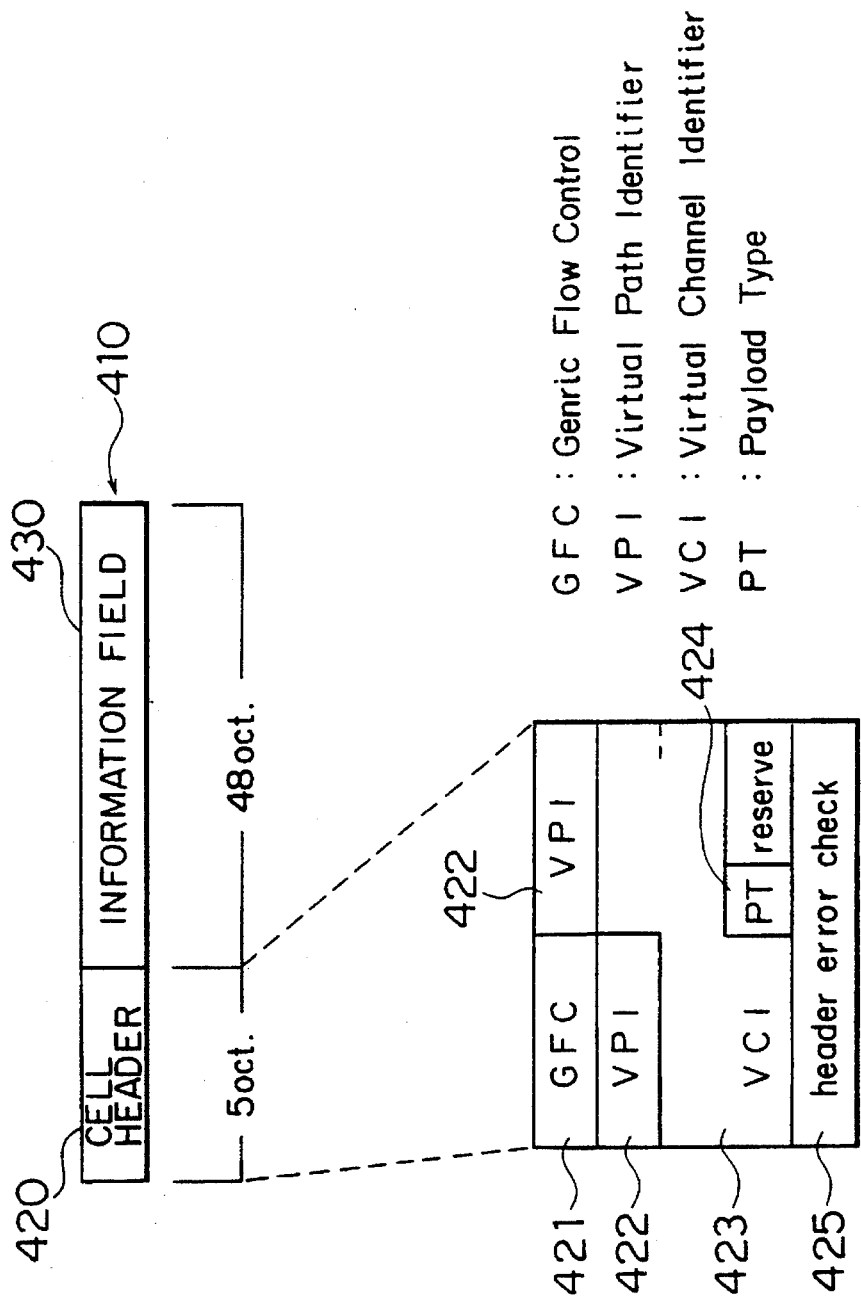
FIG. 4 is a schematic showing a construction of an ATM cell which is a unit of information transmission in a broad band ISDN.

FIG. 4 is a schematic showing a construction of an ATM cell which is a unit of information transmission in the broad band ISDN.

The ATM cell 410 consists of a cell header 420 of five octets and a information field 430 of 84 octets.

The cell header 420 is composed of a GFC (Generic Flow Control) area 421 for controlling data flow between a terminal equipment and a terminating node; a virtual path identifier VPI area 422 for determining a path between broad band switching nodes; a virtual channel identifier VCI area 423 for determining a path from the terminating node to a terminal equipment; a PT (Payload Type) area 424 for representing the type of information of information field; an error check area 425 for checking an error of the header, and so forth.

Now, an operation of the broad band switching network in the above mentioned construction will be described.

A call which is originated from the broad band ISDN terminal equipment 300 is switched by the broad band switching node 100 which accommodates it.

When the terminating address of the call is a terminal equipment accommodated in the same broad band switching node 100, a closed switching process is executed in the same broad band switching node.

In contrast, when the terminating address of the call is a terminal equipment 300 which is accommodated in another broad band switching node 100, a virtual path VP or virtual channel VC is set between the broad band switching nodes through the broad band inter-node transmission lines 201 to 212. Through the virtual path VP or the virtual channel VC, control information is mutually transmitted and received between the broad band switching nodes so as to cooperatively execute the switching process. It is possible to dispose another broad band switching node 100 through the broad band inter-node transmission lines between the originating call broad band switching node 100 and the incoming call broad band switching node 100. In this case, the broad band switching node 100 relays the call.

Figure 5:
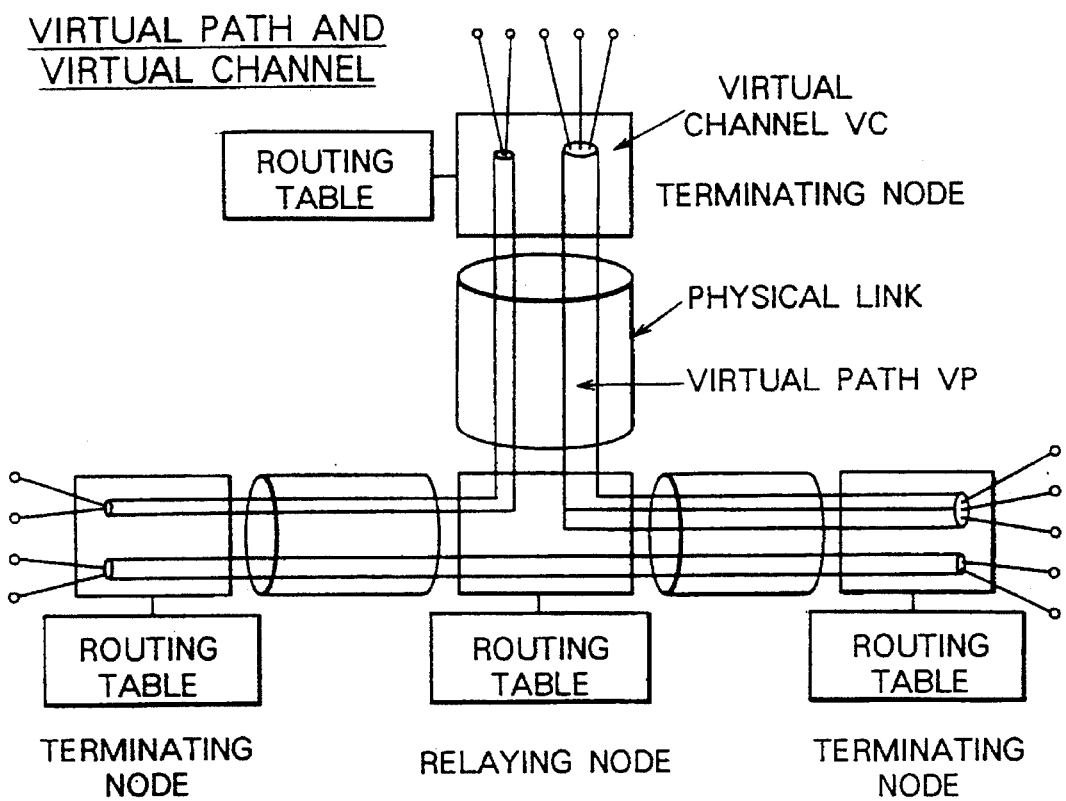
FIG. 5 is a schematic showing a routing of a virtual path VP.

The originating call broad band switching node and incoming call broad band switching nodes are referred to as terminating nodes. Between the terminating node and the relay node, it is possible to dispose the virtual path VP as shown in FIG. 5.

Figure 6:
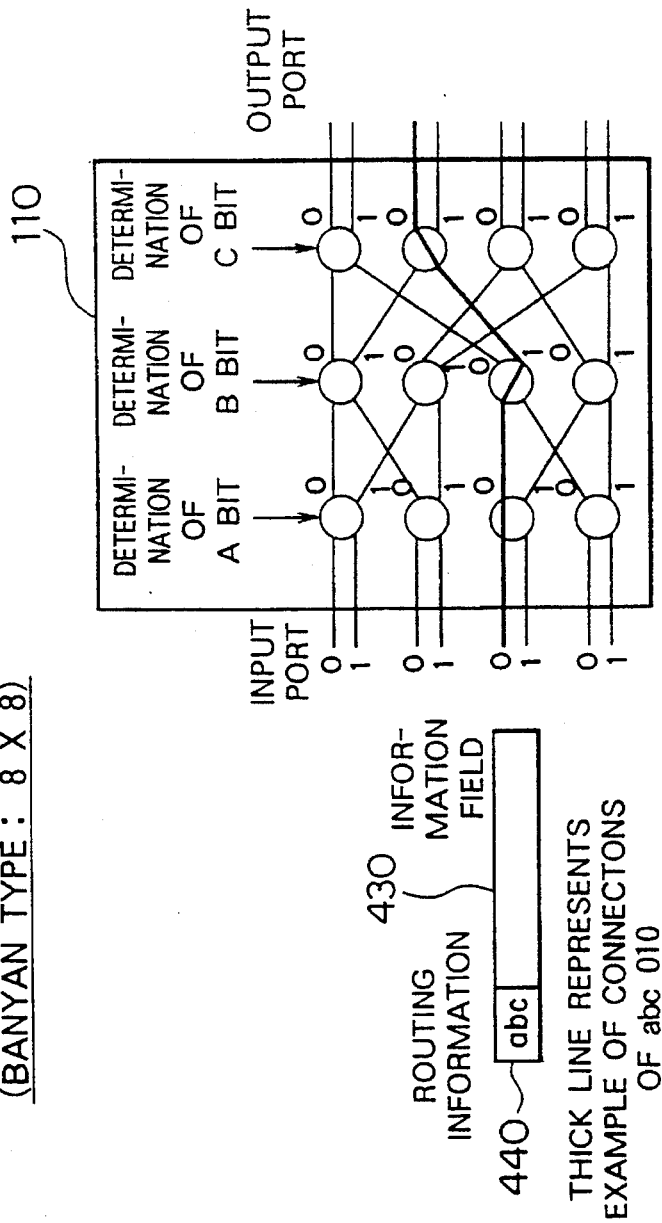
FIG. 6 is a schematic describing an operation of an ATM switch in a broad band node.

On the virtual path VP, a switching process in each broad band node 100 is identified with the virtual path identifier VPI written to the cell header 420 of the ATM cell 410. In other words, as shown in FIG. 6, in each broad band switching node 100, before the call enters the ATM switch 110, routing information (label value) is generated with the virtual path identifier VPI of the cell header 420 (for example, the table search is executed). Thereafter, the routing information is added to the ATM cell 410 as the routing header 440. After the call is switched, the routing header 440 is removed and then the ATM cell 410 is output to a particular port.

For example, in a relay node, a label value is generated with the virtual path identifier VPI. Thereafter, the ATM cell 410 is output to the output port connected to a particular broad band inter-node transmission line through the ATM switch. On the other hand, at the terminating node, a label value is generated with the virtual channel identifier VCI. Thereafter, the ATM cell 410 is output to a particular extension line port through the ATM switch 110. With respect to a call connected to a broad band ISDN office line or to a broad band ISDN dedicated line, nearly the same switching process is executed.

Figure 7:
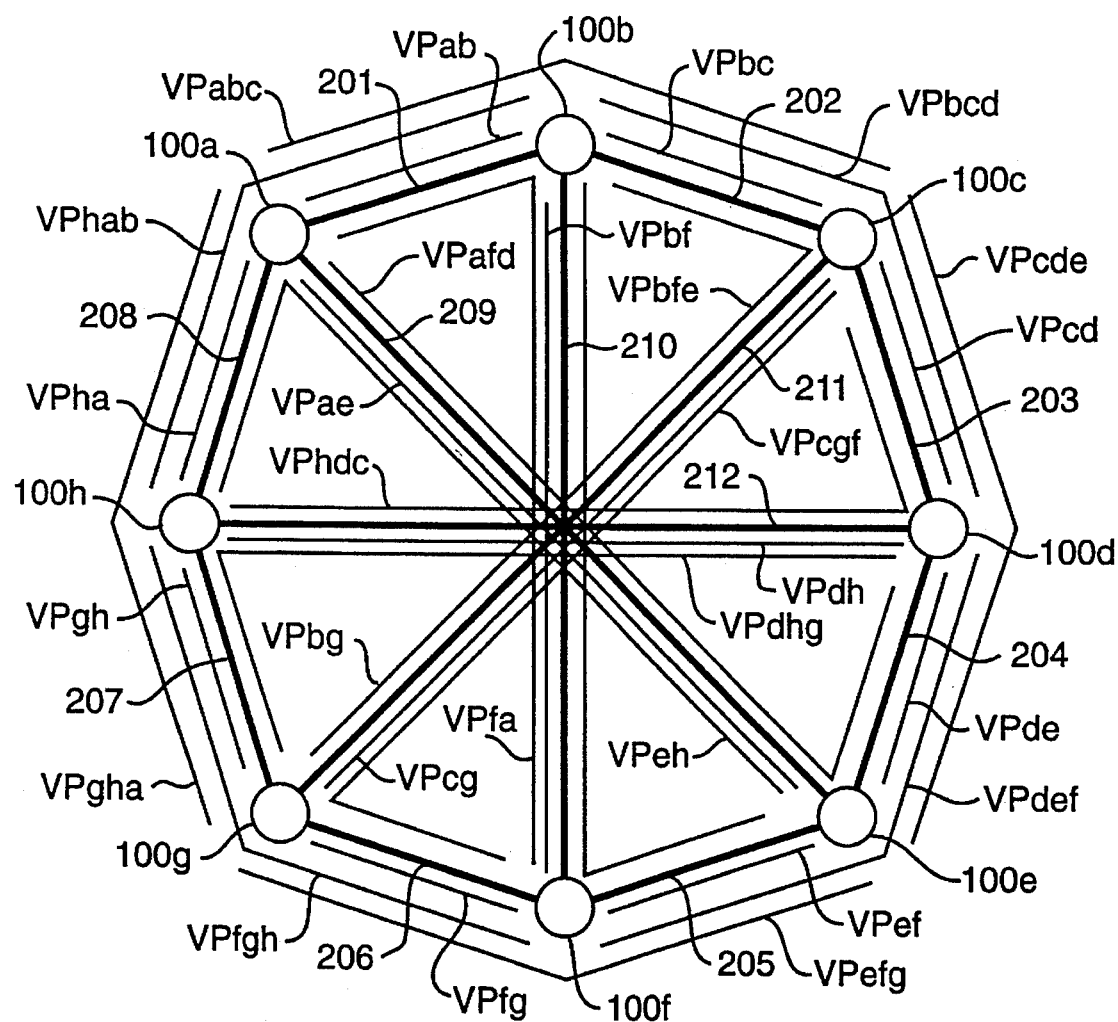
FIG. 7 is a schematic showing a setting example of the virtual path VP in the broad band switching network shown in FIG. 1.

FIG. 7 is a schematic showing a setting example of the virtual path VP in the broad band switching network shown in FIG. 1.

On broad band inter-node transmission paths 201 to 208, four systems of virtual paths VPab, VPac, VPha, VPaf and so forth are provided. On broad band inter-node transmission paths 209 to 212, three systems of virtual paths VPac, VPae, VPhe, and so forth are provided. In other words, communications among a plurality of broad band switching nodes equally share the broad band inter-node transmission lines. By distributing the traffic between the broad band switching nodes to the entire network, the operating efficiency of the transmission lines can be improved and thereby the cost of the entire system can be reduced. It is needless to say that when the traffic between particular two broad band switching nodes is high, it is possible to dispose a virtual path through another broad band inter-node transmission line. The through-put characteristic of the broad band inter-node transmission lines, the setting method of the virtual path, and the intelligently distributed routing control for setting the band width will be further described later.

With respect to the switching process of a call routed between a plurality of broad band switching nodes, the terminating process of up to layer 3 on the originating call side is distributedly processed by the originating call broad band switching node. The terminating process on the incoming call side is distributedly processed by the incoming call broad band switching node. Thus, the load of the switching process can be distributed between the nodes and processed at a high speed. This method is referred to as a distributed switching method, which is basically the same as that accomplished with a fourth generation PBX. On the other hand, after the incoming call process and the originating call process are executed by the originating call broad band node, the node originates a call to the incoming call broad band switching node. Thereafter, the incoming call broad band switching node executes the incoming call process of the call from the originating call broad band switching node and then executes the originating call process for the terminal equipments in the originating call broad band switching node. This method is functionally the same as the above mentioned method. Nevertheless, it is obvious that the switching process amount and process time in each broad band switching node increase. The present invention can be applied to each of the above methods. In addition, the present invention does not limit the switching methods.

Moreover, in the above description, the broad band switching nodes which are point-symmetrically disposed are connected. Thus, strictly speaking, when the number of broad band switching nodes is odd, they are not point-symmetrically disposed. However, in the present invention, such a case is treated as the range of point-symmetry.

Likewise, with respect to the broad band inter-node transmission lines shared by a plurality of broad band switching nodes, when assumed that the load of the entire system is equally distributed; the accommodation ratio of terminal equipments at each broad band switching node is 70%; the operating ratio of terminal equipments is 50%; and the speed of the broad band inter-node transmission lines is 155.52 Mbps, even in the case of eight node construction shown in FIG. 7, it is possible to obtain the through-put of 15 Mbps or more per terminal equipment on the average. Thus, it is clear that a communication capacity satisfying the company use is provided.

Since a transmission address of a cell with respect to the control information transmission adaptation unit 140, another extension line interface unit, and so forth is determined by the ATM switch by using a label value in accordance with the virtual channel identifier VCI, the determination by each interface unit with software process (determination of information cell or control data transmission control cell transmitted between terminal equipments) is not necessary. It is needless to say that information cell and control cell which are transmitted between the broad band switching nodes through the same transmission route can use the same virtual path identifier VPI. In the broad band switching network in the construction shown in FIGS. 1 and 2, the maximum number of the multiplexing extension line interfaces 131a to 131c can be set to for example 16 or 32 by selecting a distribution loss of the photo couplers 330a to 330c and light emitting devices and light receiving devices used in the access unit and the extension line interface unit between the terminal equipments and the photo coupler.

In this case, a plurality of broad band terminal equipments share the extension line interface port 5, that is, the broad band transmission capacity of 155.52 Mbps. Now, when it is assumed that the loads of terminal equipments (m=32) are equally distributed, that is, the number of transmitting terminal equipments is the same as that of receiving terminal equipments and the transmitting load of each terminal equipment is equal to the receiving load thereof; that the operating ratio of the terminal equipments is 50% (it is possible to estimate that the operating ratio of telephone of treading companies with the highest traffic is at most 15%); and that the transmission efficiency of the ATM transmission lines is 80% (real information transmission speed is slower than the physical speed of 155.52 Mbps), it is possible to obtain the through-put of 15 Mbps or more per terminal equipment on the average (peak speed is 149.7 Mbps). Thus, in the company use which hardly employs a long time high traffic call such as high definition TV, a satisfactory communication capacity is provided. The multiple drop connection method will be described later.

Figure 8:
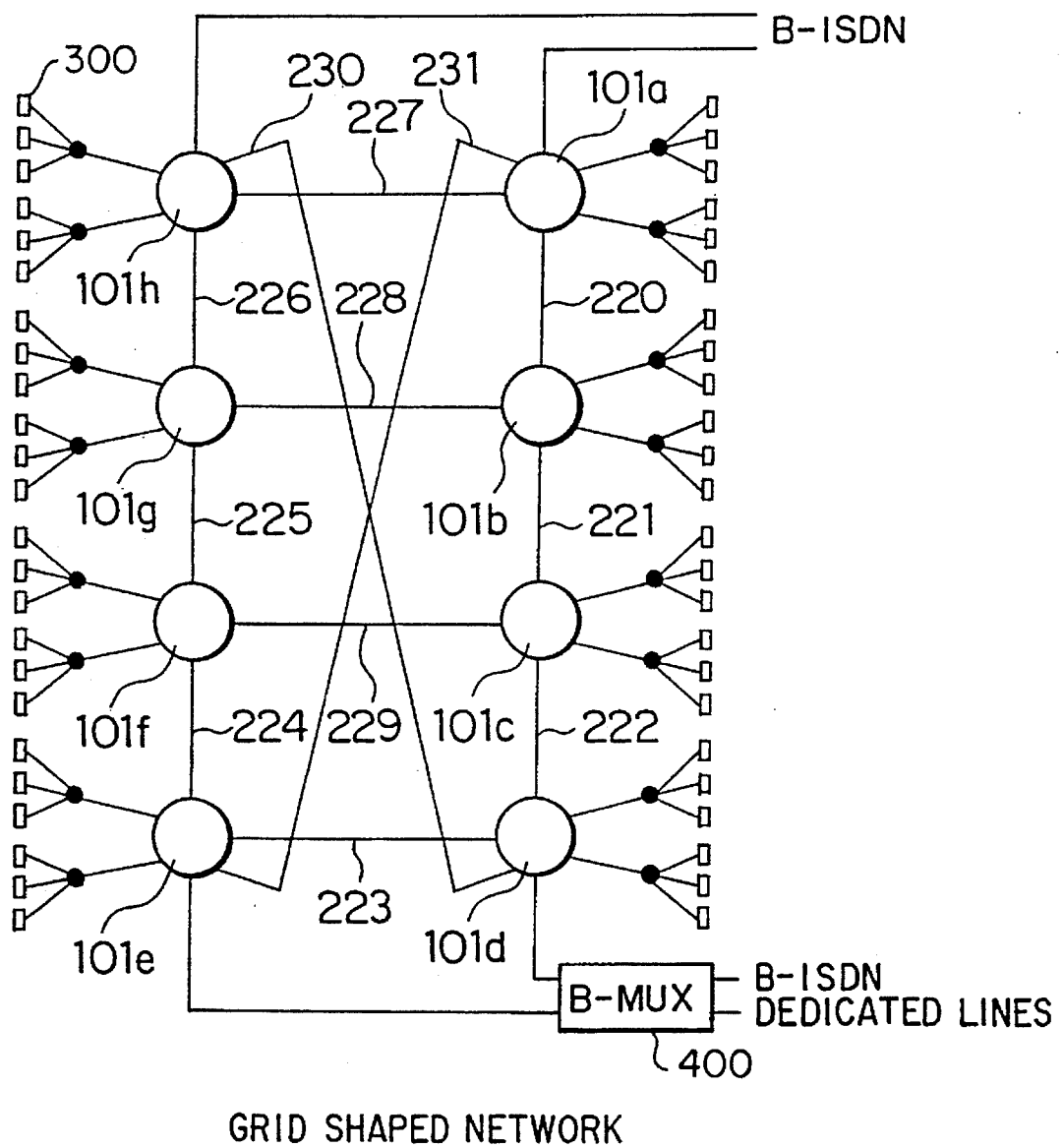
FIGS. 8 to 14 are schematics showing a broad band switching network of another embodiment according to the present invention.

FIG. 8 is a schematic showing a construction of a broad band switching network of another embodiment according to the present invention.

In the figure, broad band switching nodes 101a to 101h are connected in a grid shape with broad band inter-node transmission lines 220 to 227. The broad band switching nodes 101a, 101d, 101e, and 101h which are placed at four corners are diagonally connected with broad band inter-node transmission lines 230 and 231. Thus, even in this embodiment, unless the traffic among the broad band switching nodes deviates, the traffic among the broad band inter-node transmission lines can be almost equally distributed. An average through-put of 15 Mbps or more per terminal equipment can be obtained.

Figure 9:
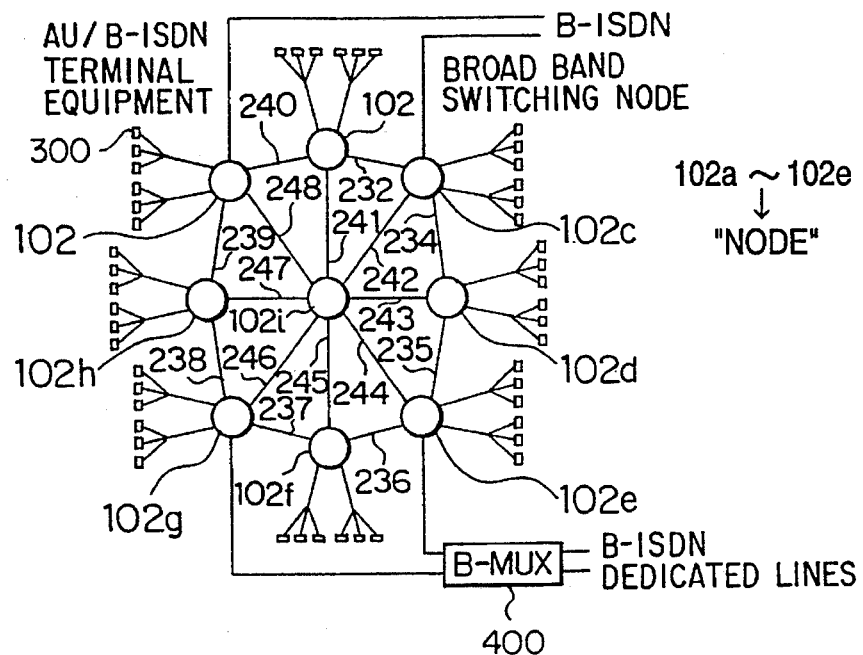

FIG. 9 is a schematic showing a construction of a broad band switching network of another embodiment.

As shown in the figure, in the broad band switching network, a broad band switching node 102i is disposed in a center position (not always physically) of a plurality of broad band switching nodes 102a to 102h connected with transmission lines 232 to 240 in a ring shape. The broad band switching nodes 102a to 102h are connected to the broad band switching node 102i through transmission lines 241 to 248.

In the above mentioned construction, when the broad band switching node 102i relays and switches an ATM cell routed between broad band switching nodes, it is possible to reduce the number of relaying nodes of the ATM cell and to equalize the traffic.

Figure 10:
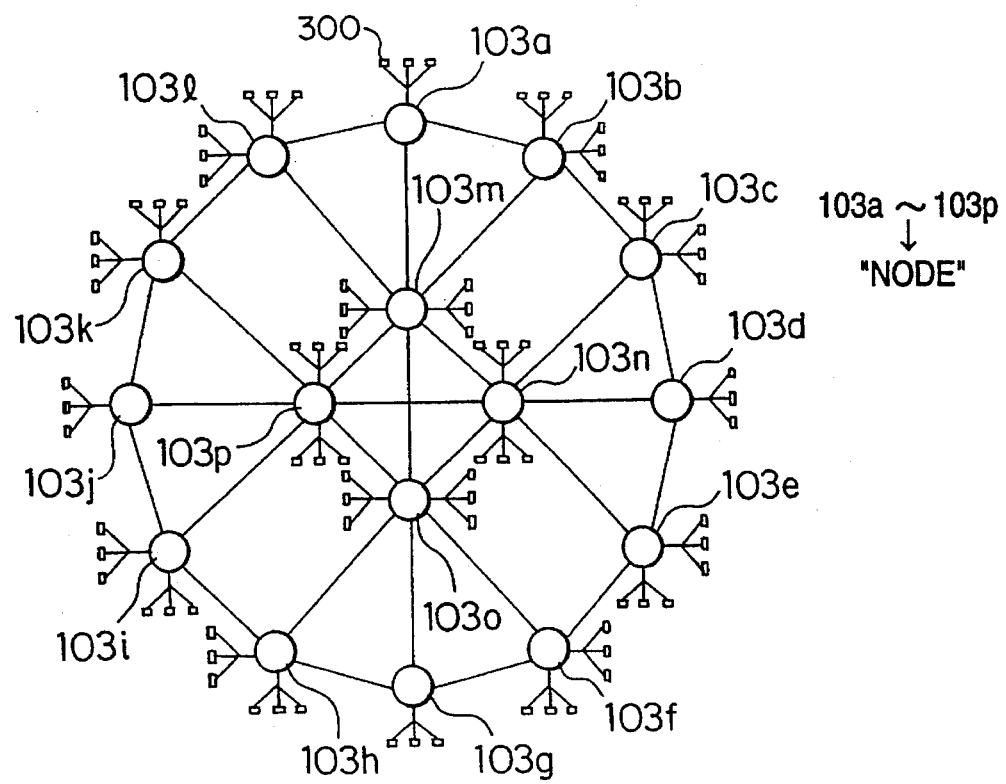

FIG. 10 is a schematic showing a construction of a broad band switching network of another embodiment according to the present invention.

As shown in the figure, in the broad band switching network, broad band switching nodes 103a to 103l are connected in a ring shape through transmission lines. In a center position, four broad band nodes 103m to 103p are disposed. As shown in the figure, the broad band nodes 103m to 103p are connected to the broad band switching nodes through transmission lines.

In this construction, much traffic can be equally distributed and transmitted. In addition, with respect to the center broad band switching nodes 103m to 103p, the number of connections of the broad band inter-node transmission lines can be decreased. Thus, terminal equipments can be connected through extension line interfaces. Moreover, since the degree of redundancy of the center broad band switching nodes is increased, the resistance against defects is improved.

The constructions shown in FIGS. 9 and 10 may be categorized as hierarchical networks. The transmission rate of the broad band switching nodes and the broad band inter-node transmission lines may be the same as the transmission rate of the constructions shown in other than FIGS. 9 and 10. It is possible to understand that part of broad band switching nodes are occasionally disposed in the center positions. In other words, it is clear that the conception of such constructions differs from that of an optical loop network. In this invention, such constructions are treated as non-hierarchical networks. In the present invention, the networks in the shapes shown in FIGS. 9 and 10 are referred to as diamond cut shape networks.

Figure 11:
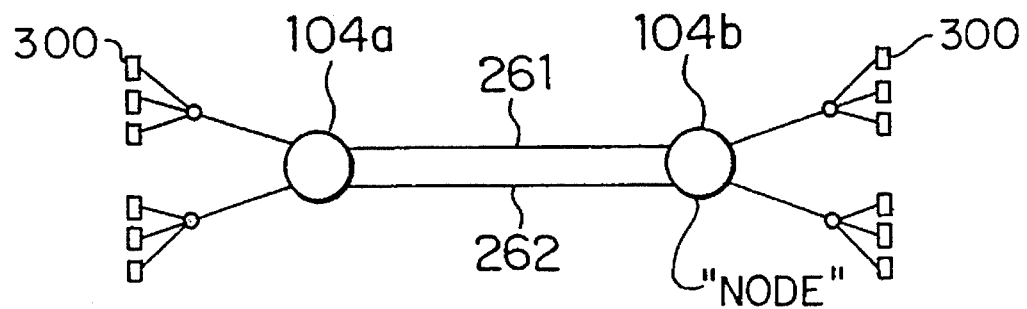

FIG. 11 is a schematic showing a broad band switching network constructed with two broad band nodes of another embodiment according to the present invention.

In this case, with transmission lines 261 and 262 between broad band switching nodes 104a and 104b, even if a defect takes place in one of broad band inter-node transmission lines, the other can continue the transmission.

Figure 12:
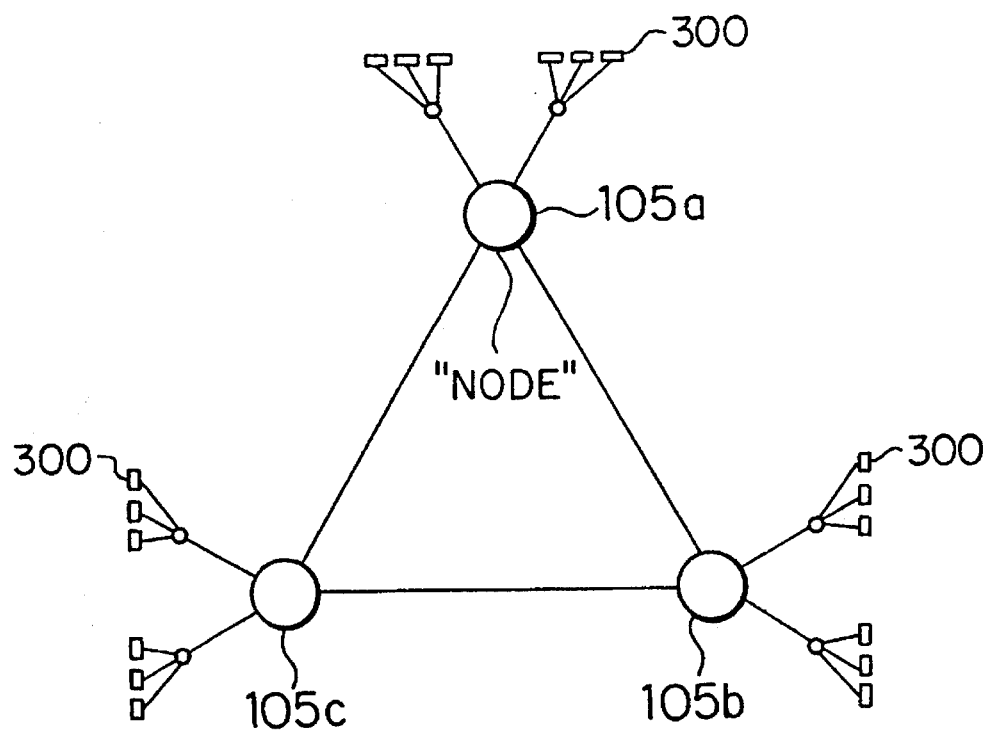

FIG. 12 is a schematic showing a broad band switching network constructed with three broad band switching nodes of another embodiment according to the present invention.

In this construction, even if a defect takes place in one of three broad band switching node 105a, 105b, and 105c, the remaining two broad band switching node can continue the communication.

Figure 13:
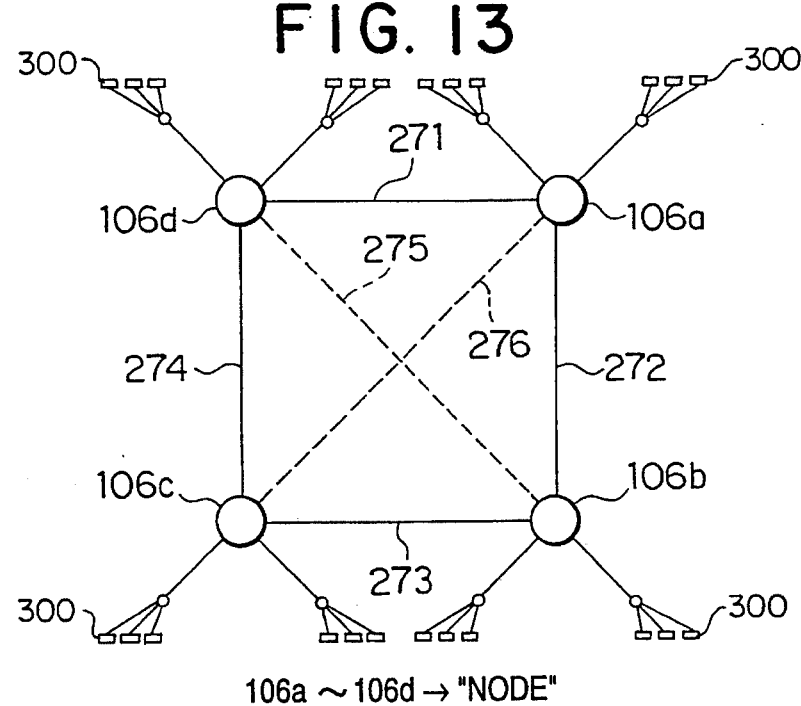

FIG. 13 is a schematic showing a broad band switching network constructed with four broad band switching nodes of another embodiment according to the present invention.

In this construction, broad band switching nodes 106a to 106d are connected with broad band inter-node transmission lines 271 to 274. However, depending on the traffic condition between broad band switching nodes, opposed broad band switching nodes may be connected with broad band inter-node transmission lines 275 and 276.

Figure 14:
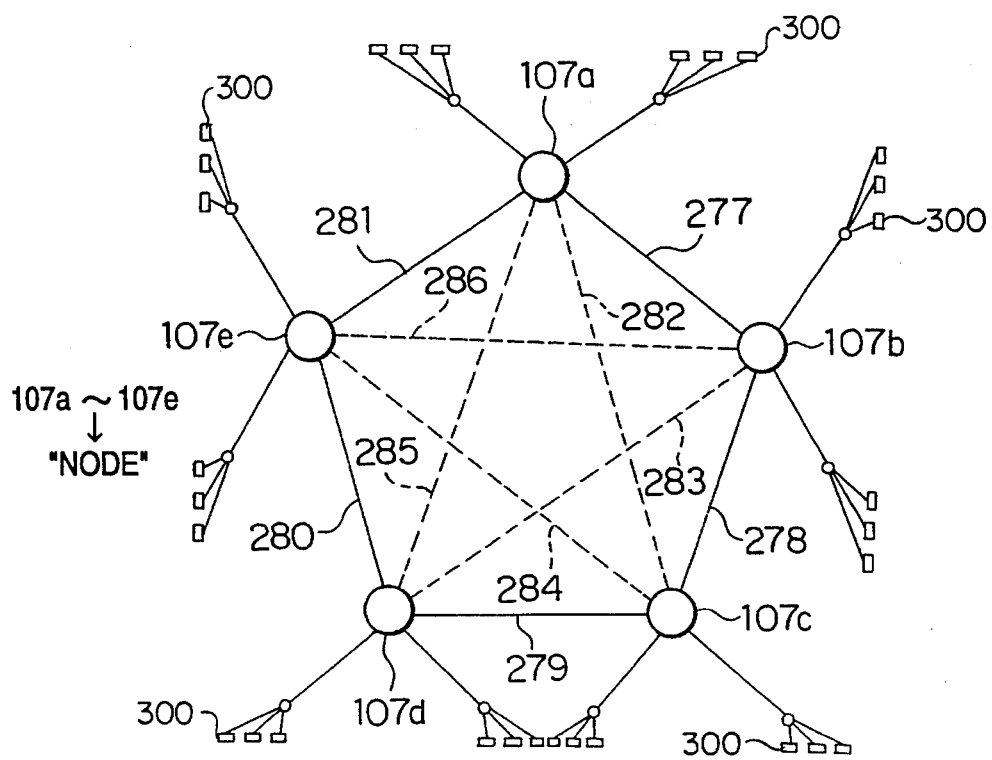

FIG. 14 is a schematic showing a broad band switching network constructed with five broad band nodes of another embodiment according to the present invention.

In this construction, broad band switching nodes 107a to 107e are connected with broad band inter-node transmission lines 277 to 281. However, depending on the traffic condition between broad band switching nodes, the broad band switching nodes 107a to 107e can be connected with, for example, broad band inter-node transmission lines 282 to 286.

Figure 15:
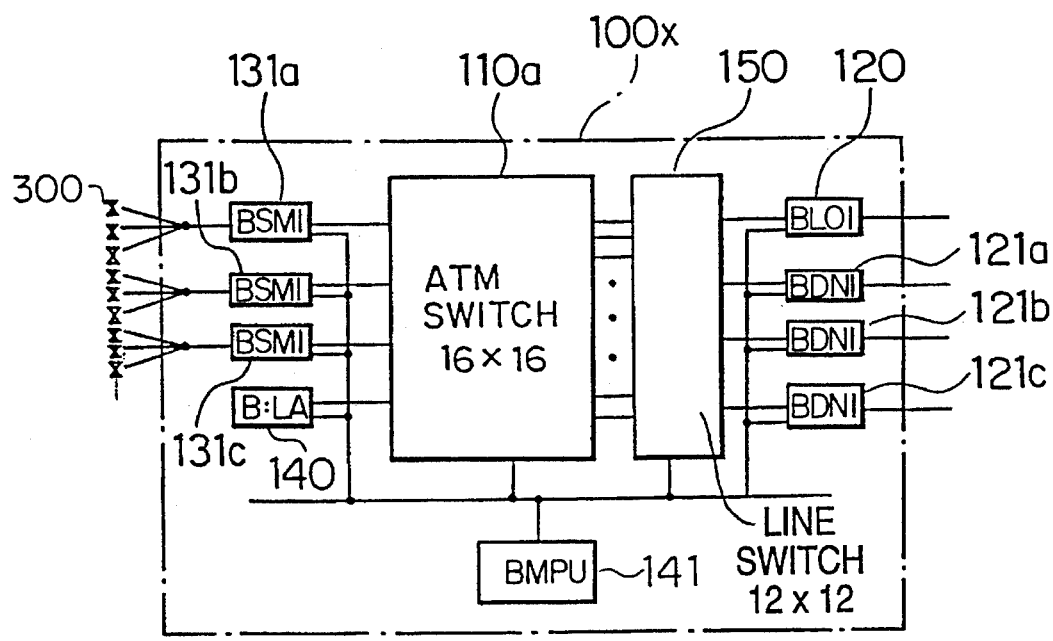
FIGS. 15 and 16 are schematics showing a construction of a broad band node of another embodiment according to the present invention.
Figure 16:
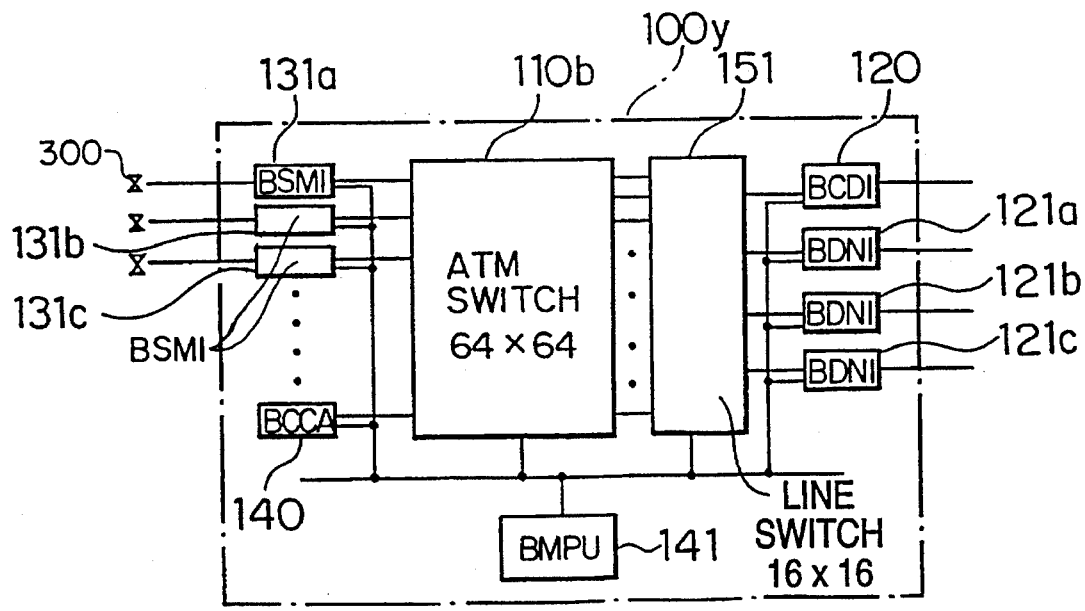

FIGS. 15 and 16 are schematics showing examples of constructions of a broad band switching node of another embodiment according to the present invention (in those figure, the auxiliary storage unit, the control system, and so forth shown in FIG. 11 are omitted).

A broad band switching node 100x shown in FIG. 15 is provided with 16 ports. The trunk side of an ATM switch 110a is connected to various interfaces through a 12-port line switch 150.

A broad band switching node 100y shown in FIG. 16 is provided with 64 ports. The trunk side of an ATM switch 110b is connected to various interfaces through a 16-port line switch 151.

As shown in FIGS. 15 and 16, with the line switches 150 and 151 and demultiplexing circuits 122a, 122b, and 122c provided in broad band inter-node connection interface units 121a, 121b, and 121c, a plurality of broad band line signals which are input and output through input and output ports at the same time are multiplexed and demultiplexed.

Figure 17:
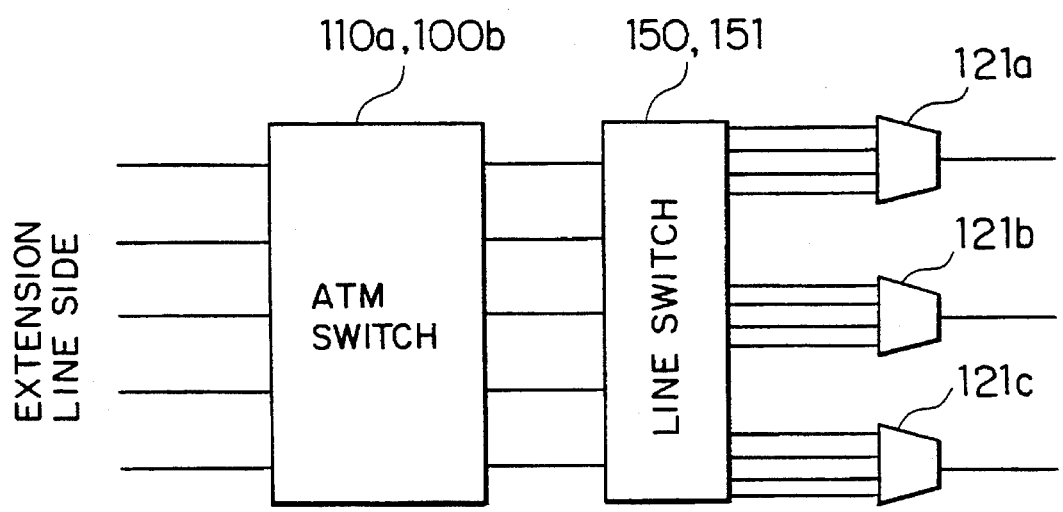
FIG. 17 is a schematic showing a line switch and a connection of a broad band inter-node interface unit in the construction shown in FIGS. 15 and 16.

In this construction, as shown in FIG. 17, besides at the aforementioned transmission rate of 155.52 Mbps, signals can be transmitted at multiples of such a transmission rate on the broad band inter-node transmission lines. Thus, the traffic of inter-node transmission can be increased. In addition, depending on the traffic condition of the entire network, by controlling the line switches 150 and 151 while keeping synchronization of opposed two nodes (the ATM switch is operated for each cell, while the line switch is operated on the order of minutes or hours for each port or with an operation command), the band width of the broad band inter-node transmission line can be varied depending on the operating condition. Thus, if the traffic between two particular broad band nodes is congested, it is possible to prevent such congestion from adversely affecting the transmission to other broad band switching nodes.

In the above mentioned constructions, the networks are basically composed of many broad band switching nodes connected with three broad band inter-node transmission lines. However, as the number of ports of switches increases, it is possible to provide four or more broad band inter-node transmission lines when necessary. As another method, it is also possible to provide a bypass route between particular nodes where the traffic is concentrated so as to prevent the traffic of the entire network from being concentrated. In other words, the spirit of the present invention is to provide broad band inter-node transmission lines by considering the equal distribution degree of the traffic on broad band inter-node transmission lines, the number of relaying nodes disposed between two terminating broad band switching nodes, the through-put characteristic, the affecting degree due to occurrence of defects, and so forth. Thus, it will be readily apparent to those skilled in the art that depending on such conditions, various network constructions may be present and embodiments implemented may be included in the scope of the present invention.

In the above constructions, the extension line system of the broad band switching nodes is concentrated with photo couplers, namely, passive multiple drop connections. Nevertheless, as shown in FIG. 18 (a), a line concentration unit 132 composed of, for example, a 1-to-n ATM switch and so forth may be provided in extension line interface units 131a, 131b, and 131c so as to demultiplex signals on the lines connected to a terminal equipment 300.

Figure 18A:
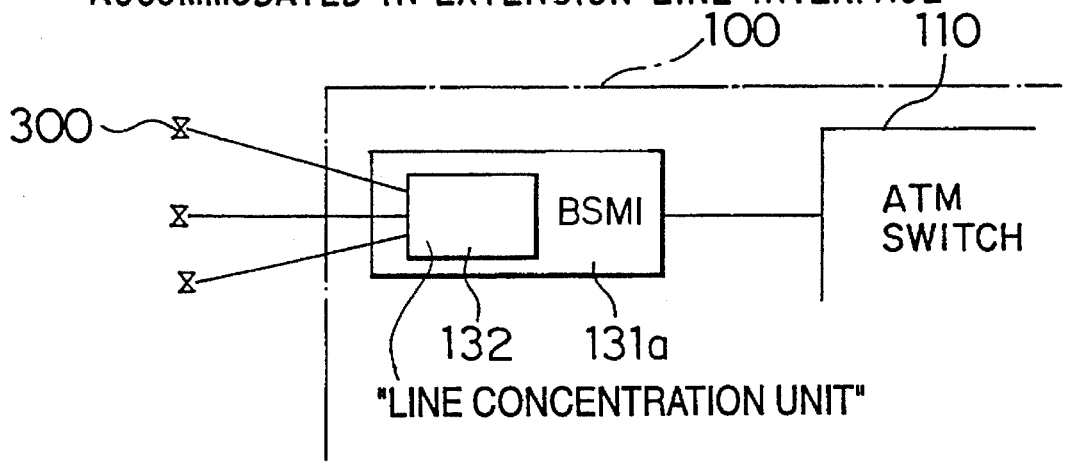
FIGS. 18a–18b are schematics showing a construction of a line concentration unit provided in the extension line interface unit.
Figure 18B:
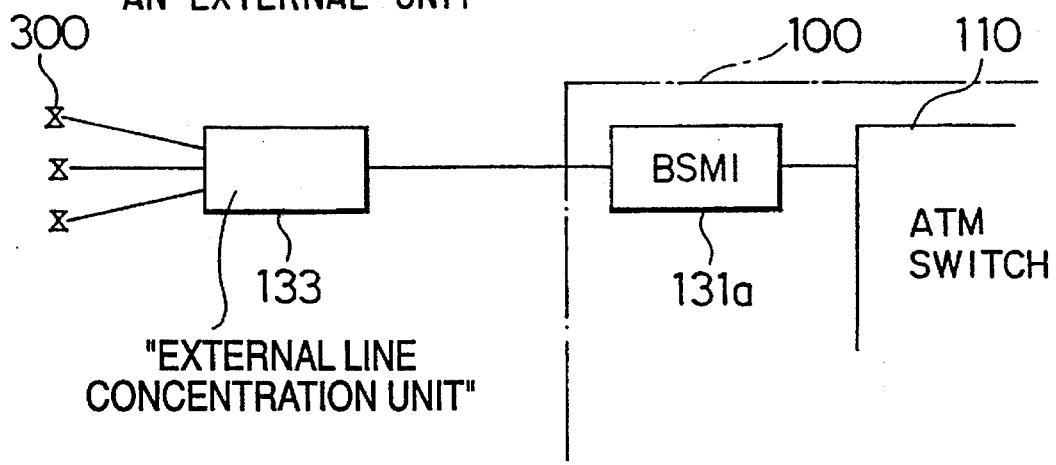

In addition, as shown in FIG. 18 (b), like the photo coupler, by providing an external line concentration unit 133 of a broad band switching node, even if an active multiple drop connection method is used, besides the through-put characteristic, the same effect can be accomplished without increasing the scale of the ATM switch 110.

In addition, as shown in FIGS. 15 and 16, when the number of ports of the ATM switch is increased and an access unit is connected to each port, the function and characteristic of the broad band inter-node transmission lines are not degraded. In other words, the present invention does not limit constructions of broad band switching nodes to those described above, but provide various modifications thereof.

In the non-hierarchical network construction, since many broad band inter-node transmission lines, namely, optical fiber cables, are routed among broad band switching nodes, the installation cost of transmission lines may increase. However, due to recent rapid developments of technologies of optical communications, the cost of optical fiber cables has been rapidly decreased. In addition, multiple wire-core cables where large number of optical fibers are bound have been used at a reasonable cost.

Figure 19:
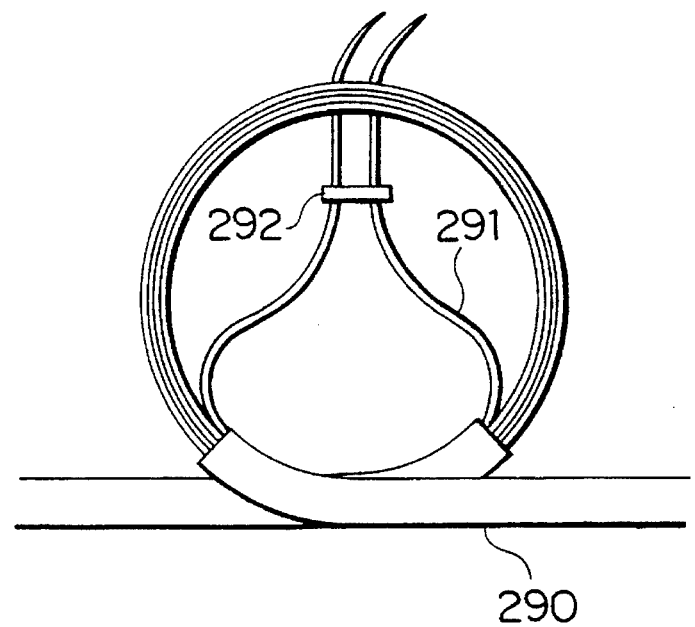
FIG. 19 is a schematic showing a lead-out example of a multiple wire-core optical fiber cable.

FIG. 19 is a schematic showing an example of lead-out of a multiple wire-core optical fiber cable.

For example, a 50-wire core cable 290 is routed along all broad band switching nodes in one stroke shape. At each broad band switching node, optical fibers 291 are lead out and an optical connector 292 is mounted thereto so as to provide a broad band inter-node transmission line with a desired broad band node. Thus, the installation cost of the optical fiber cable is not remarkably higher than that of the hierarchical network. However, to improve the reliability against a trouble such as cable cut, the broad band inter-node transmission lines are grouped in accordance with the construction of the network and then a plurality of multiple wire-core cables are routed so as to improve the redundancy of the network.

On the other hand, when broad band switching nodes are not distributedly disposed in a building or the like, for example four broad band nodes are accommodated in one cabinet and a plurality of cabinets are concentratedly disposed. In this construction, the above mentioned problem will not take place. In addition, the installation cost of the cables will be ignorablely decreased.

The aforementioned embodiments focused on the company use. Nevertheless, the present invention is not limited to the company use. In other words, the objects of the present invention can be accomplished by connecting a broad band ISDN office switch with the above mentioned broad band transmission lines. In addition, the multiple drop connections of the extension line system may be used as the so-called private branch system interface or the subscriber system interface. Thus, part or all of the present invention can be applied to such applications and they are included in the scope of the present invention.

As was described above, in the present embodiment, by using a non-hierarchical network, that is, by directly connecting broad band switching nodes with broad band inter-node transmission lines, a broad band switching system satisfactorily meeting the traffic condition for the company use can be accomplished at a reasonable cost.

To further clarify the effect of the present invention, with reference to FIGS. 20 to 25, the superiority of the present invention to the hierarchical networks will be described.

Figure 20:
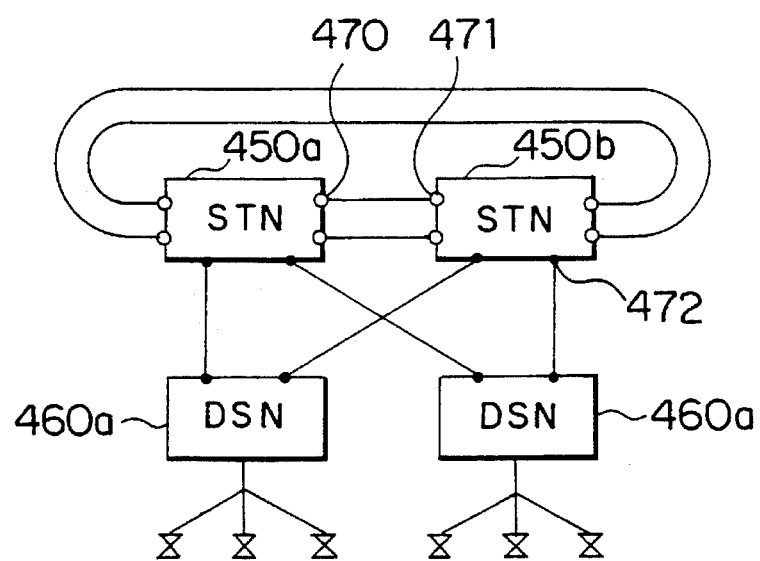
FIGS. 20 to 25 are schematics describing the effect of the embodiment.

FIG. 20 is a schematic showing a hierarchical network constructed with two nodes.

In this construction of the network, to improve the reliability, nodes 460a and 460b are connected to two optical loop network stations 450a and 450b in the duplicate homing arrangement method. In the figure, reference numeral 470 is a transmitting optical repeater. Reference numeral 471 is a receiving optical repeater. Reference numeral 472 is a transmitting/receiving optical repeater. In this network construction, 12 transmitting/receiving optical repeaters are required.

Figure 21:
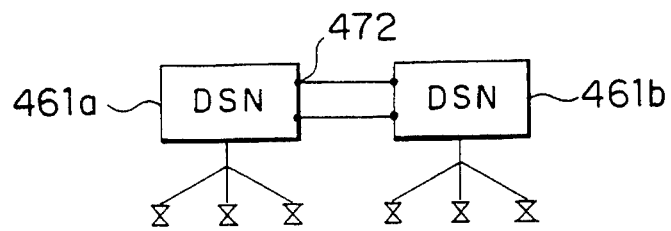

On the other hand, in a non-hierarchical network constructed with two nodes 461a and 461b shown in FIG. 21, only four optical repeaters are required.

Figure 22:
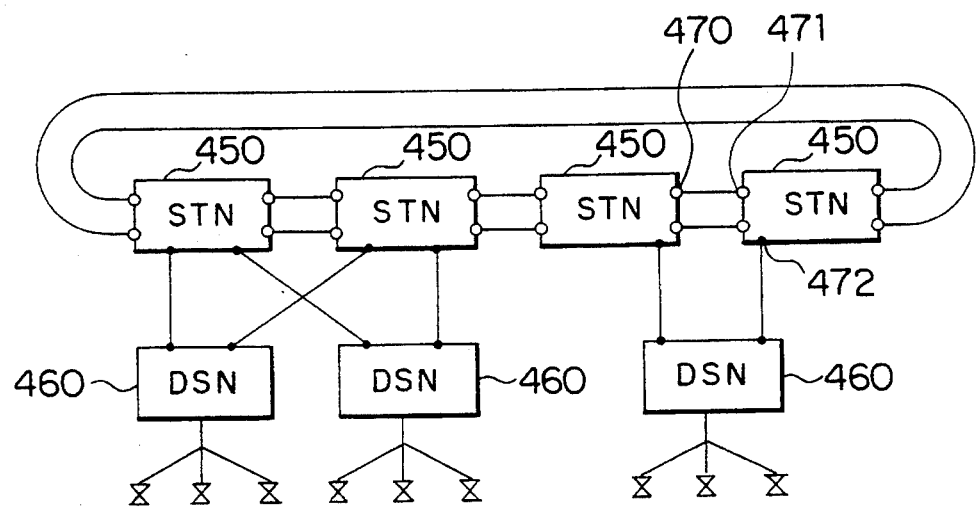
Figure 23:
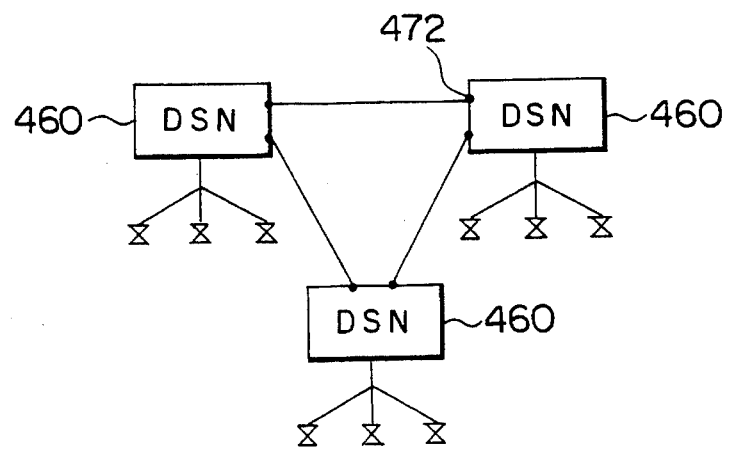

Likewise, in a hierarchical network with three nodes shown in FIG. 22, 22 optical repeaters are required. On the other hand, in a non-hierarchical network with three nodes shown in FIG. 23, only six optical repeaters are required.

Figure 24:
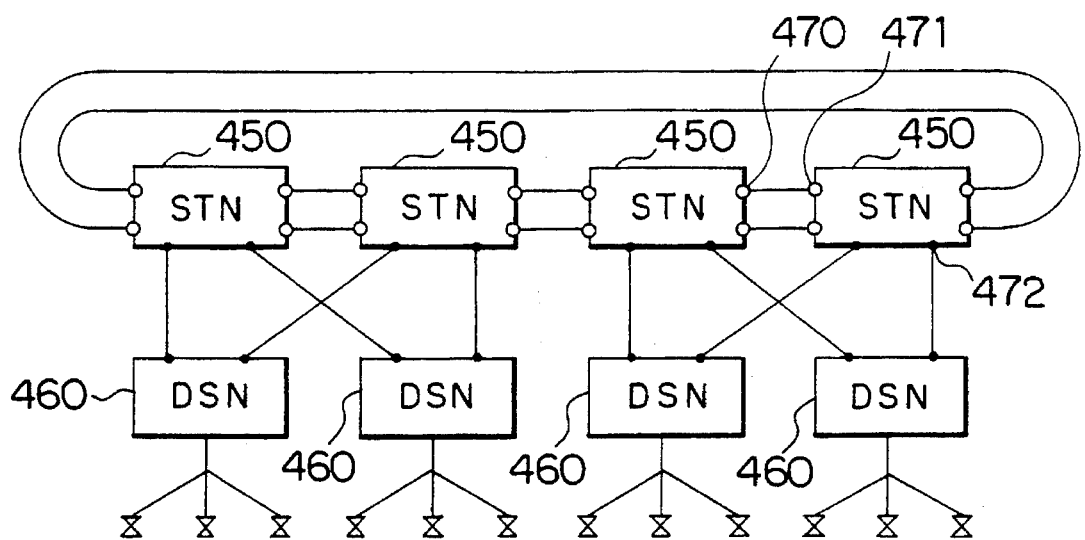
Figure 25:
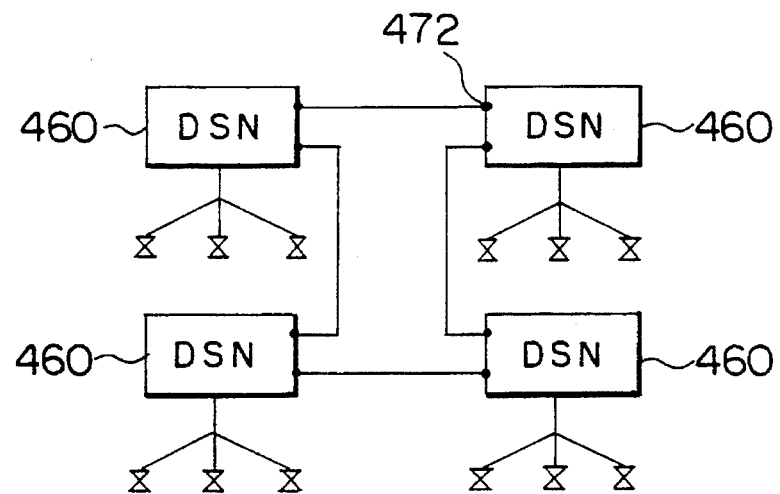

Moreover, in a hierarchical network with four nodes shown in FIG. 24, 24 optical repeaters are required. On the other hand, in a non-hierarchical network with four node shown in FIG. 25, only eight optical repeaters are required.

In addition, in the hierarchical network system, all the traffic passes through the same transmission line (not distributed). Thus, in a system with many nodes or in a system where high traffic is expected, the transmission rate of the optical network should be at 1.6 Gbps, 6 Gbps, or more as has been described. Consequently, the optical repeaters operating at such a high transmission rate will become much more expensive than those used in the non-hierarchical network system. In addition, this tread will become clear as the number of broad band switching nodes increases.

In other words, according to the present embodiment, by considering the equal distribution degree of traffic on broad band inter-node transmission lines, the number of relaying nodes present between two terminating nodes, the throughput characteristic, the affecting degree due to occurrence of defects, a plurality of broad band switching nodes are connected in a wheel shape, a grid shape, or a diamond cut shape and then opposed broad band switching nodes are connected when necessary so as to distribute the traffic of the entire network. In addition, since the broad band inter-node transmission lines are redundantly routed, high reliability of the system can be achieved. In addition, since the number of broad band switching nodes can be selected depending on the traffic condition, a system having expansibility and flexibility and covering from a small capacity to a large capacity can be constructed at a reasonable cost.

Then, a routing control in accordance with the present invention will be described.

Figure 26:
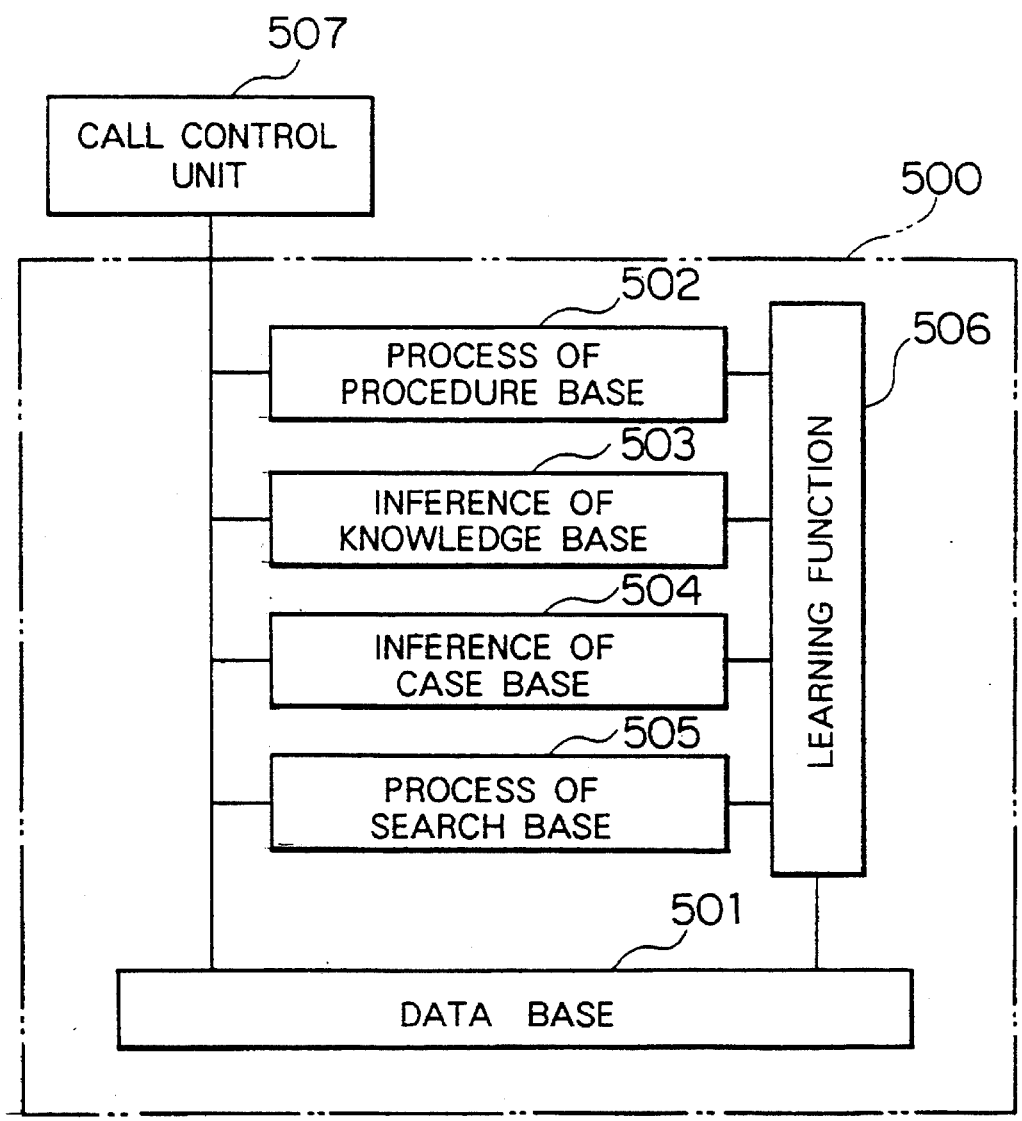
FIG. 26 is a schematic showing a construction of an intelligent inference mechanism of an embodiment according to the present invention.
Figure 27A:
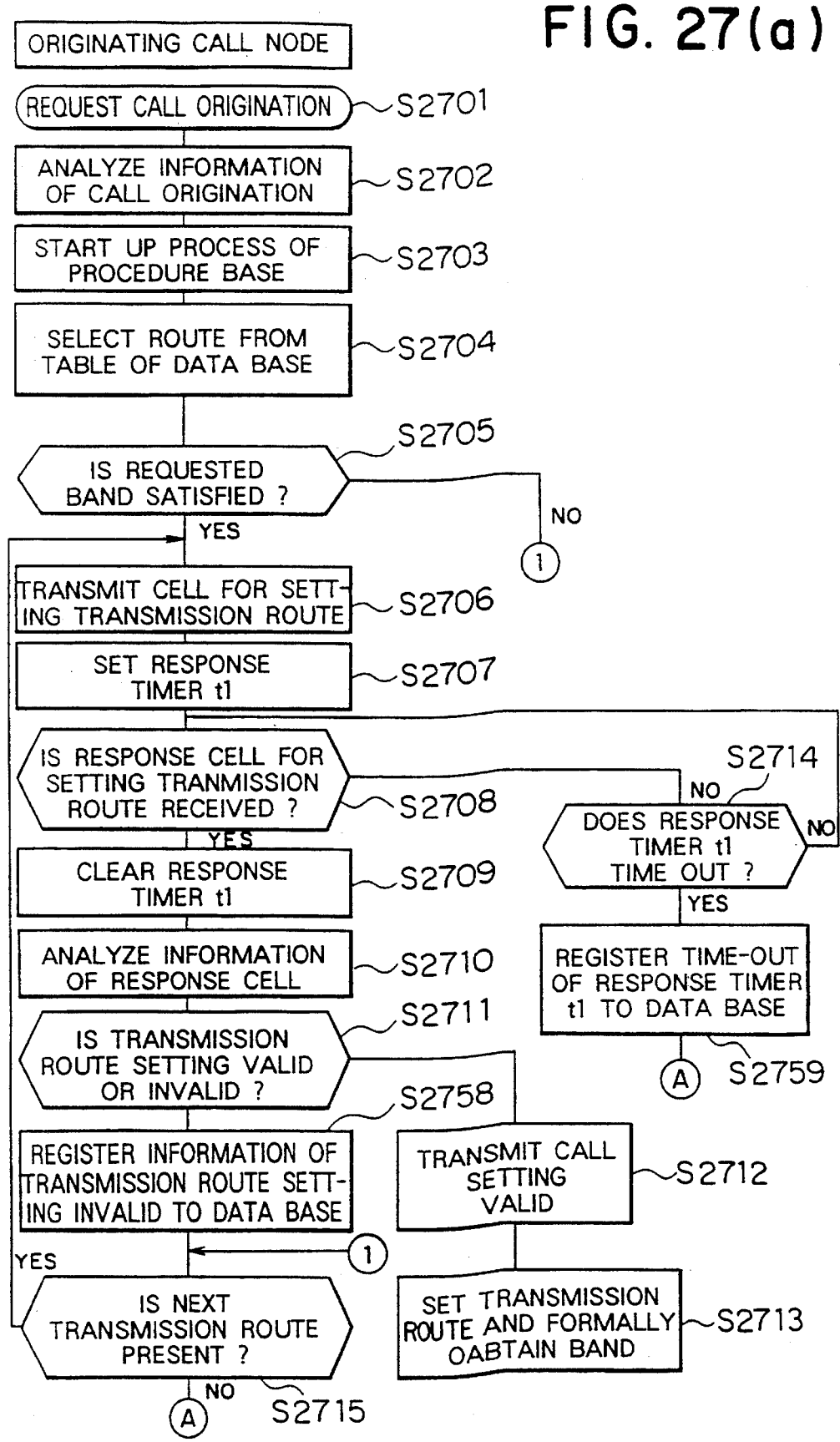
FIGS. 27a–27b are flow charts describing an operation of a routing control of an originating call node.
Figure 27B:
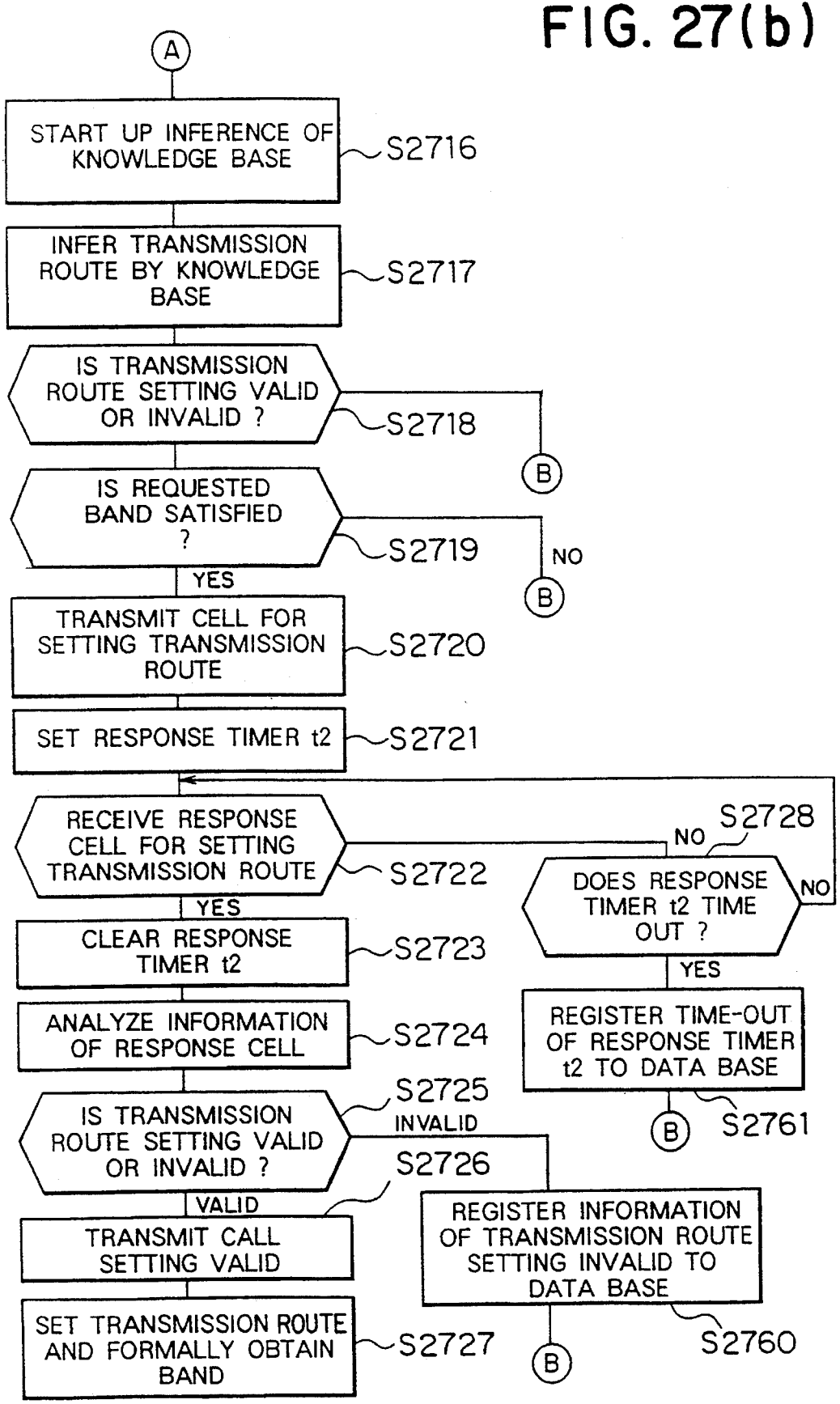
Figure 27C:
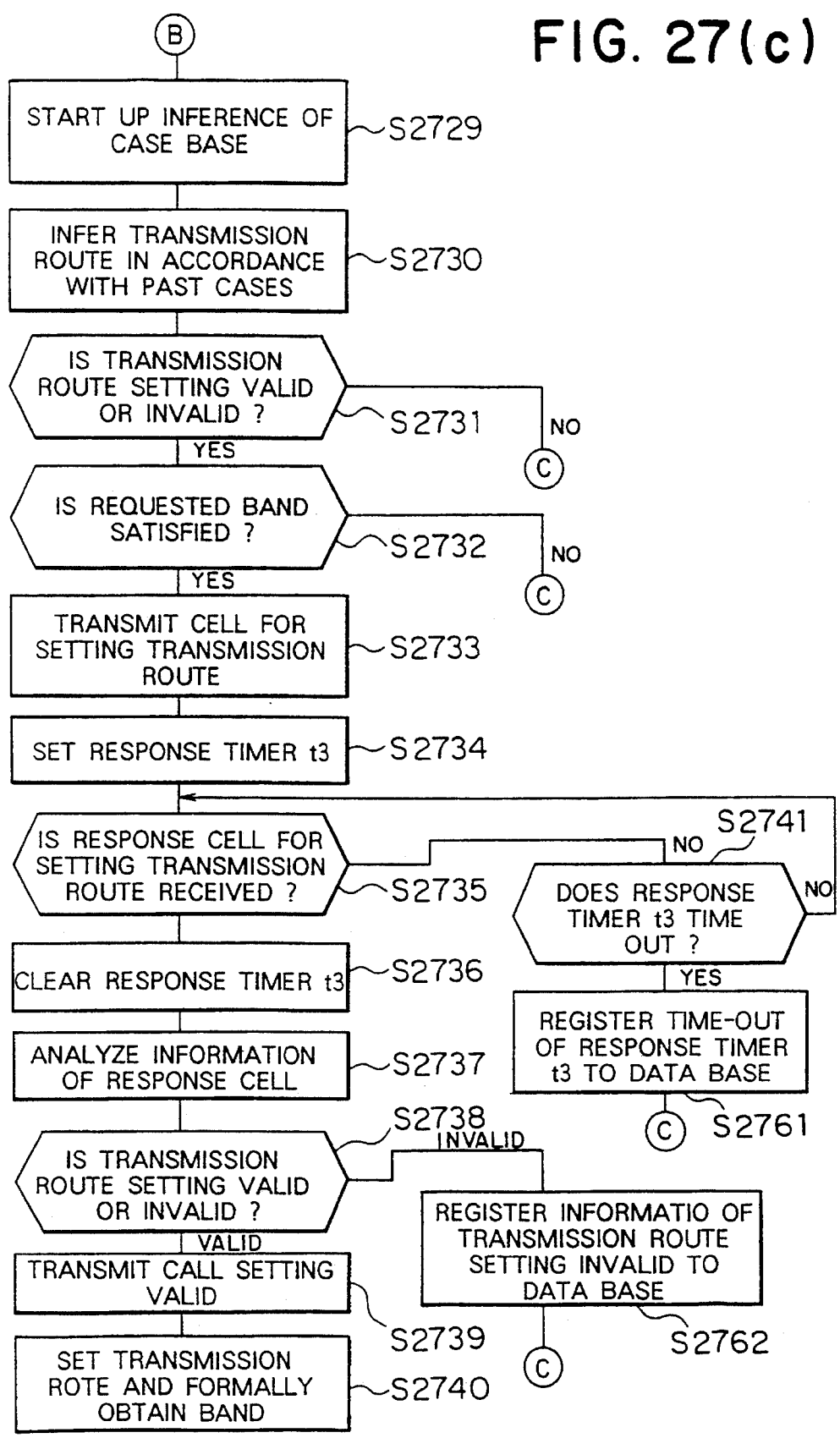
Figure 27D:
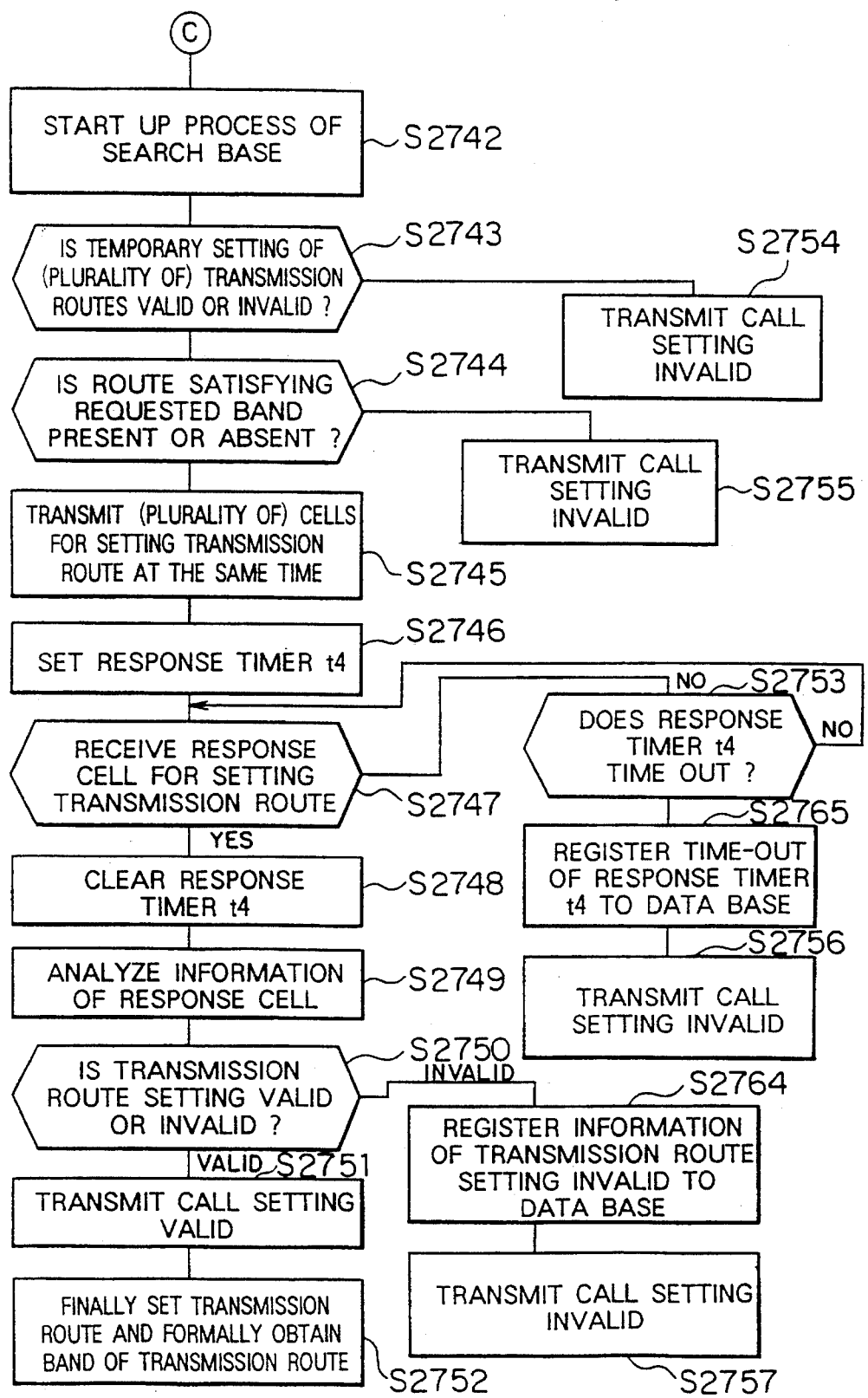

FIG. 26 is a schematic showing a construction of an intelligent inference mechanism in a main control unit 141 for executing a routing control by means of a call control process and the intelligent inference mechanism.

An intelligent inference mechanism 500 shown in the figure is composed of a process of procedure base 502 for executing a route selection process from a transmission route registered in a data base 501 by a table search operation or with a particular algorithm; an inference of knowledge base 503 for detecting periodical change of traffic and defects and for taking countermeasures against them by means of knowledge with respect to inference; an inference of case base 504 for registering unsuccessful cases of past route settings; a process of search base 505 for temporarily setting a plurality of transmission routes against one call request, for searching the plurality of transmission routes, and for finally setting a transmission route in accordance with a particular precedence order; and a learning function 506 for learning the results of the process of procedure base 502, the inference of knowledge base 503, the inference of case base 504, and the process of search base 505 and for updating the data base 501 used for each process and inference. The intelligent inference mechanism 500 is activated with a command from a call control unit 507.

Figure 28A:
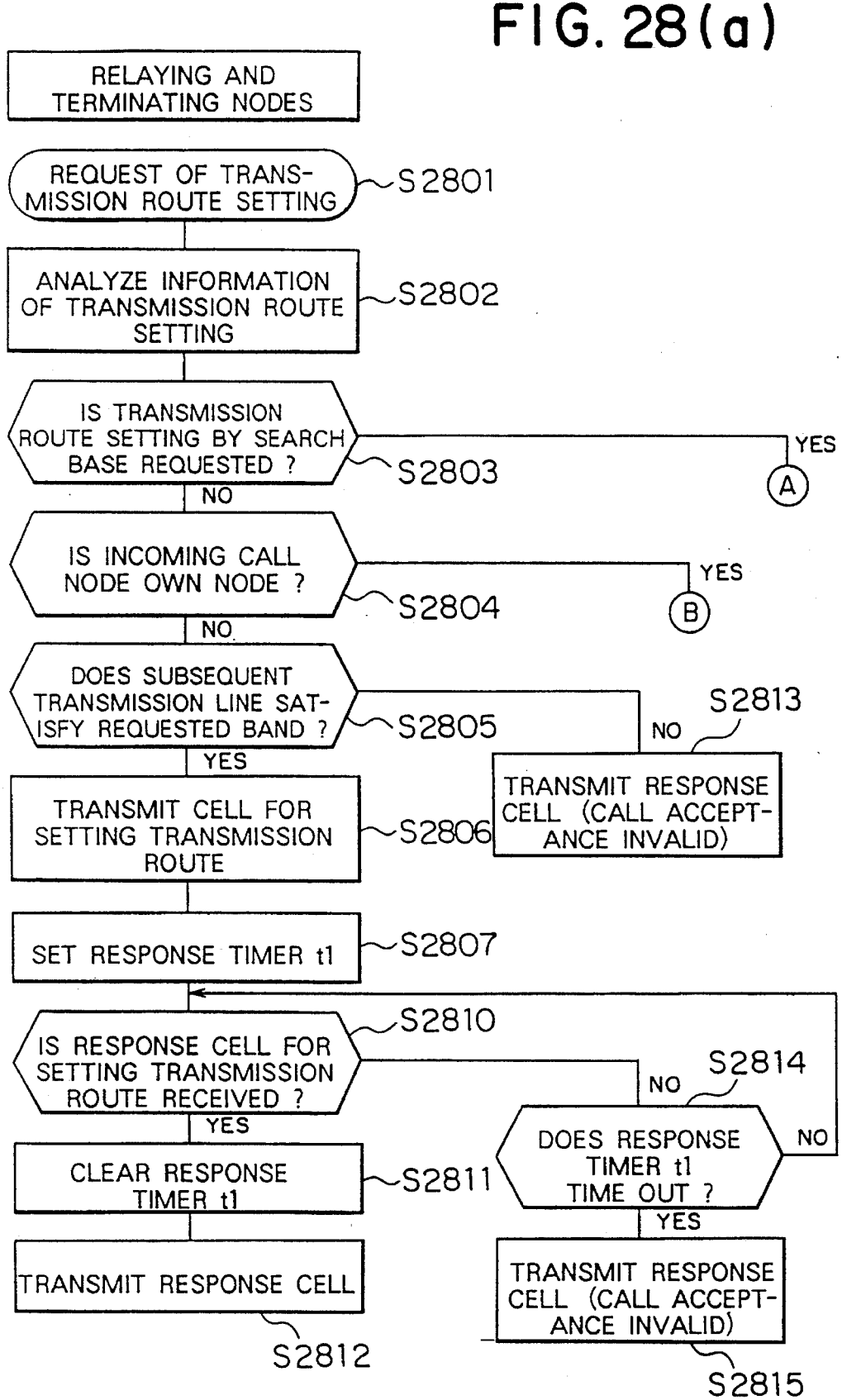
FIGS. 28a–28b are flow charts describing an operation of a routing control of relaying and termination originating call nodes.
Figure 28B:
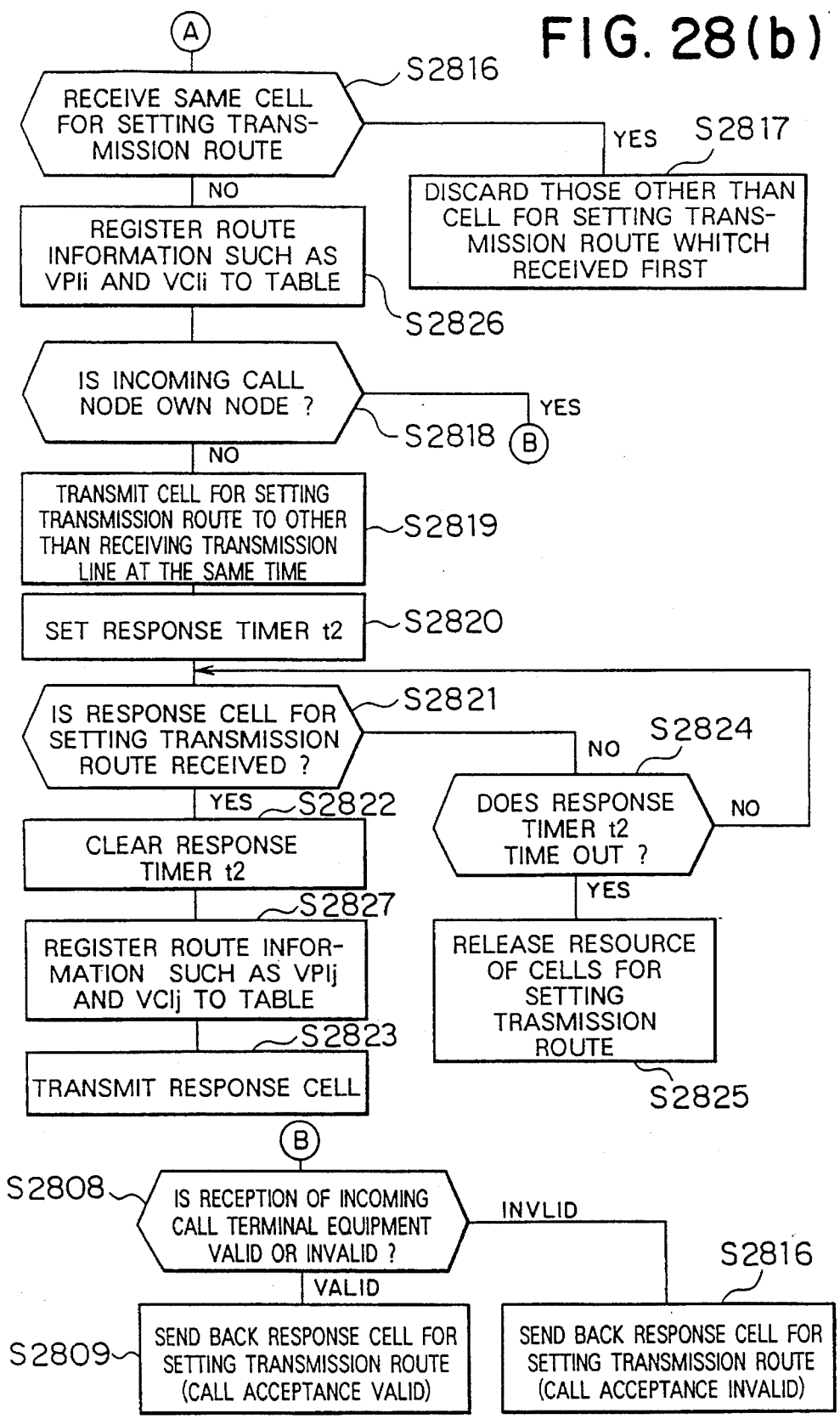
Figure 29A:
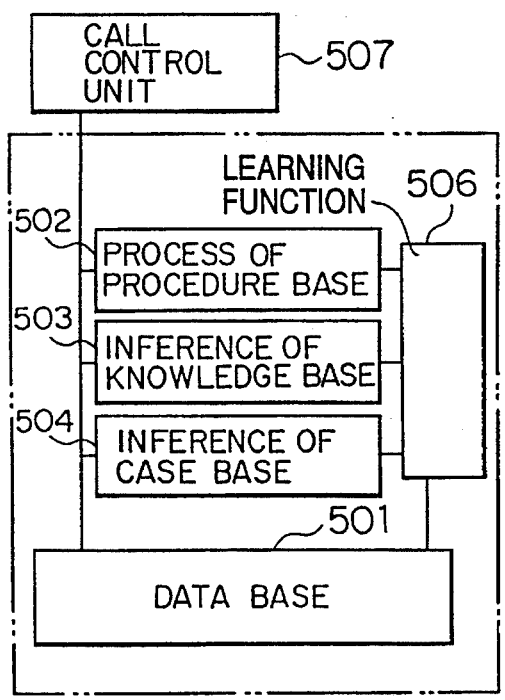
FIGS. 29 (a) to (d) are schematics showing another construction of the intelligent inference mechanism.
Figure 29B:
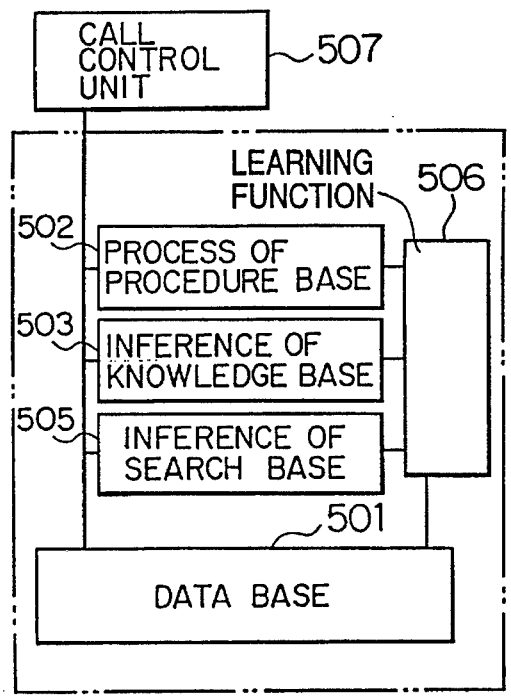
Figure 29C:
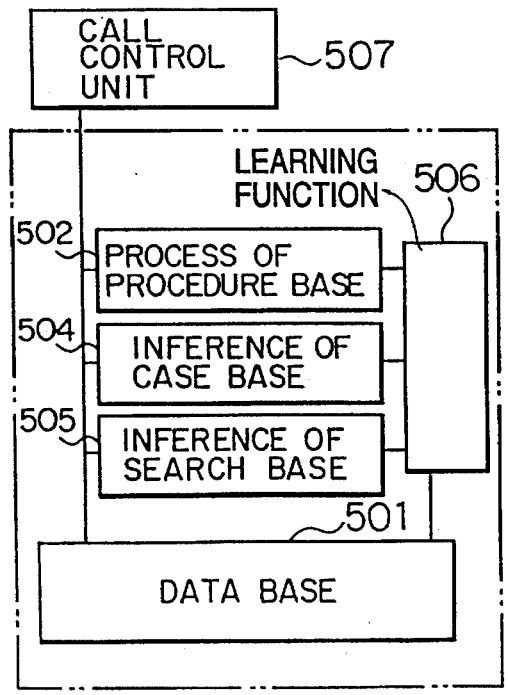
Figure 29D:
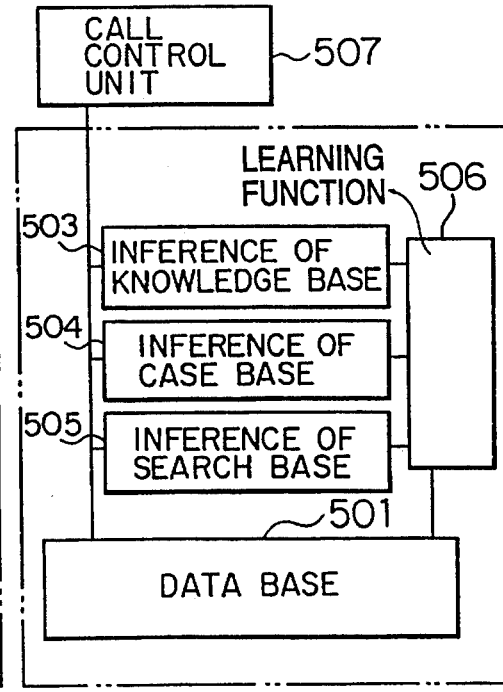

In the broad band switching network system of the present embodiment, when the system is started up, virtual paths (transmission routes) with a minimum band width necessary for a routing control have been set among all the broad band switching nodes. The routing control is executed as shown in FIGS. 27 and 28.

Now, with reference to these figures, an operation of routing control will be described.

When the broad band switching node 100 receives a call request including call attribute information such as a peak traffic amount, an average traffic amount, and a media type from the broad band ISDN terminal 300 (in the step S2701), the ATM extension line interface unit 131 separates the call request from the communication line to the ATM switch unit 110 by means of the ATM extension line interface unit 131, analyzes it (in the step S2702), and informs the main control unit 141 of the call control information. Nevertheless, as will be described later, it is also possible for the broad band switching node 100 to inform the main control unit 141 of the call control information through the ATM switch unit 110.

The main control unit 141 which has received the call control information activates the intelligent inference mechanism 500 so as to cause the call control unit 507 to set a transmission route.

Thereafter, the process of procedure base 502, which is a first means of the intelligent inference mechanism, is activated (in the step S2703). A transmission route is selected from the table in the data base 501. As another method, the data base 501 is referenced so as to select a transmission route in accordance with a predetermined algorithm where the total of traffic amount of calls on transmission lines routed among a plurality of broad band nodes becomes minimum; the number of nodes through which the calls passes becomes minimum; or the traffic on the broad band inter-node transmission lines is equalized (in the step S2704).

Thereafter, the main control unit 141 determines whether or not the required band width calculated in accordance with the attribute of the call can be set to the subsequent transmitting broad band switching node (in the step S2705).

When the required band can be set, the main control unit 141 informs the call control unit 507 of the transmission route.

The call control unit 507 which has been informed of the transmission route generates a transmission route setting cell describing a virtual path identifier (VPI), a virtual channel identifier (VCI), and an ID thereof in accordance with the transmission route on an ATM cell header. Thereafter, the ATM extension line interface unit 131 transmits the transmission route setting cell to the broad band switching inter-node transmission line through the ATM unit switch 110 (in the step S2706). At that time, the call control unit 50 sets a timer t1 for the transmission route setting cell (in the step S2707). It is also possible to build the above mentioned cell by means of the ATM extension line interface 131.

The relaying broad band switching node which has received the cell (in the step S2801) analyzes the contents written in the cell information field (in the step S2802). When this node recognizes that the cell is a transmission route setting cell, it determines whether or not the cell is a transmission route setting request by the process of search base 505, which will be described later, in accordance with the contents of the information field (in the step S2803). When the call is not the transmission route setting request by the search base, the relaying broad band switching node determines whether or not this node is the incoming call node in accordance with the contents of the information field (in the step S2804). When this node is the incoming call node, it determines whether or not the required band width calculated in accordance with the attribute of the call registered when the user requested the call can be set to the subsequent incoming call broad band switching node (in the step S2805). When this node determines that the required band width can be set to the subsequent terminating broad band switching node, it temporarily obtains (widen) the band width and transmits the cell to the subsequent broad band switching node (in the step S2806). In addition, the relaying broad band switching node sets the response timer T1 for the transmission route setting cell (in the step S2807).

Thereafter, the relaying broad band switching nodes successively execute the above mentioned operations. All the relaying broad band switching nodes on the transmission route determine that the required band width can be set.

When the terminating broad band switching node determines that it is the incoming call node (in the step S2804), it checks whether or not the incoming call terminal equipment can accept the call by using the virtual channel identifier (VCI) (in the step S2808). When the incoming call terminal equipment can accept the call, a message of the call acceptance is sent back to the originating call broad band switching node with the ATM cell in the reverse transmission route. Thus, the temporary band width is formally obtained and the transmission route (virtual path) is finally set.

In other words, the response cell representing the call acceptance from the terminating broad band switching node is sent back (in the step S2809). The relaying broad band switching node which have received the response cell (in the step S2810) successively clear the response timer T1 (in the step S2811) and transmit the response cell to the originating call broad band switching node (in the step S2812). The originating call broad band switching node which has received the response cells (in the step S2708) clears the response timer t1 (in the step S2709), analyzes the information of the response cells (in the step S2710), and determines whether or not the transmission route can be set (in the step S2711).

When the transmission route can be set, the originating call broad band switching node transmits the result to the terminal equipment 300 which has transmitted the call request (in the step S2712) and sets the transmission route and formally obtains the band width which has been temporarily obtained (in the step S2713).

On the other hand, when a midway relaying broad band switching node determines that the required band width cannot be accepted, it sends back the result to the originating call broad band switching node by using the ATM cell (in the steps S2813 to S2816). When a relaying broad band switching node gets congestion and thereby delaying the process or it gets defective, since no response is received from the incoming call broad band switching node in a particular time period, the response timer t1 of the originating call broad band switching node times out (in the step S2714).

Thus, when the setting of the transmission route is unsuccessful, each broad band switching node releases the band which has been temporarily obtained and executes the table search by means of the process of procedure base 502 (in the step S2715). When there is another registered transmission route, each broad band switching node attempts to set a transmission route in the above mentioned manner.

When the setting of all the transmission routes is unsuccessful (in the step S2715), the level of the intelligent inference mechanism 500 is lowered by one and the inference of knowledge base 503, which is the second means, is executed.

The inference of knowledge base 503 infers a new transmission route in accordance with the knowledge base for the periodical fluctuation of traffic registered in the data base, the detection and estimation of defects, the equalization of traffic in the entire network, the deletion of the number of relaying nodes, the through-put characteristic, and so forth. Thereafter, the inference of knowledge base 503 informs the call control unit 507 of the result. Thereafter, the call control unit 507 attempts to set a transmission route in the above mentioned manner (in the steps S2716 to S2728).

When the setting of the transmission route is unsuccessful in the above mentioned attempt, the level of the inference depth is further lowered by one and the inference of case base 504, which is the third means, is executed.

The inference of case base 504 has a data base registering past unsuccessful cases and past successful cases. The inference of case base 504 infers at least one new transmission route which has a higher successful probability than the above mentioned unsuccessful cases and then informs the call control unit 507 of the result. The call control unit 507 attempts to set a transmission route (in the steps S2729 to S2741).

When the setting of the transmission route is unsuccessful with the above mentioned attempt, the process of search base 505, which is the fourth means, is executed.

The search base process 505 commands the call control unit 507 to attempt to set a transmission route for all considerable transmission routes other than those which were unsuccessful (for example, in accordance with the number of maximum relaying nodes, the searching range can be narrowed).

The call control unit 507 transmits a transmission route setting cell to a plurality of transmission routes being commanded nearly at the same time (in the steps S2742 to S2753). The incoming call broad band switching node uses for example the cell which arrived first in the same calls and sends back the response to the originating call node (in the steps S2816 to S2825).

When the setting of the transmission route is unsuccessful with the above mentioned attempt, the call control unit 507 informs the call requesting terminal equipment 300 that the call setting is invalid (in the steps S2754 to S2757).

The unsuccessful attempts are registered in the data base. After the same unsuccessful attempts of other calls are made and successful attempts are made in various conditions (for example, time zone), the learning function 506 updates the data bases used for the process and inference so as to prevent the same unsuccessful attempts from being made (in the steps S2758 to S2765, S2826, and S2827).

In the above construction, the relaying nodes are inquired in succession along the route. Nevertheless, as was described above, when the system is started up, routes are set among all the nodes. Thus, when a plurality of routes are used and the broad band switching nodes are inquired in parallel, a transmission route can be more quickly set than the above mentioned manner.

In the above construction, whenever a call is made, a route is set. When a virtual path having a broad band in which a plurality of calls can be passed is set and the calls are accepted in the virtual path, a desired call can be more quickly established than the above mentioned construction. Likewise, the longer the virtual path is used, the more the band of the virtual path becomes suitable because of the learning function 506. Thus, the operating efficiency of the broad band inter-node transmission line can be improved.

On the other hand, as the result of inquiry to the broad band switching nodes, even if the setting of a transmission route becomes valid, when particular conditions are not satisfied, namely, the traffic of a particular broad band inter-node transmission line becomes abnormally high in comparison with other transmission lines, it is possible to assume that the setting of the transmission line is unsuccessful and to attempt to set another route in accordance with the above mentioned steps.

In addition, a plurality of broad band switching nodes send information with respect to the traffic and defects when necessary and it is registered and updated to the data base 501. The information with respect to the traffic and defects may be transmitted periodically and/or when an event meeting a particular condition which remarkably and adversely affects the other takes place, for example, when a call using a large band is set or a defect takes place in the broad band inter-node transmission line.

In the above mentioned construction, a cell which arrived first at the incoming call broad band switching node in a plurality of cells is used. Nevertheless, in the construction where the relaying broad band switching node writes the traffic amount on the broad band inter-node transmission line to the information field of the above mentioned route setting cell, a cell with the least cumulative amount may be selected from those which arrived in a particular time period. As another method, a cell whose average traffic per broad band inter-node transmission line is the minimum may be selected. As another method, by referencing the data base 501, a cell which most equalizes the traffic on all the broad band inter-node transmission line may be selected. As another method, a cell which routes the minimum number of relaying nodes may be selected. Moreover, by a combination of the above mentioned methods, a cell may be selected. Furthermore, it is possible to send back all the above mentioned cells to the originating call broad band switching node so as to select one cell.

The ATM switch unit 110 references the virtual path identifier (VPI) or the virtual channel identifier (VCI) in the header disposed at the beginning of the ATM cell, searches the table, and generates a switching label value. To accomplish such operations, the relationship between the VPI or VCI and the label value should have been registered in the table. As was described above, when the system is started up, the virtual paths are routed among all the nodes. When a transmission route is set, if a label value table has not been registered to each broad band switching node, the node should be informed of the label value table so as to set it. (It is possible to directly inform a node to which the route is set of the label value in the broad band switching node. As another method, it is also possible to inform the node of only the route information and to cause the node to convert the information into required data.) These functions may be executed by the call control unit 507.

On the other hand, when the system is started up so as to execute the routing control, if a part of node has a defect and a transmission route cannot be set in the virtual paths among all the nodes being registered, the intelligent inference mechanism 500 may be started up so as to set a new virtual path. After the node recovers from the defect, the virtual path which was used when the system was started up may be restored.

Figure 30A:
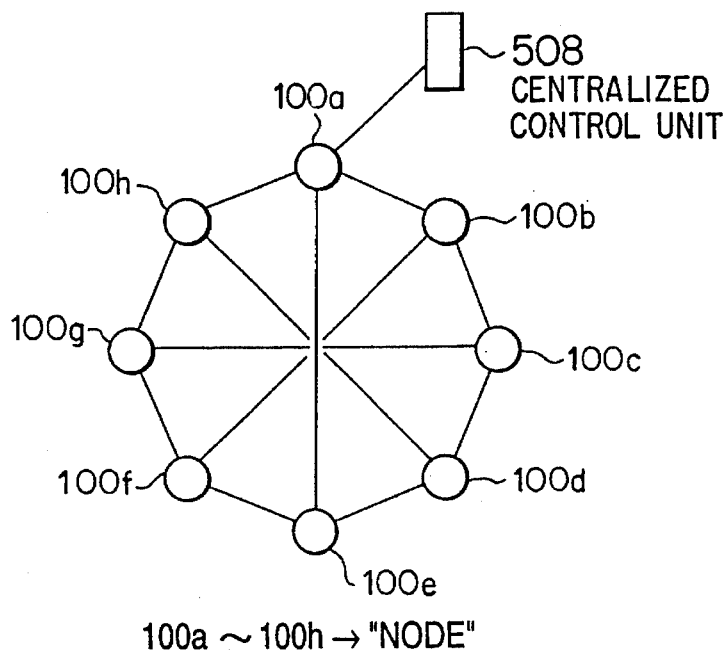
FIGS. 30 (a) to (c) are schematics showing a construction where part of intelligent inference mechanism are provided in an external unit.
Figure 30B:
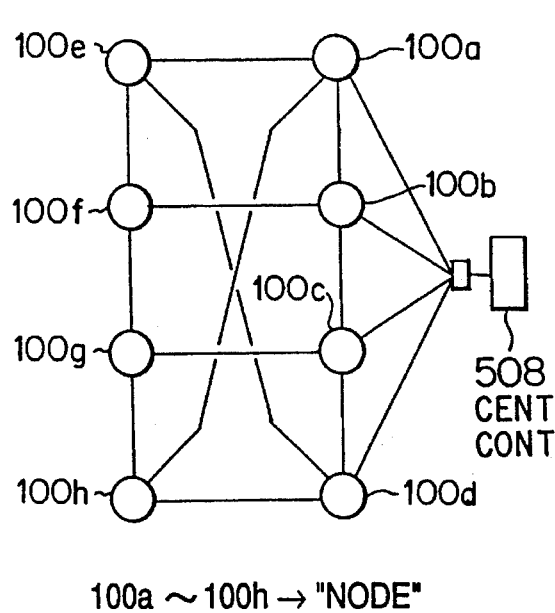
Figure 30C:
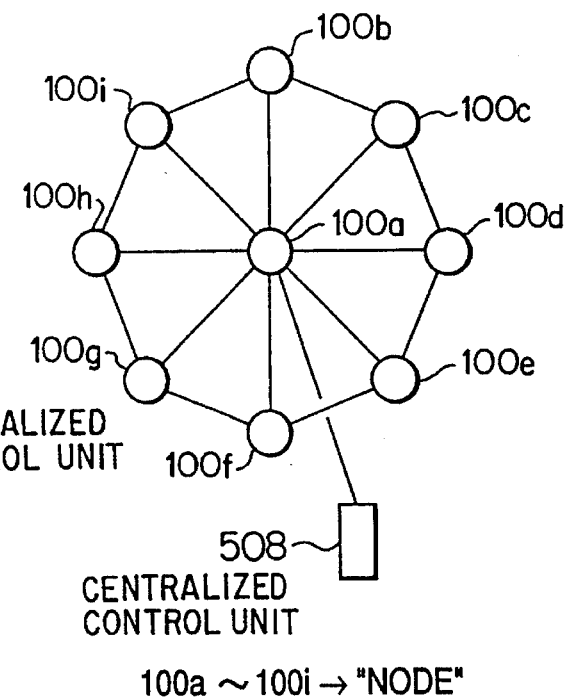

In addition, the first means to the fourth means of the intelligent inference mechanism 500 may be constructed with a combination of at least three means as shown in FIGS. 29 (a) to (d). Moreover, as shown in FIGS. 30 (a) to (c), for example, the first means and the second means may be provided in each broad band switching node, while the third means and the fourth means may be provided in the concentration process unit 508, which is shared by all the broad band switching nodes. Thus, the amount of programs and data bases used in each broad band switching node would be remarkably reduced and the load applied thereto would be decreased. Particularly, in the case where the process load tends to become excessive, as the results of a sequence of processes or inferences from the first means to the fourth means, even if a transmission route is successfully set, as seen in a narrow band ISDN, a timer which is set on a terminal equipment 300 side at each call counts a particular time period and thereby the terminal equipment 300 unilaterally turns off the call. Thus, such a problem may be prevented.

As was described above, according to the routing control of the broad band switching network of the present embodiment, besides maximizing the features of the ATM technology and reducing the load of the call process, the reliability and operability of the broad band switching network can be improved and the routing control with intelligent distribution control can be accomplished with high cost performance.

Figure 31:
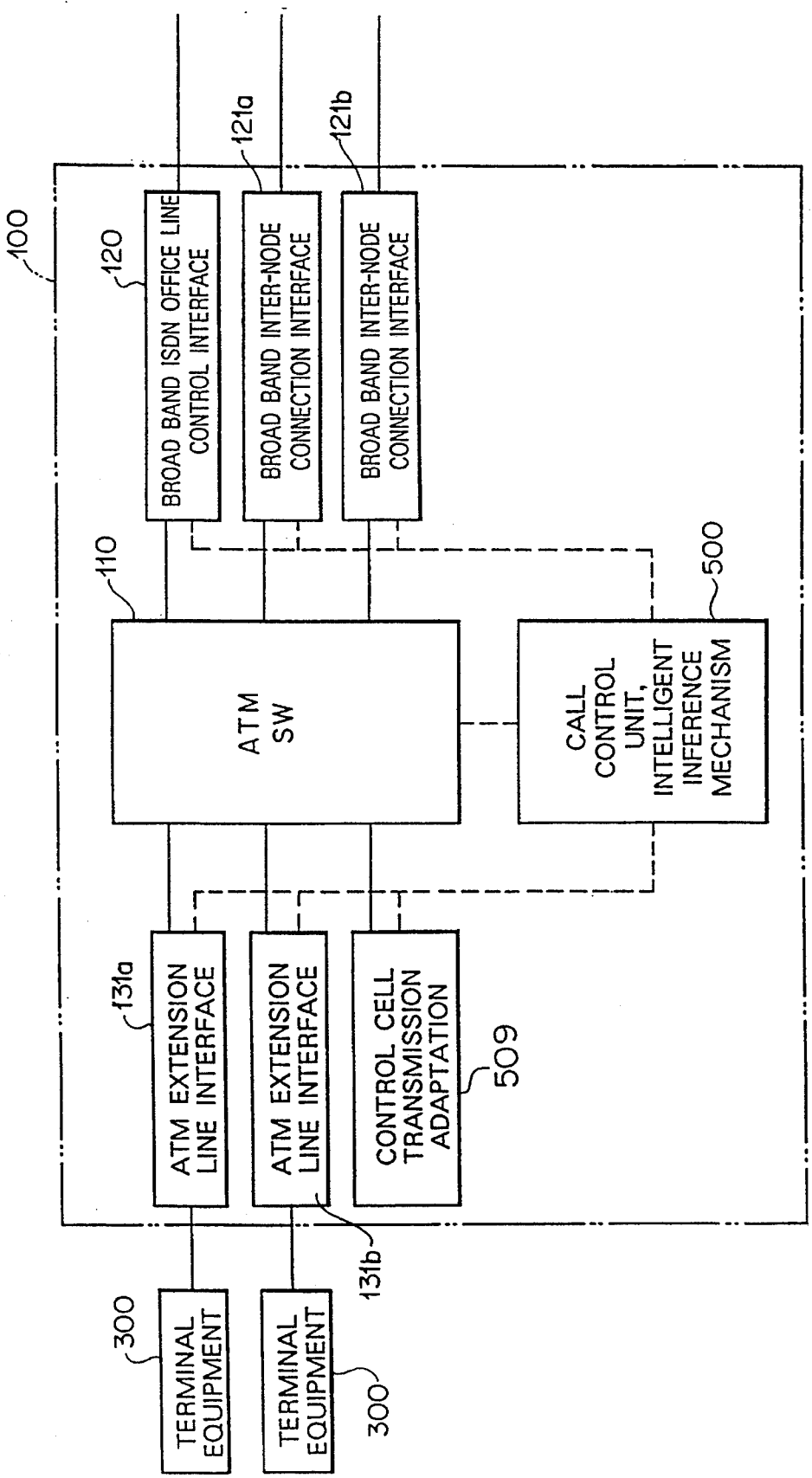
FIG. 31 is a schematic showing another construction of the broad band switching node.

In the above mentioned construction, the ATM extension line interface of the broad band switching nodes is provided with the ATM cell switching function for the call control and the communication control. Nevertheless, as shown in FIG. 31, the switch function may be executed by the ATM switch unit 110. In addition, a control cell transmission adaptation unit 509 (equivalent to reference numeral 141 of FIG. 2) may be provided so as to obtain the same effect.

In addition, as the broad band switching network, for example, as shown in FIG. 8, even if the transmission lines are connected in a grid shape, the present invention may be applied likewise.

In the above mentioned embodiment, the virtual paths are routed among the nodes in the prior condition. Nevertheless, although the function as the virtual paths is substantially provided, the virtual channel identifier (VCI) in the ATM cell may be referenced at each relaying broad band switching node so as to relay and transmit signals to a particular broad band inter-node transmission line.

In short, according to the present invention, a route can be effectively set between particular nodes with the intelligent inference mechanism. Nevertheless, the route does not always strictly conform with the conception of the virtual path.

In the above mentioned embodiments, the intelligent routing control focused on the company use. However, the present invention may be applied for example to an in-company network connected between a public network and a company network.

In addition, the intelligent inference mechanism of the present invention may be applied to various systems in other fields such as diagnosis systems, word processors, and control systems.

Now, a multiple drop connection method of the terminal equipments 300 will be described.

Figure 32A:
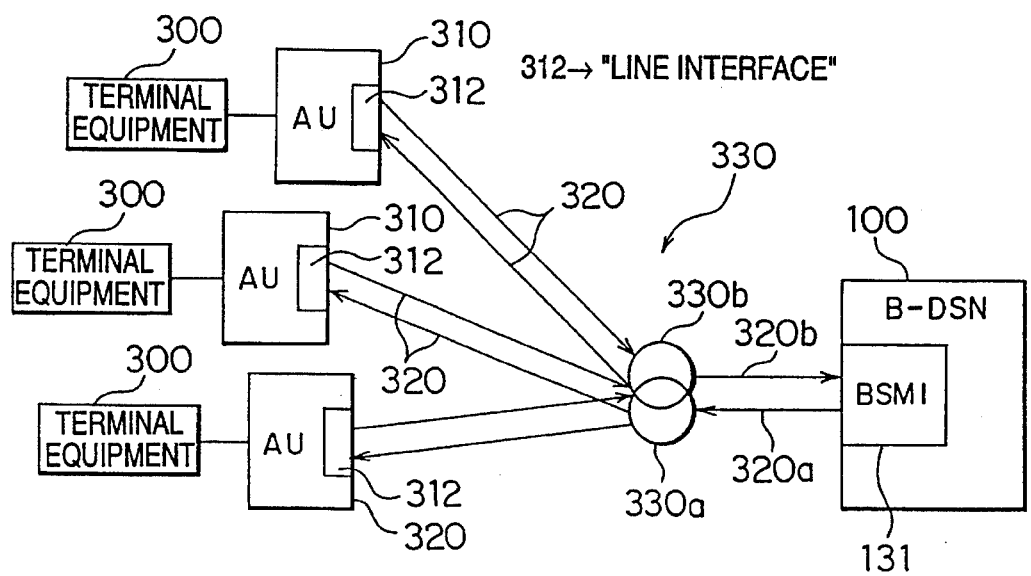
FIGS. 32 (a) and (b) are block diagrams showing a construction of an extension line system.
Figure 32B:
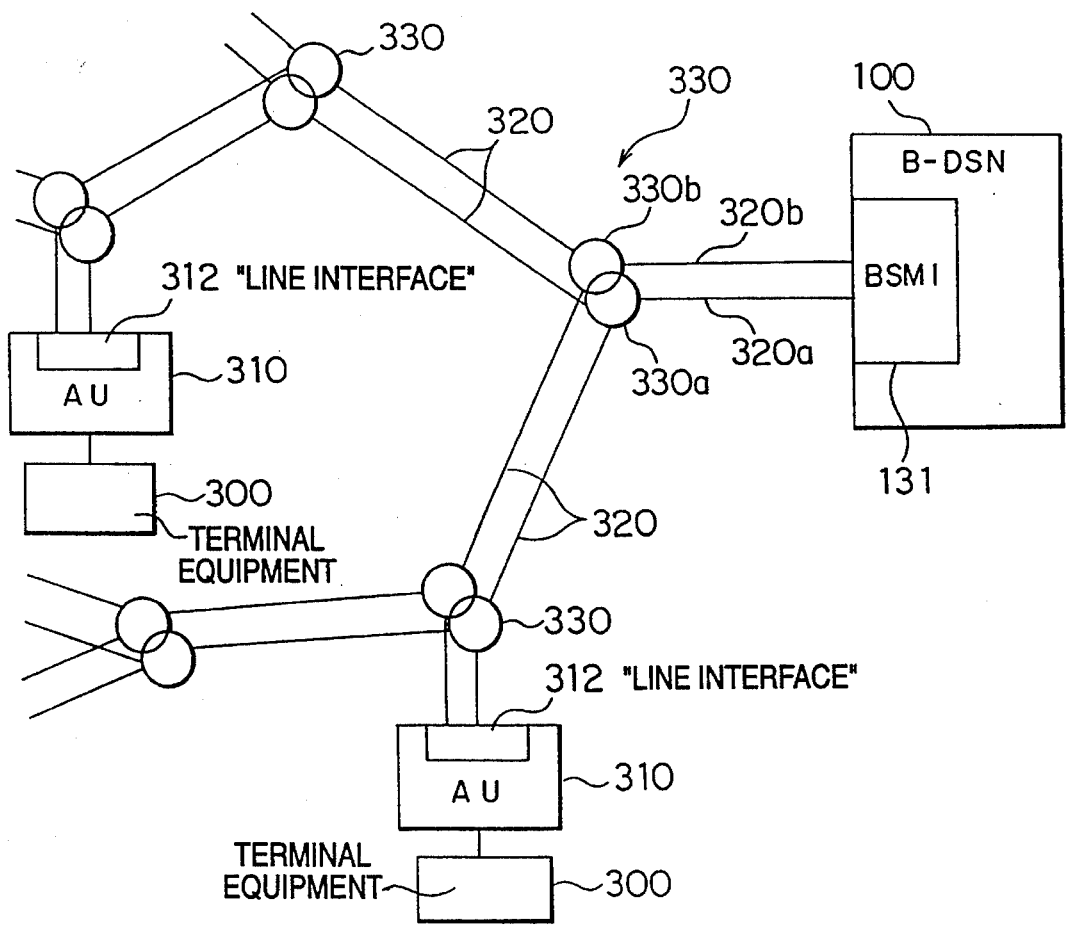

FIG. 32 (*a*) is a block diagram showing an extension line interface in an optical passive star construction. FIG. 32 (*b*) is a block diagram showing an extension line interface constructed with tree type dual transmission lines.

Then, with reference to FIG. 32 (*a*), the multiple drop connection method will be described.

As shown in the figure, the extension line interface is composed of a broad band switching node 100, a broad band extension line interface (hereinafter named BSMI) 131, terminal equipments 300, AU's (access units) 310, optical fiber transmission lines 320, and a star coupler 330.

The BSMI 131 is a control unit for bidirectionaly communicating with the DSN 100 where the terminal equipments 300 are connected to a bus or in the star shape.

The terminal equipment (TE) 300 is for example a telephone unit or a facsimile unit.

The AU 310 is an access control unit accommodating a broad band multiplexing extension line interface 312 for making bidirectional communication along with the BSMI 131 (although the function equivalent to the AU 310 may be accommodated in the terminal equipment 300, it is generally referred to as the AU 310).

The optical fiber transmission line 320 connects the BSMI 131 and the AU 310 with optical signals. In this construction, to accomplish the bidirectional and simultaneous transmission, up line and down line are independently provided.

The star coupler 330 distributes and combines the optical signals transmitted through the optical fiber transmission line 320. Reference numeral 330*a* is a dedicated down line star coupler, while reference numeral 330*b* is a dedicated up line star coupler. The number of terminal equipments 300 which can be connected to one star coupler 330 depends on the performance of a light emitting device, a light receiving device, and optical fiber cable which are used for transmitting and receiving optical signals.

In the construction described in the following, it is assumed that the light emitting device is a low output LD (Laser Diode) and the maximum number of terminal equipments connectable is 32.

A down line optical signal transmitted from the BSMI 131 is input to the star coupler 330*a* through the optical fiber cable 320*a*. The star coupler 330*a* distributes the optical signal and then transmits it to each AU 310 at the same time. In other words, a so-called broadcasting communication takes place.

On the other hand, up line optical signals transmitted from the AU's 310 are combined by the star coupler 330*b* having a directive coupler and then input to the BSMI 131 through the optical fiber 320*b*.

Thus, in the above mentioned construction, when the AU's 310 individually transmit signals, they may collide each other. In addition, depending on the difference of the transmission delay times due to the difference of the length of the transmission lines, the signal may collide. To prevent that, with respect to the down line signals, access control consisting of transmission delay control and time slot control should be executed.

Figure 33A:
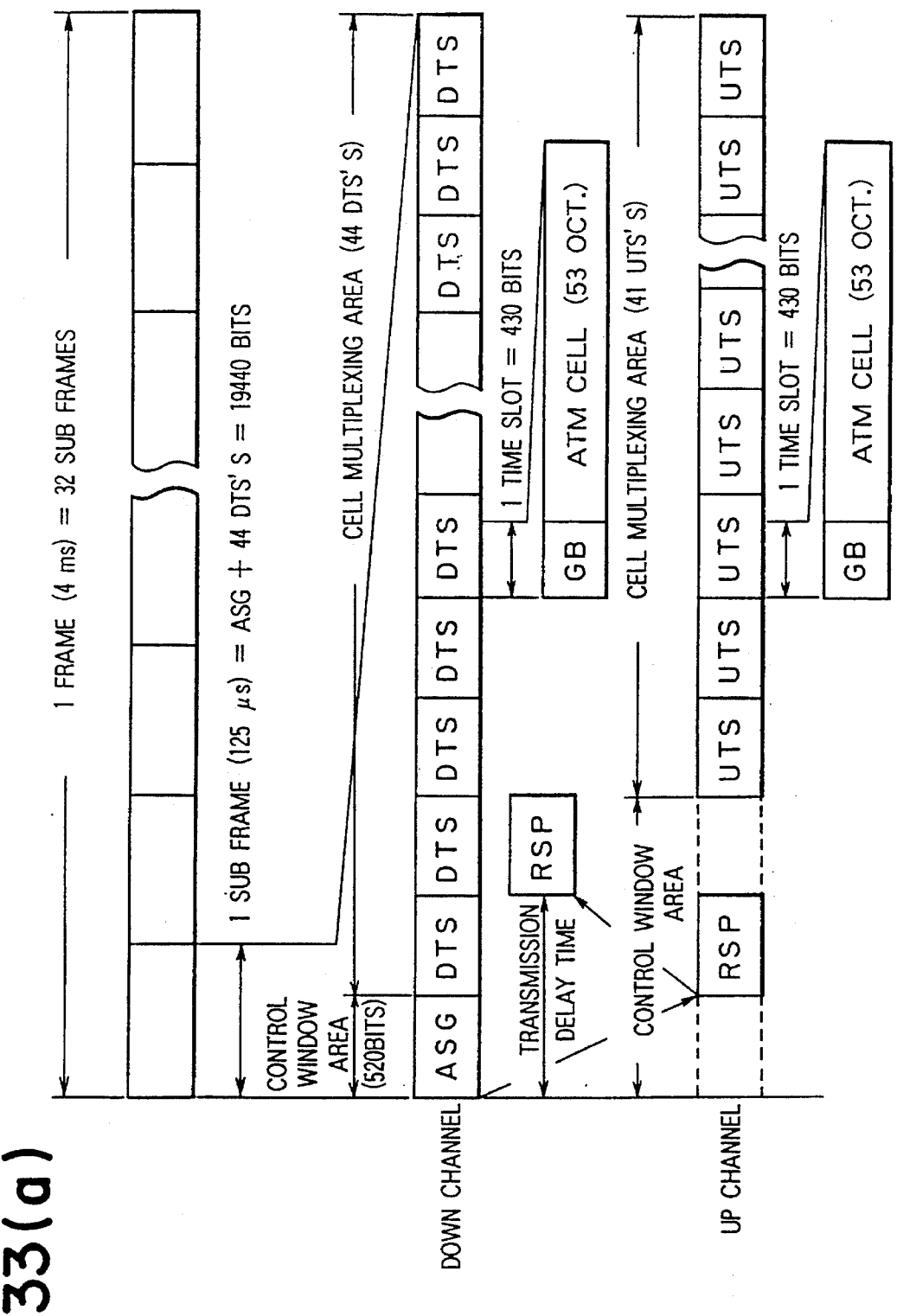
FIGS. 33 (a) and (b) are schematics describing a construction of a frame with respect to access control in the extension line system.
Figure 33B:
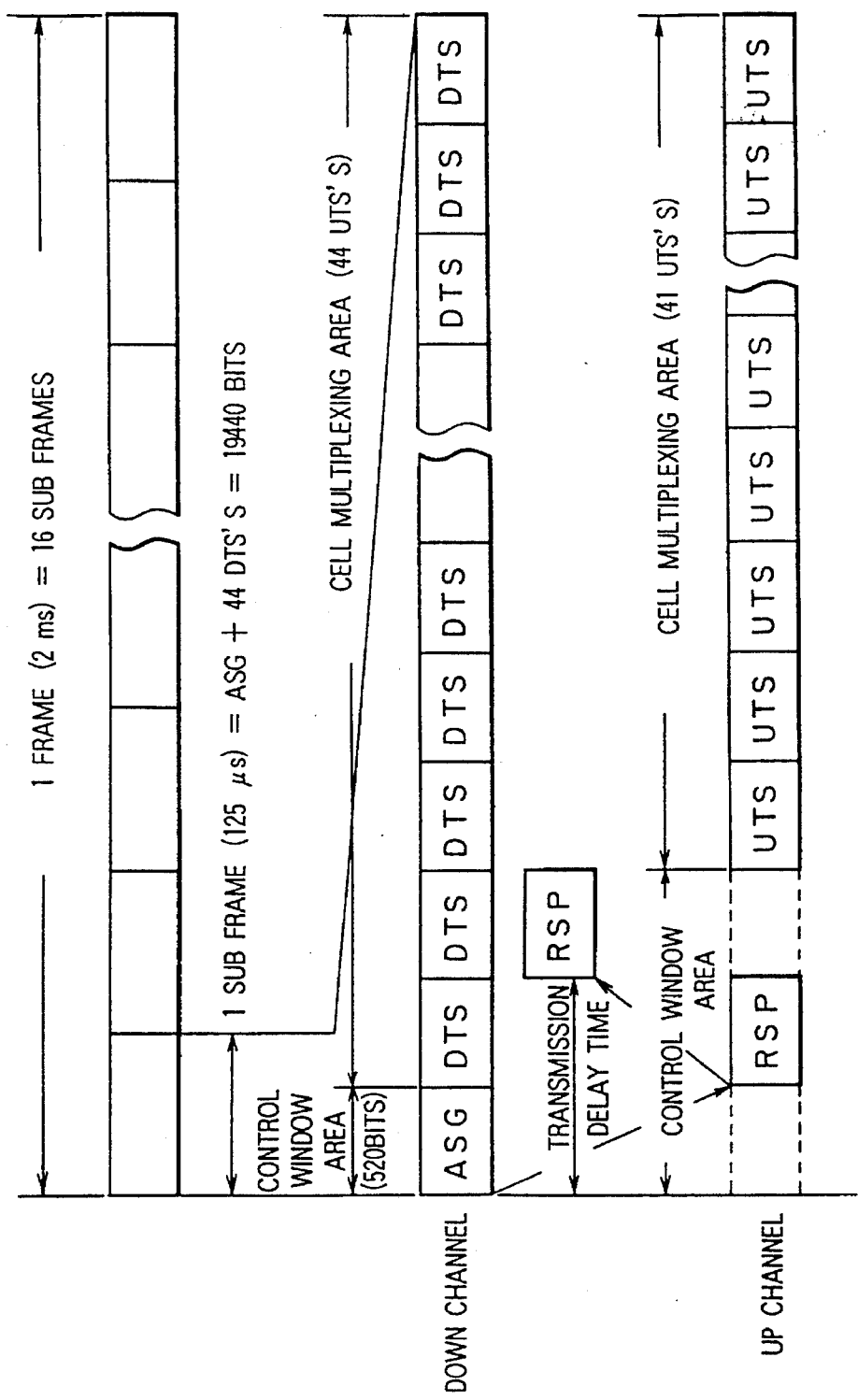

Now, the access control method according to the present embodiment will be described. FIG. 33 (*a*) is a schematic showing a construction of a frame describing the access control method according to the present invention. In the construction described in the following, it is assumed that the transmission rate is 155.52 Mbps by considering the conformity with the broad band ISDN.

As shown in the figure, it is also assumed that the frame period of the access control method is 4 ms, during which 32 sub frames are formed. The period of each sub frame is 125 us. Each sub frame is composed of 19440 bits.

FIG. 33 (*b*) is a schematic showing an embodiment where the period of one frame is 2 ms and the number of sub frames is 16. The access control method shown in FIG. 33 (*a*) is the same as that shown in FIG. 33 (*b*) except that the maximum number of AU's 310 or terminal equipments 300 connectable of the former is 32 and that of the latter is 16. In the following, with reference to FIG. 33 (*a*), the access control method will be described.

A sub frame of the down line is composed of a control window area consisting of an ASG (Assignment) signal for executing the transmission delay control and the time slot control and a cell multiplexing area consisting of 44 DTS's (Downlink Time Slot) for transmitting information. The ASG and the DTS are composed of 520 bits and 430 bits, respectively.

In addition, the ASG is transmitted to each AU 310 for each sub frame. Thus, with one frame, ASG is transmitted to all the AU's 310.

A sub frame of the up line is composed of a control window area consisting of an RSP (Response) signal transmitted from the AU 310 in accordance with the ASG signal and a cell multiplexing area consisting of 41 UTS's (Uplink Time Slots) for transmitting information. The RSP is composed of 128 bits, while the UTS is composed of 430 bits, which is the same as the DTS signal.

In the above mentioned manner, the conformity where each of UTS and DTS is completely filled in the ATM cell is being studied by CCITT.

FIG. 34 is a schematic showing a construction of UTS and DTS.

To securely separate each time slot, a 6-bit guard bit is provided at the beginning thereof. The guard bit is followed by an area of 53 octets for the ATM cell (53 octets×8 bits=424 bits).

FIG. 35 is a schematic showing a construction of ASG.

As shown in the figure, the ASG signal is composed of an SYN (Synchronous) portion for establishing the synchronization of sub frames; a TEI (Terminal Equipment Identifier) portion for designating the address of the ASG signal, that is, an AU 310 to receive the ASG signal; a DTC (Delay Time Control) portion for transmitting delay control data; an LVC (Level Control) portion for compensating a drop of the signal level on a transmission line; a TSI (Time Slot Indication) portion for designating a time slot available for each AU 310; an RTEI (Request TEI) portion for designating a particular AU 310 to send back the RSP; an RES (Reserve) portion reserved for further extension of specification; and a CRC (Cyclic Redundancy Check code) portion for determining whether or not a particular AU 310 correctly receives the ASG signal.

FIG. 36 is a schematic showing a construction of the RSP (Response) signal.

As shown in the figure, the RSP signal is composed of an SYN (Synchronous) portion for establishing the synchronization; a TEI (Terminal Equipment Identifier) portion for allowing the BSMI 131 to identify a terminal equipment 300 which transmitted the RSP; a DTC portion where the DTC portion of the ASG received by the AU 310 is written; an LVC portion where the LVC portion of the ASG being received is written; a TSR (Time Slot Request) portion used for a particular AU 310 to request the permission of using time slots for transmitting information to the BSMI 131; an LVD (Level Control Data) portion where data for detecting the level of a signal arriving at the BSMI 131, for example, a mark signal is present; an RES portion provided for further extension of the specification; and a CRC portion for determining whether or not the BSMI 131 correctly receives the RSP signal.

The DTC portion and the LVC portion are used for the BSMI 131 to check whether the ASG signal has been correctly transmitted from the BSMI 131 to a particular AU 310.

Figure 37:
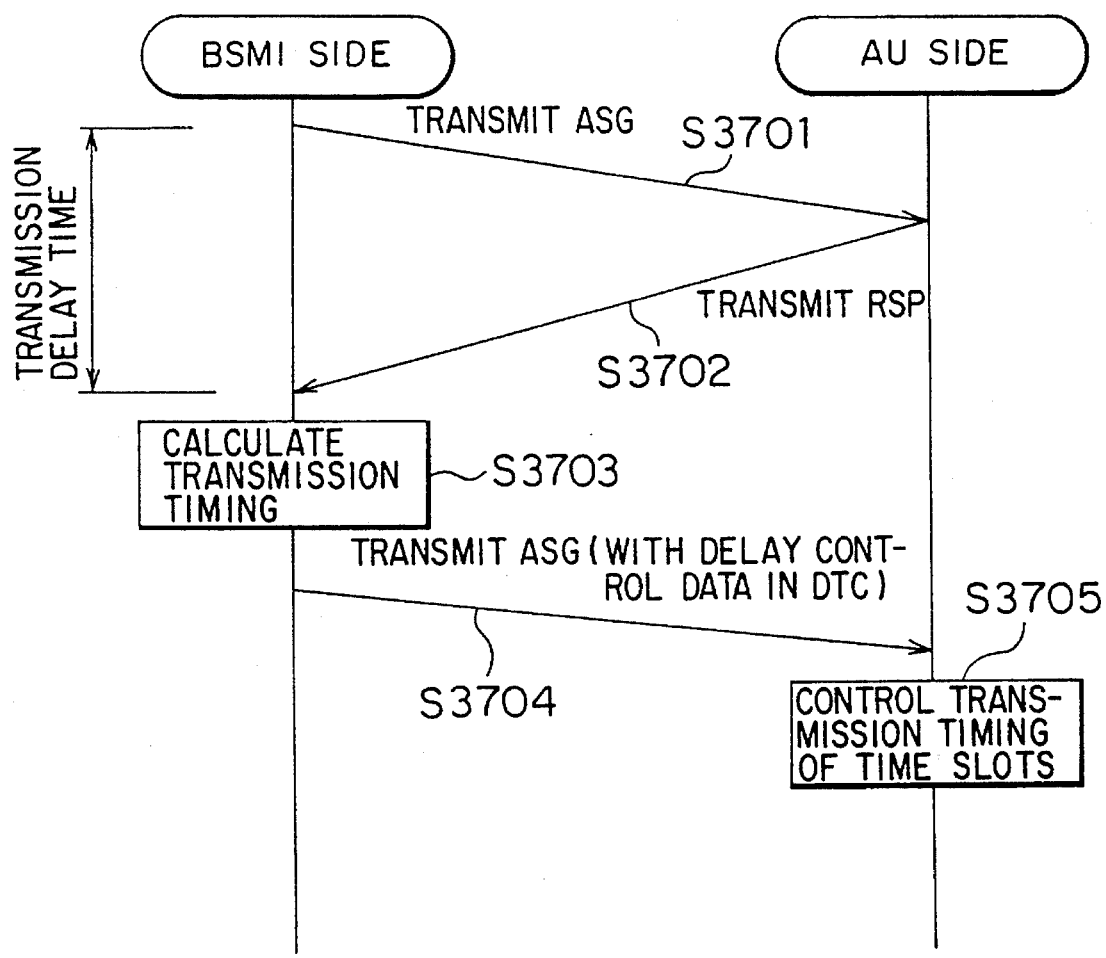
FIG. 37 is a chart showing an operation of transmission delay control of a time slot.

Then, with reference to the timing chart shown in FIG. 37, the delay control against transmission delay on the transmission line will be described.

First, the BSMI (broad band extension line interface) 131 transmits the ASG signal whose TEI portion describes information identifying an AU 310 to be delay controlled to the down line (in the step S3701).

The AU 310 monitors the TEI portion included in the ASG signal transmitted from the BSMI 131. When the AU 310 detects the ASG signal addressed to it, it immediately sends back the RSP signal (in the step S3702).

The BSMI 131 measures a transmission delay time by means of the incoming call timing of the RSP signal sent back from the AU 310. Thus, the transmission timing of the AU 310 where the time slots of the cell multiplexing area can be correctly separated is obtained (in the step S3703).

Thereafter, the data of the transmission timing is written to the DTC portion of the ASC signal of the subsequent frame and then transmitted to the AU 310 (in the step S3704).

The AU 310 reads the DTC portion from the ASG signal addressed to it and then controls the transmission timing of the time slots in accordance with this data (in the step S3705).

In addition, depending on the length of the transmission line, the incoming call timing of the RSP signal sent back from each AU 310 varies. To securely separate the RSP signal from the cell multiplexing area for transmitting information, the control window for the maximum delay time considerable in the system is provided.

With the above mentioned delay control, without a collision of signals transmitted between the BSMI 131 and each AU 310, a bidirectional transmission can be correctly accomplished.

Nevertheless, even with the optical signal transmission line, the signal level is decreased due to losses of the transmission line, photo coupler, and so forth. Normally, the loss of the signal level due to the length of the transmission line is around 1 dB/km. In addition, the loss of the photo coupler deviates for 3 to 4 dB.

Thus, because of the deviation of losses of signal levels due to difference of transmission distances, photo coupler, light emitting device, light receiving device, and so forth, the levels of signals transmitted between the BSMI 131 and each AU 310 deviate each other. When the reception sensitivity of the signals is set in accordance with the minimum level of the received signals, the reception margin becomes insufficient or a particular S/N ratio may not be satisfied. Although it is technically possible to compensate the level difference by varying the reception sensitivity, a precise and expensive AGC (Automatic Gain Control) circuit would be required.

From such a point of view, in this embodiment, by controlling the signal transmission level on the transmission side, the level difference of the received signals of the broad band extension line interface unit (BSMI 131) is compensated. In other words, the levels of signals transmitted from each AU 310 to the broad band extension line interface unit (BSMI 131) are measured. Depending on the measured values, each AU 310 is commanded so as to transmit proper levels of signals.

Figure 38:
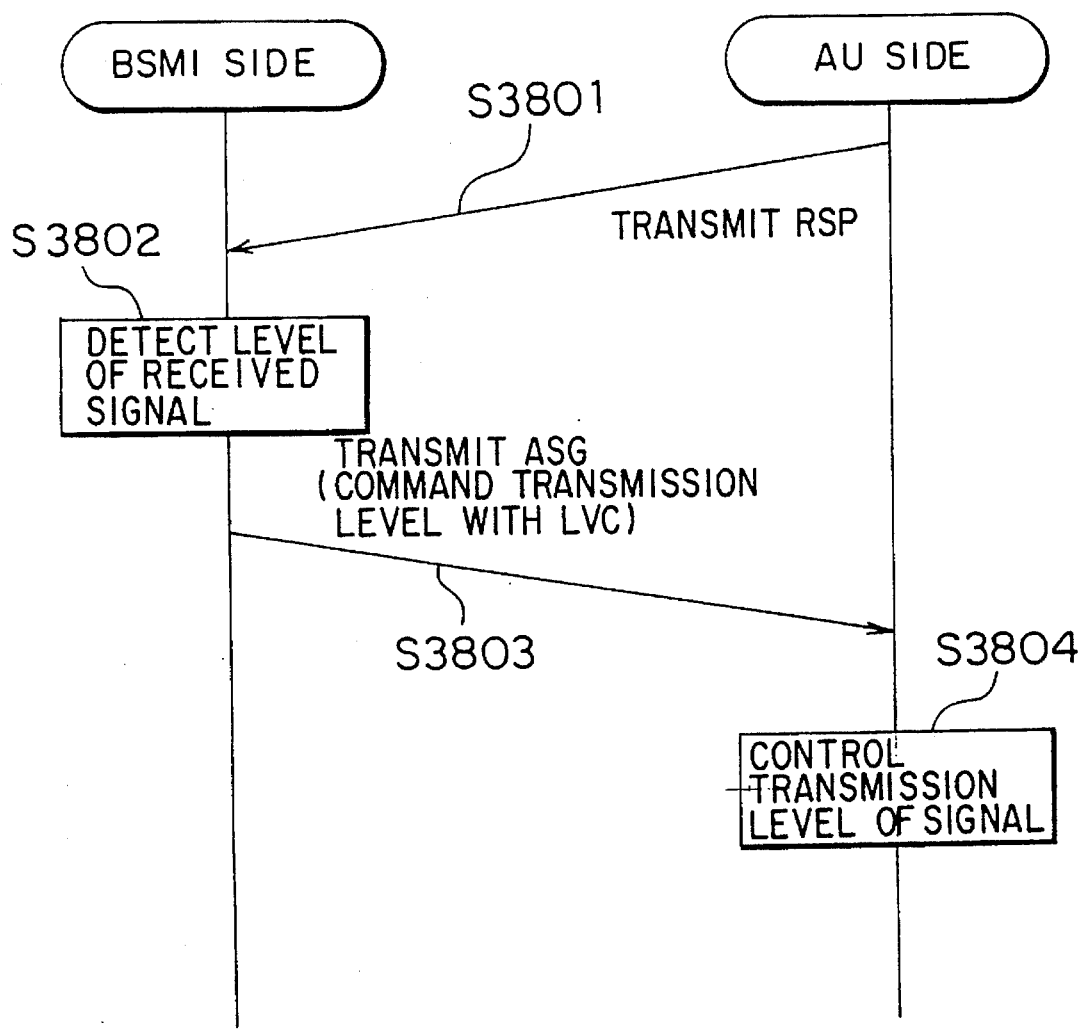
FIG. 38 is a chart showing an operation of signal transmission level control of an AU.

Practically, as shown by the timing chart shown in FIG. 38, a definition signal for measuring the levels of signals is placed in the LVD portion of the RSP signal sent back from a particular AU 310 against the ASG signal transmitted from the BSMI 131 (in the step S3801).

The BSMI 131 which has received the RSP signal detects the signal level of the LVD portion (in the step S3802).

Depending on the detected value, when the level of the received signal is low (high), a command for increasing (decreasing) the signal transmission level is written to the LVC portion of the ASG signal in the subsequent frame and then transmitted to the AU 310 (in the step S3803).

The AU 310 reads the LVC portion from the ASG signal addressed thereto and controls the signal transmission level in accordance with the command (in the step S3804).

Thus, since the signal transmission level is controlled so that the levels of the signals received by the BSMI 131 exceed particular values, a bidirectional transmission line with high quality can be provided.

In the above construction, even if the AU 310 malfunctions in controlling the transmission delay time or signal transmission level or a bit error takes place due to invasion of a noise on the transmission line, at least other AU's 310 are not adversely affected. Thus, in the above mentioned construction, the particular controls can be securely accomplished.

In the conventional phase synchronous bus format, a control equivalent to the above mentioned transmission delay time control is conducted. However, since only two bits are assigned to a signal equivalent to the RSP signal, the center side does not determine from which AU 310 the RSP signal is transmitted. Nevertheless, due to malfunction of AU 310 or the like, another AU 310 which is not commanded from the center may send back the signal equivalent to the RSP. Thus, since the result of the measurement has an error. In addition, even if the center side transmits a designated timing, it may collide with a cell transmitted from another AU 310.

It is clear to say that in the multiple drop connection method, a collision of cells will adversely affect the operation of the entire system. By the present invention, such a problem can be solved. The conception of the present invention is theoretically the same as that of inventions for which the inventors have applied as Japanese Patent Application Serial Nos. SHO 61-85524, SHO 59-268824, and so forth. The difference between them is that in the present invention, the frame construction, signal construction, and so forth are set so as to satisfy the characteristics of the ATM transmission method based on the CCITT recommendation.

In the above mentioned construction, the level control is conducted. Nevertheless, depending on the performance of the light receiving device, photo coupler, and so forth, the level control is not always required.

Figure 39:
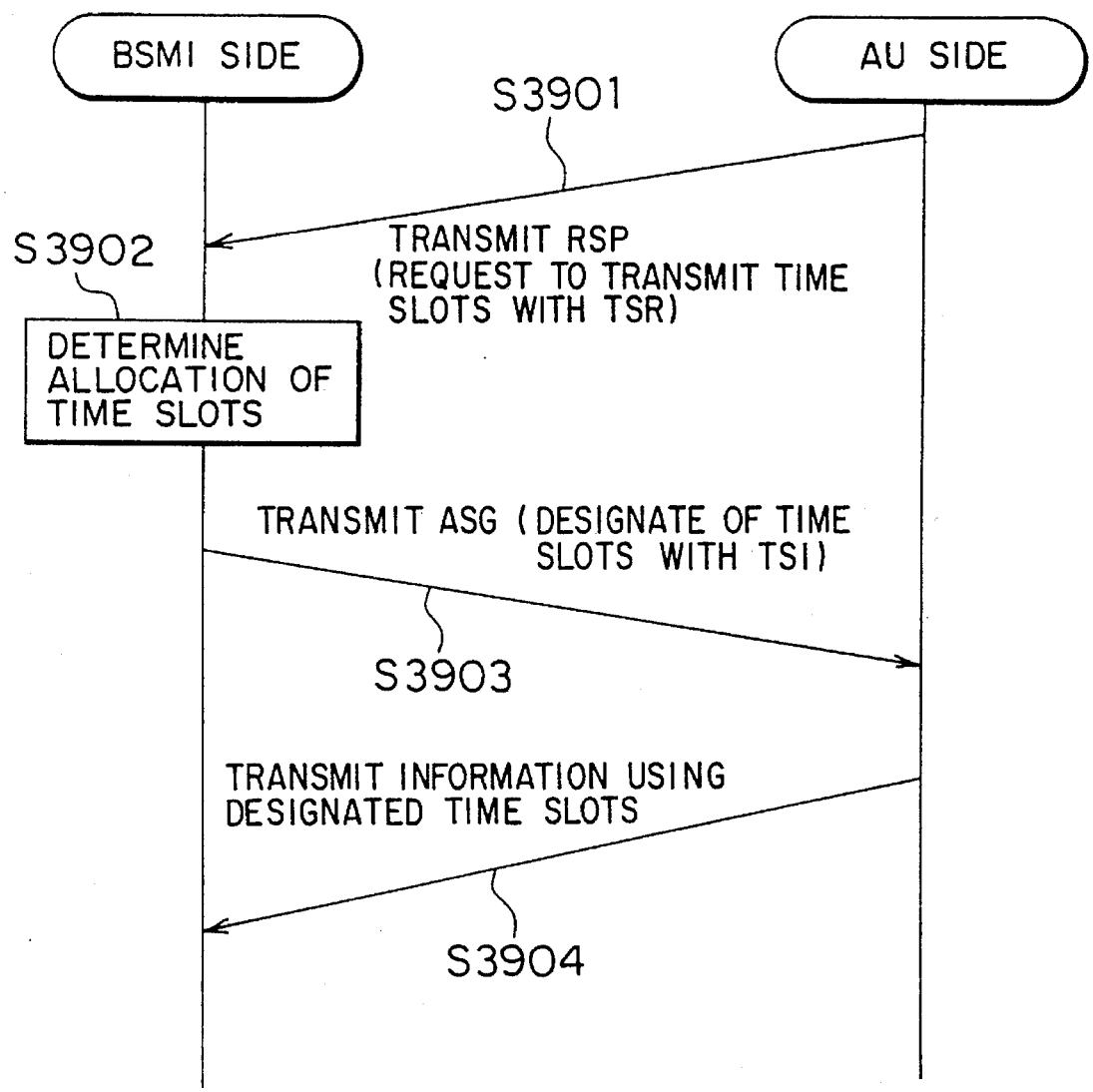
FIG. 39 is a chart showing an operation of a time slot allocation against an information transmission request.

Then, with reference to a time chart shown in FIG. 39, an allocation of time slots for transmitting information which is another problem for accomplishing the access control will be described.

First, with the TSR portion of the RSP signal, the AU 310 side requests the BSMI 131 to transmit information (in the step S3901).

FIGS. 40(a)–40(c) are schematics showing an example of the format of the TSR portion.

In these figures, the request flag is a flag which sets whether or not an AU 310 requires time slots for transmitting information to the BSMI 131. For example, when the AU 310 requires the time slots, "1" in binary is set. In contrast, when the AU 310 does not require the time slots, "0" in binary is set.

The media type represents an attribute of information to be transmitted. For example, with the attribute, sound, data, image, and so forth are categorized. As another categorizing method, for example, with the attribute, the types of the terminal equipment 300 are categorized as facsimile, personal computer, TV telephone, HDTV, and so forth. These categorized items are represented by using binary codes. This information is used for discarding a cell and for controlling the traffic at a broad band node 100 accommodating the BSMI 131.

The peak traffic amount represents the maximum information transmission amount in a unit time of the AU 310. This data serves to determine how many channels and time slots the BSMI 131 has to use for a particular AU 310.

The average traffic amount represents the average information transmission amount of a particular AU 310. This data is used for the BSMI 131 to know the required number of channels along with the peak traffic amount.

The precedence control information is used for the BSMI 131 to determine whether or not it obtains channels with a high precedence for a particular AU 310 when a traffic congestion takes place. As the precedence control information, for example, a plurality of levels are provided. The precedence of a sound transmission with a strict requirement against transmission data may become high.

When the RSP signal including the information with respect to the above mentioned information transmission request is transmitted from a particular AU 310 to the BSMI 131, time slots are allocated to the AU 310 in accordance with required conditions of the TSR portion of the RSP signal and with the operating state of the present time slots (in the step S3902).

In this case, as shown in FIG. 40 (b), the used time slots in the past have been recorded. When an information transmission request is made, the required conditions and the past record are compared. With reference to the result, the number of time slots may be allocated for the successive frames.

In addition, as shown in FIG. 40 (c), the data amount stored in the buffer memory of a particular AU 310 or a particular terminal equipment 300 may be added to the TSR signal so as to use it as reference data for allocating a time slot in the BSMI 131.

In accordance with the above mentioned various conditions, the number of time slots is allocated to a particular AU 310 requesting information transmission.

The result of the allocation of the time slot is added to the TSI portion of the ASG signal in the subsequent frame to be transmitted to the AU 310 (in the step S3903).

Figure 41:
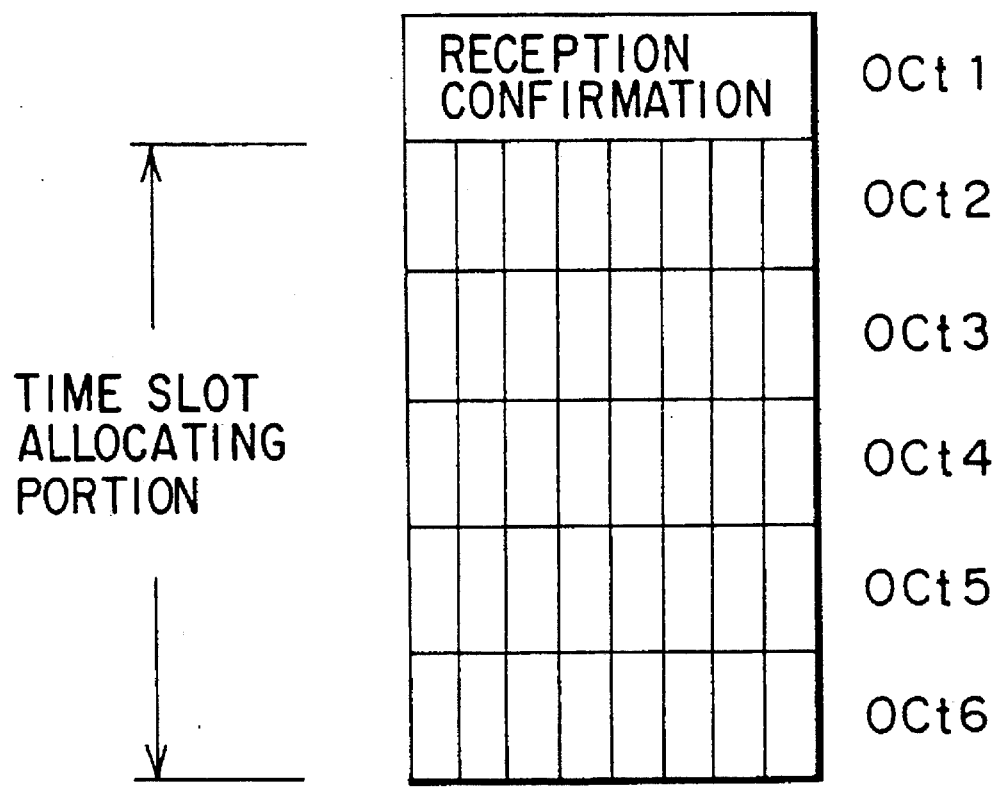
FIG. 41 is a schematic showing a format of TSI.

FIG. 41 is a schematic showing the format of TSI.

The reception confirmation represents whether or not the BSMI 131 permits the allocation of a time slot. When there is no properly empty time slot against a request from a particular AU 310, the BSMI 131 informs the AU 310 of a rejection of allocation. In this case, if necessary, the AU 310 which had the rejection of allocation may issues an information transmission request when it transmits the next RSP signal. In contrast, when the time slot allocation is valid, the AU 310 is informed of the available position of a time slot with the time slot allocating portion. In this construction, since the number of time slots is 41, with six octets (48 bits), the available position of a time slot is represented in a bit map format. At that time, depending on the traffic amount requested, a plurality of time slots may be allocated.

When the valid position of the time slot has been allocated with the TSI portion of the ASG signal to the AU 310, it transmits information to the allocated time slot (in the step S3904). When there is no more information to be transmitted, the request flag of the TSR portion in the RSP signal is turned off (the bit is set to "0" in binary) and then the BSMI 131 is informed of it.

In the above mentioned construction, the same time slot is allocated in each sub frame during one frame period. Nevertheless, it is also possible to allocate time slots which differ in each sub frame.

Figure 42A:
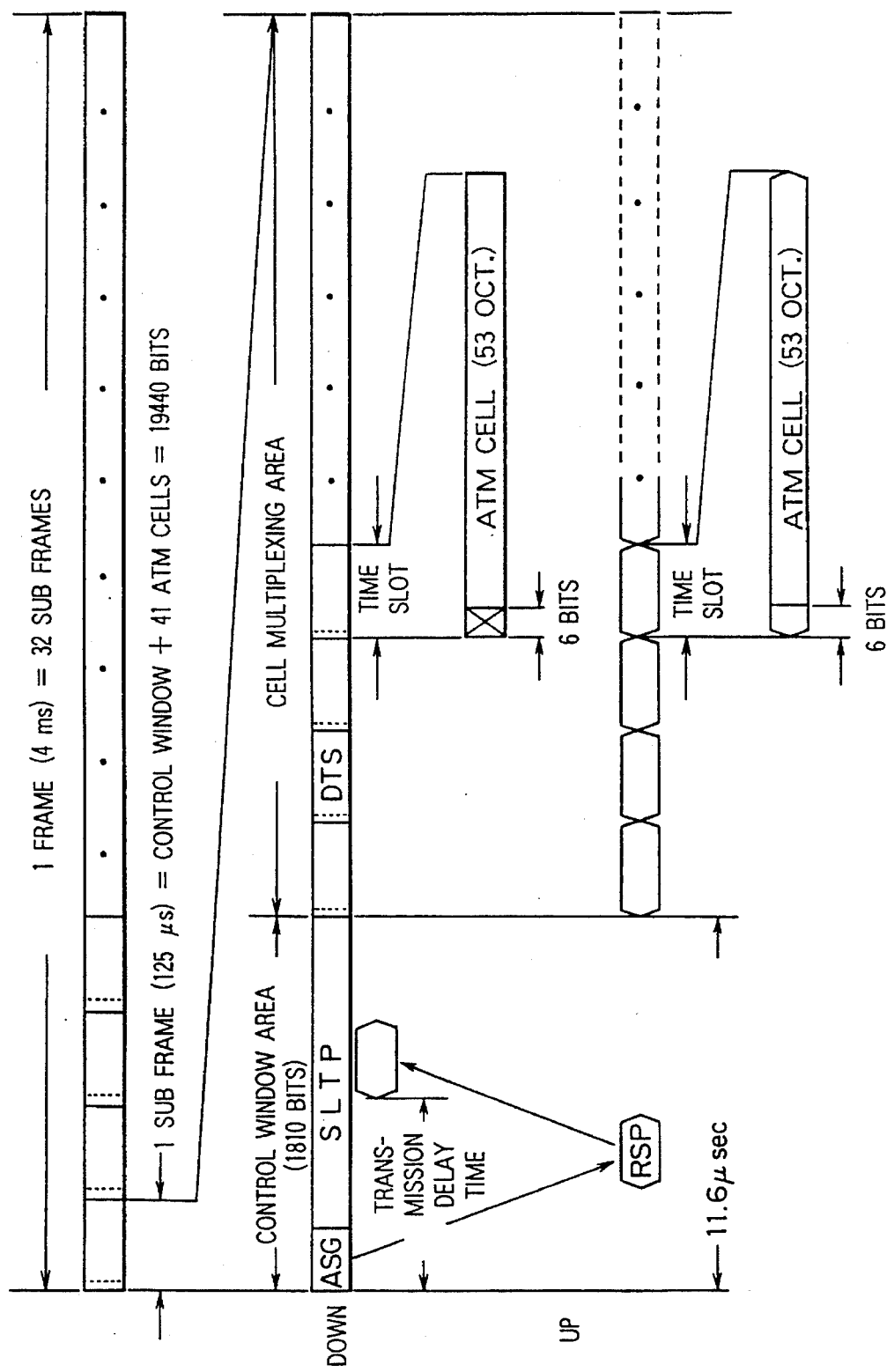
FIGS. 42 (a) and (b) are schematics showing a structure of a frame in the embodiment where time slots are dynamically allocated.
Figure 42B:
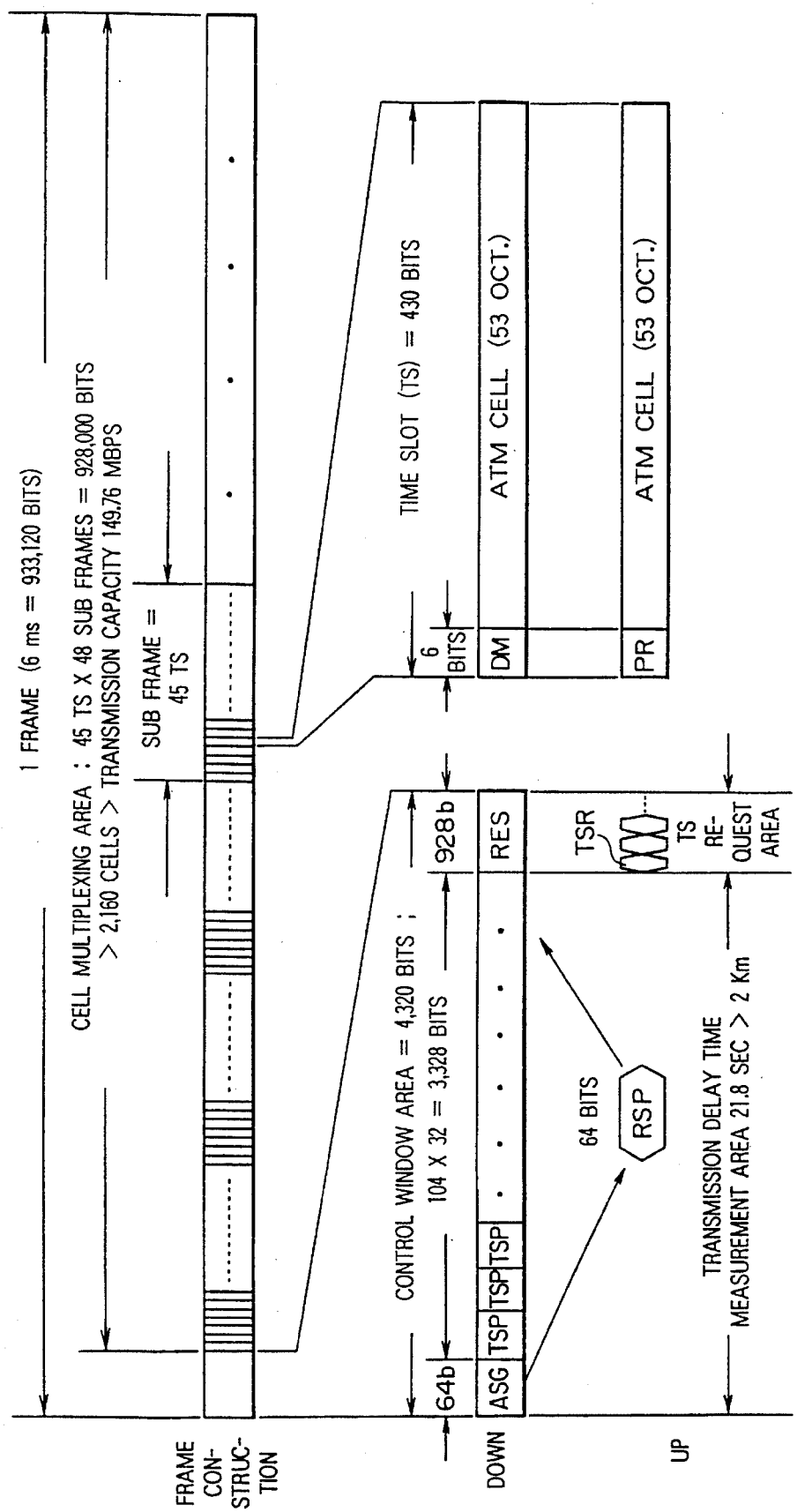

With reference to FIG. 42 (a), this construction will be described.

In comparison with the construction shown in FIG. 33 (a) where the same time slot is fixedly allocated in sub frames, the feature of the construction shown in FIG. 42 (a) is that in the down line sub frame format the ASG signal is followed by an SLTP (time slot allocation map) rather than the time slots for transmitting information (DTS).

The SLTP is used to allocate both the sub frame position during one frame period and the time slot position in each sub frame.

During one frame period, there are 32 sub frames. When it is assumed that each sub frame consists of 41 time slots, the number of time slots during one frame period becomes 32×41=1312. Thus, if at least 1312 bits of 1810 bits of the control window area are allocated to the SLTP, the time slots can be dynamically allocated in the bit map method.

Then, with reference to FIG. 42 (b), another frame construction will be described.

As shown in the figure, the length of one frame is 6 ms, that is, 933,120 bits, where the 4,420 bits are used as a control window area and the remaining bits are used as a cell multiplexing area.

The control window area of the down channel is composed of an ASG signal of 64 bits with the above mentioned function; a TSP portion of 104 bits×32 for representing the allocation of time slots in the bit map format; and an RES portion of 924 bits for maintenance and extension. The TSP portion has words for allocating in a bit map format sub frame positions and time slot positions in sub frames where the maximum number of terminal equipments, namely 32 terminal equipments, can simultaneously transmit.

In the cell multiplexing area, 48 sub frames are multiplexed, each sub frame being composed of 45 time slots, each time slot being composed of 430 bits.

The control window area of the up channel has a time area of 3,392 bits for receiving the RSP signal from each AU 310. Thus, as the maximum length of an extension line, the distance of 2 km or more can be covered, this value being suitable for a normal extension line interface.

The time slot allocation request is issued from each AU 310 by transmitting the TSR (Time Slot Request) signal to the TS (time slot) request area. In the TS request area, 32 TSR signals equivalent to the maximum number of terminal equipments connectable can be transmitted.

Then, an access control method using the above mentioned frame construction will be described.

First, the transmission delay time control and the level control are executed in the following manner.

The BSMI 131 successively accesses and requests each AU 310 to transmit the RSP signal by means of the ASG signal which is transmitted for each frame. Thereafter, the BSMI 131 measures the arrival timing (equivalent to the bidirectional transmission delay time) of the RSP signal sent back from each AU 310 and, if necessary, the level of the received signal. Thus, the BSMI 131 calculates a proper transmission timing and the level of transmission signal for each AU 310. Each AU 310 is informed of the calculated data by means of the ASG signal in the subsequent frame.

Then, the allocation of a time slot will be described.

In each of AU's whose classes ranging from 2 to 4 other than those of the class 1 where the transmission speed allocated by the ATM is fixed, it references the transmission buffer and requests the BSMI 131 to allocate the number of time slots to be used in the subsequent frame by means of the information amount in the transmission buffer. The BSMI 131 allocates the number of time slots available in the subsequent frame by considering the required number of time slots, the attribute of the call being registered when it was set, the actual use in the previous frame, and so forth and allocates time slot positions available for each AU 310 by using the TSP's. Thus, each AU 310 uses the newly designated time slots by the TSP portion of the subsequent frame to transmit information.

In the above mentioned construction, when the number of sub frame available in the TSP portion and the number of time slot in the sub frame is 1, the transmission speed of the information field in the ATM becomes 64 kbps. When the number of sub frames and the number of time slots are allocated 2 and 1, respectively, the transmission rate of the information field becomes 128 kbps. When they are allocated 6 and 1, the transmission speed becomes 384 kbps. When they are allocated 24 and 1, the transmission speed becomes 1.544 Mbps. When they are allocated 48 and 45, the transmission speed becomes 138.24 Mbps. Thus, the above mentioned construction can be easily matched with a narrow band ISDN.

In addition, with reference to FIG. 50, another embodiment of a different frame construction will be described in the following.

Figure 50:
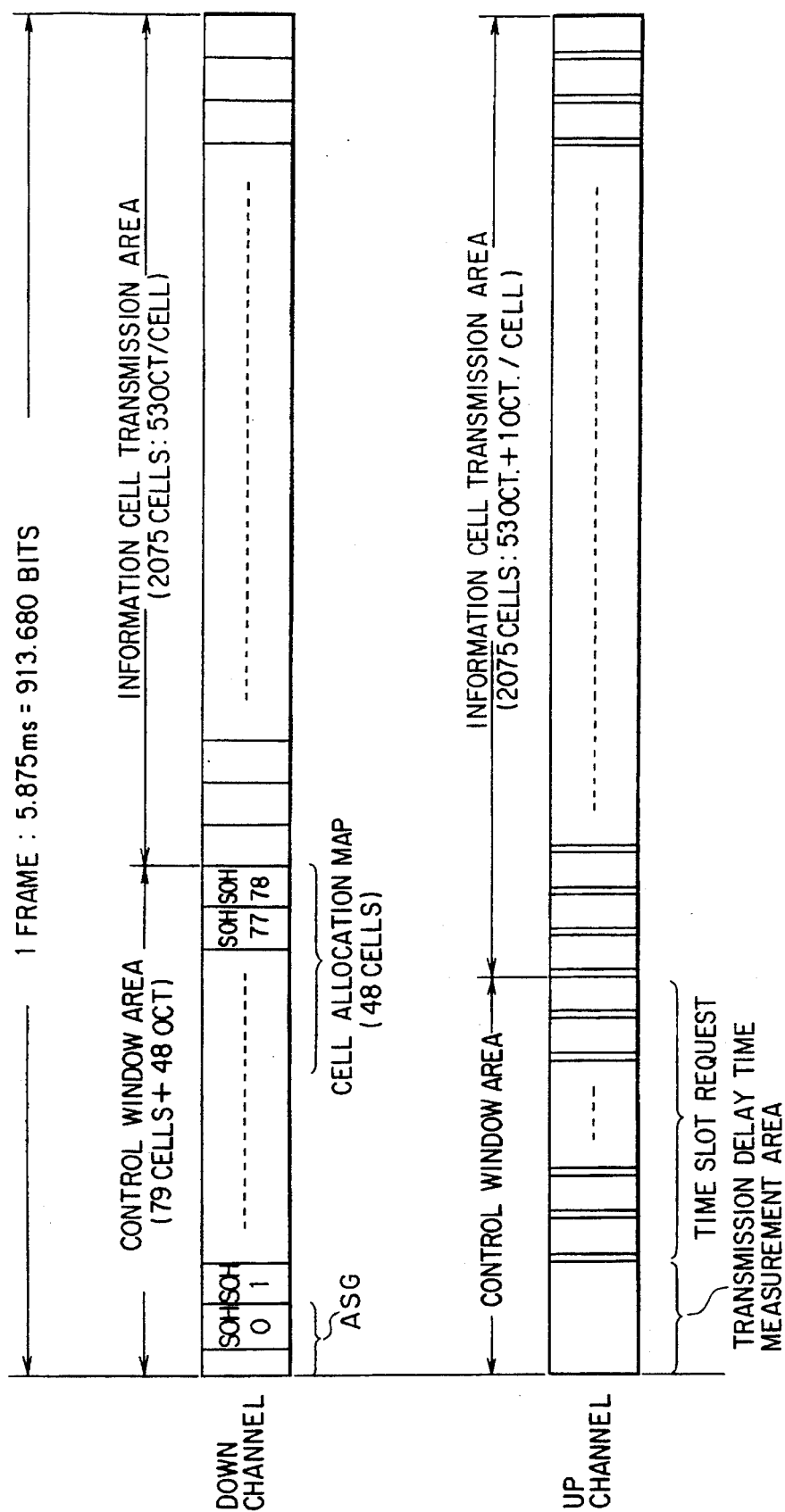
FIG. 50 is a schematic showing a construction of a frame of 5.8755 ms.

In the frame construction shown in FIG. 50, the frame period is 5.875 ms and thereby data of 913,680 bits can be held at a transmission rate of 155.52 Mbps.

As shown in the figure, one frame is composed of a control window area and an information cell transmission area for holding 2075 cells.

In the down channel signal, 879,800 bits of one frame is used as the information cell transmission area for holding 2075 cells in the ATM method. The remaining 33,880 bits are used as the control window area which is composed of 79 SOH's (Section Over Head) with the same length of 53 octets as that in the ATM method (1 octet=8 bits) and the remaining 48 octets. The 48 octets at the beginning of the control window area and one SOH are used to execute the delay control as the ASG signal for example as shown in FIG. 35. The 48 of 79 SOH's are allocated to the cell allocation map for writing cell allocation information used for up to 128 terminal equipments to transmit information cells at the same time. The cell allocation map has the size where information transmission cells can be dynamically allocated to the terminal equipments. In other words, the TEI of a terminal equipment (terminal equipment ID) for allocating a cell is represented with one octet. Thus, the size of the cell allocation map necessary to represent the allocations of all 2075 cells becomes 2075 octets. When 2075 octets are divided by 48 octets which are the length of the information field of SOH, the number of SOH's required becomes 44. However, in this construction, the number of SOH's is set to 48 with allowance.

Then, the frame construction of the up channel signal will be described.

The up channel signal is accessed by a plurality of AU's 310. Thus, to securely separate each cell in the information cell transmission area, a guard bit of one octet is provided for each time slot. Thus, one time slot has 54 octets. In total, 896,400 bits are used. Since the guard bit is set to one octet, each AU 310 and the BSMI 131 can readily process cells.

In addition, the remaining 17,280 bits are used as the control window area. In the area except that used for the time slot request from each AU 310 to the BSMI 131, the RSP signal is sent back and the delay control is executed. When the number of AU's 310 connected to the extension line is up to 32, since the number of SOH's becomes 32, the area for the time slot request uses 32×54 octets×8 bits=13,824 bits. At that time, the remaining area becomes 3,456 bits, which is approx. 22 μs. Thus, the distance of 2 km in the extension line system can be supported. When the number of AU's 310 connected is up to 16, the time slot request uses 16×54 octets×8 bits=1,912 bits. Thus, the distance of 7 km or more in the extension line system can be supported. The available format of the RSP signal sent back in this area is shown in FIG. 36.

In addition, for the time slot request, since one SOH (53 octets) is allocated to each AU 310, even if the AU 310 has a plurality of terminal equipments, each terminal equipment can request and use up to 2075 cells. When the time slot request per terminal equipment has 12 bits, each terminal equipment can request up to 2,075 cells. Thus, in the case of 53 octets (424 bits), up to 35 terminal equipments can be connected.

According to the ATM standardization study recommended by CCITT, in the case of service class 1, the cell information field has a cell order control area of 8 bits. Thus, the real information field becomes 47 octets. In the above mentioned embodiment, where the period of one frame is 5.875 ms, when one cell is transmitted to one frame, the information transmission rate becomes 64 kbps. Thus, the above construction can be satisfactorily matched with the basic interface of a narrow band ISDN.

With the access control as was described above, in the multiple drop connection method, a bidirectional communication can be accomplished.

Then, an embodiment where the period of one frame is varied in accordance with the number of AU's 310 being connected rather than being fixed will be described.

In the above mentioned access control method, an AU 310 allocated with the RTEI portion of the ASG signal transmitted from the BSMI 131 sends back the RSP signal. Thus, it is necessary to transmit the ASG signal in the frame period in accordance with the maximum number of terminal equipments being connected.

Figure 43A:
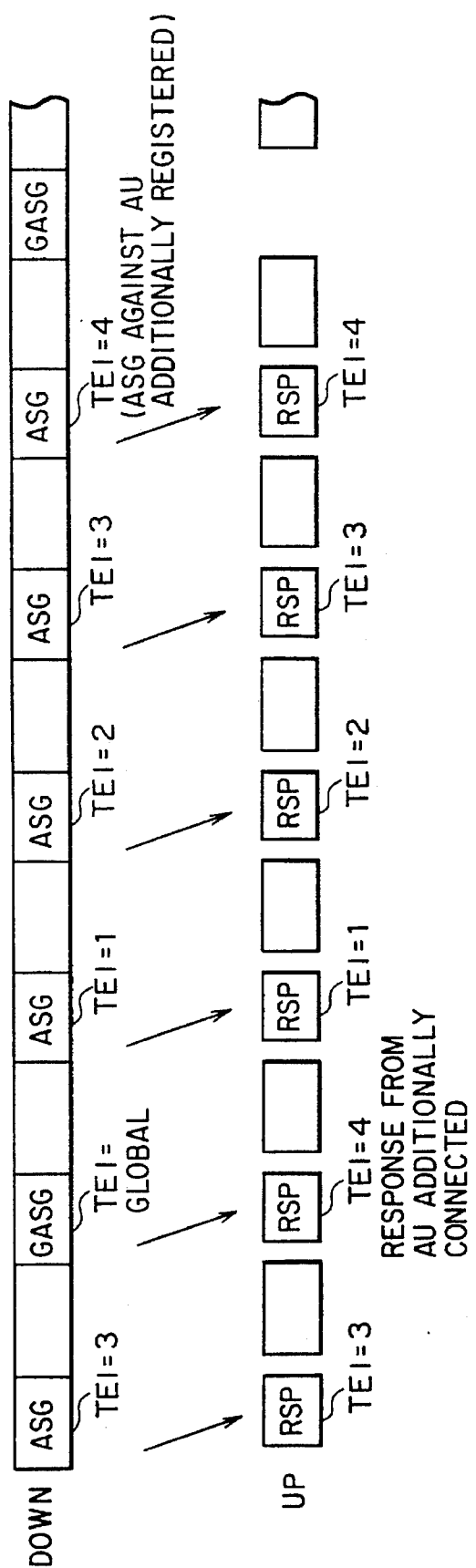
FIG. 43 (a) is a timing chart showing a registration of AU additionally connected by a global ASG.
Figure 43B:
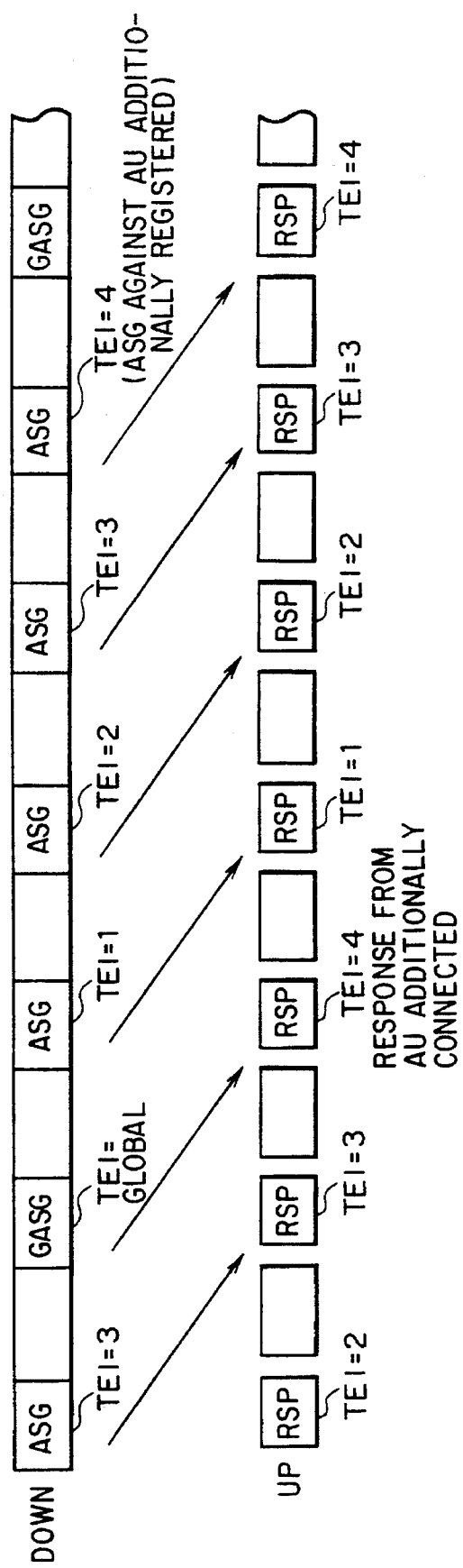
Figure 43C:
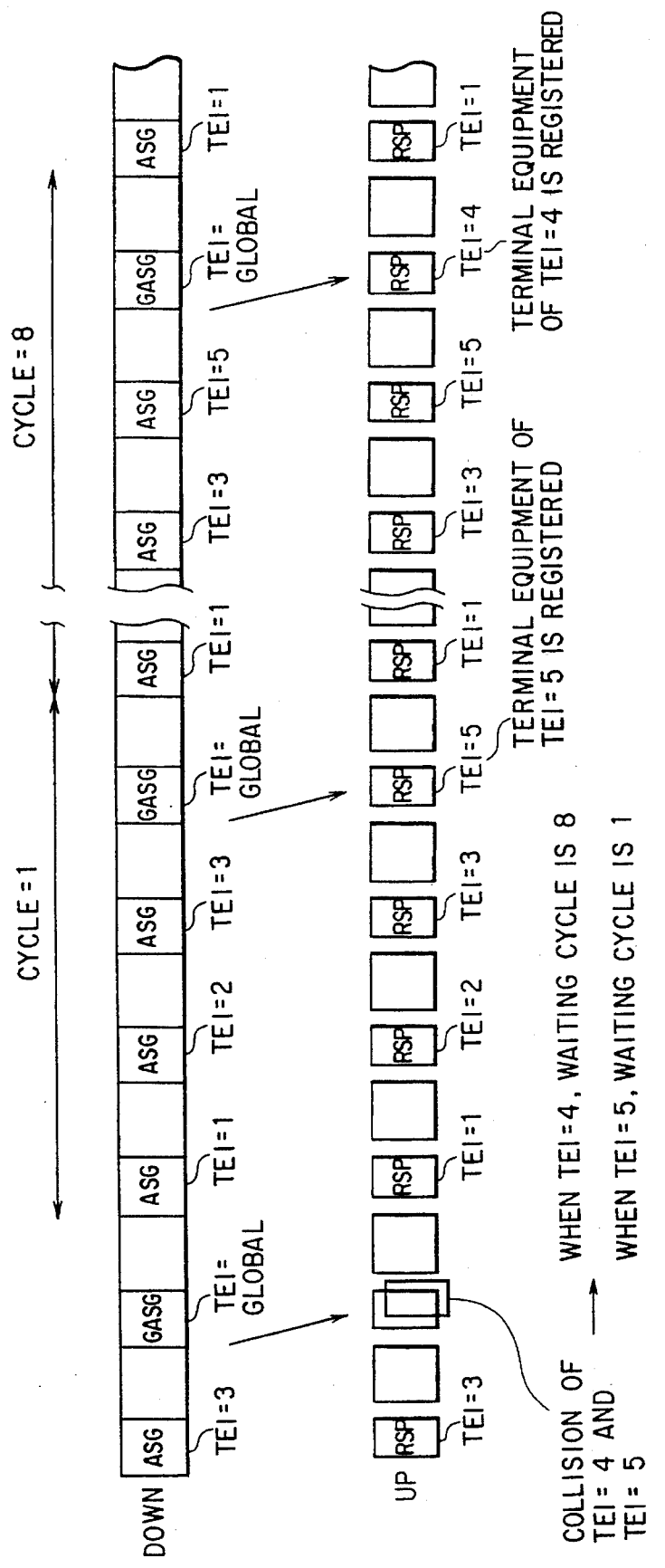

As shown in FIG. 43 (a), after the ASG signal to all the AU's 310 registered has been transmitted (when one cycle is completed, that is, TEI=3), by means of the RTEI portion, the ASG signal with a global address (GASG signal) which does not allocate a particular AU's 310 is transmitted.

When all the AU's 310 which have not been registered (the TEI portion of the ASG signal has not been allocated) receives the GASG signal, they send back their RSP signal where a predetermined ID is placed in the TEI portion.

On the other hand, when there is the RSP signal which has been sent back against the GASG signal, the BSMI 131 holds the TEI portion and treats the AU 310 at a registered one in the subsequent cycles.

In addition, in the subsequent cycles, the BSMI 131 transmits the GASG signal so as to connect a new AU 310 which has not been registered.

FIG. 43 (b) is a schematic showing the case where a time allowance is provided by delaying the timing of sending back the RSP signal against the ASG signal for one sub frame. In this construction, the present invention can be applied without any problems.

In the above mentioned embodiment, the case where one AU 310 is additionally added to the extension line interface with a particular number of AU's 310 was described. However, when a plurality of AU's 310 which have not been registered are added at the same time, since plurality of RSP signals are sent back against the GASG signal, the RSP signals collide each other.

Then, with reference to FIG. 43 (c), a process where a plurality of RSP signals which have not been registered are sent back at the same time will be described.

In this case, fourth and fifth AU's 310 are additionally connected to the extension line interface with three AU's 310.

These AU's 310 which have not been registered send back their RSP signal against the GASG signal from the BSMI 131 at the same time. Thus, the RSP signals collide each other and thereby a bit error takes place.

When a bit error is detected by the CRC portion of the RSP signal, since the BSMI 131 does not register a new TEI, it does not transmit the ASG signal to the new AU 310 in the subsequent cycle.

On the other hand, although the additionally connected AU 310 sends back the RSP signal against the GASG signal, since the ASG signal is not transmitted thereto in the subsequent cycle, it knows that a plurality of AU's 310 which have not been registered are present in the extension line interface.

In this case, when the AU's 310 are additionally connected, they enter an access wait state for a time period obtained at random. In this example, the AU's 310 waits for one cycle and eight cycles obtained by their random number generators. The AU's 310 send back the RSP signal against the GASG signal which was received after the wait cycles were completed. Thus, the AU's 310 are registered. By providing a proper performance to each random number generator, the additionally connected AU's 310 randomly access the BSMI 131. Consequently, it is expected that the AU's 310 can be sequentially registered.

Thus, a frame period in accordance with the number of AU's 310 connected can be achieved without a loss and thereby a high speed access control can be accomplished.

The waiting cycles may be set when the ASG signal is not transmitted to the own address rather when an AU 310 is not additionally connected.

Then, with reference with the accompanying drawings, a construction of a access control portion of the BSMI (broad band extension line interface) 131 and the AU (Access Unit) 310 will be described.

Figure 44:
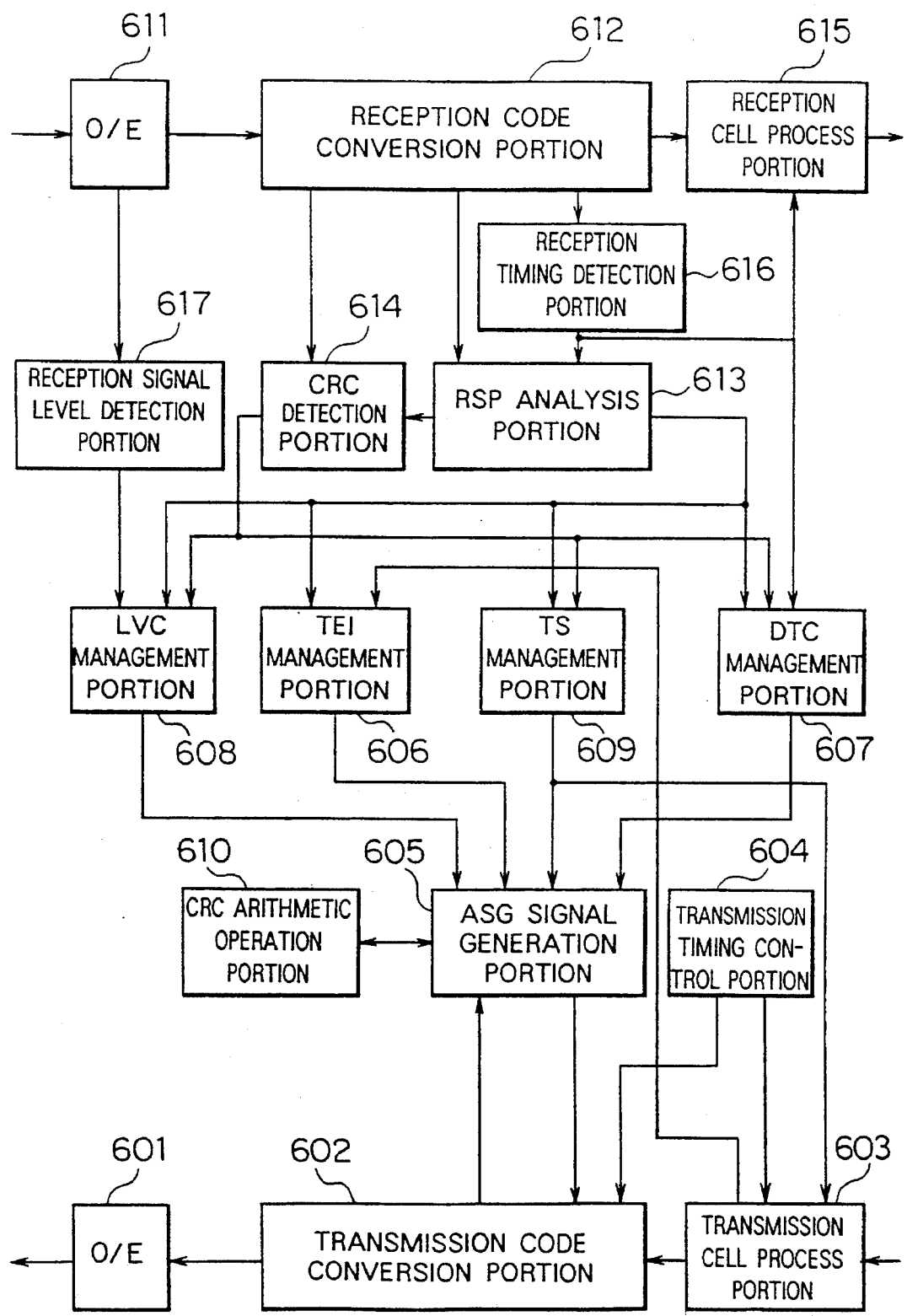
FIG. 44 is a block diagram showing a construction of an access control portion of BSMI.

FIG. 44 is a block diagram showing an access control portion of the BSMI 131.

As shown in the figure, the access control portion of the BSMI 131 is composed of an electric-to-optical signal conversion portion 601, a transmission code conversion portion 602, a transmission cell process portion 603, a transmission timing control portion 604, an ASG generation portion 605, a TEI management portion 606, a DTC management portion 607, an LVC management portion 608, a TS (time slot) management portion 609, a CRC arithmetic operation portion 610, an optical-to-electric signal conversion portion 611, a reception code conversion portion 612, an RSP signal analysis portion 613, a CRC detection portion 614, a reception cell process portion 615, a reception timing detection portion 616, and a reception signal level detection portion 617.

First, the operations of the transmission side will be described.

A transmission signal (down channel) is composed of an ASG signal and a transmission information signal. The ASG signal is generated in the ASG signal generation portion 605. The transmission information signal is generated in the transmission cell process portion 603.

The ASG signal generation portion 605 generates the TEI portion, DTC portion, the LVC portion, the TSI portion, the RTEI portion, and the CRC portion constructing the ASG signal shown in FIG. 35 in accordance with the information transmitted from the TEI management portion 606, the DTC management portion 607, the LVC management portion 608, the TS management portion 609, and the CRC arithmetic operation portion 610. In addition, the ASG signal generation portion 605 generates repetitive signals for example 1's and 0's in binary as the SYN portion.

The TEI management portion 606 generates an identifying code of the AU 310 to be written to the TEI portion. Normally, the TEI management portion 606 counts up from "1" in the incremental order and resets to "1" at the maximum value. The TEI management portion 606 has a TEI management table and searches information to be written to the RTEI portion therefrom. As shown in FIG. 43, when the frame period varies in accordance with the number of AU's 310 to be connected, for example a signal with all 1's in binary representing the global address is written to the TEI management table.

The TEI management portion 606 manages the mapping of the VCI and the TEI, interprets the content of the VCI in the ATM cell header, and determines a corresponding TEI.

The DTC management portion 607 generates information for controlling the data transmission timing of the AU 310 by using the reception timing of the RSP signal detected by the reception timing detection portion 616.

The LVC management portion 608 generates information for controlling the levels of signals transmitted by the AU 310 in accordance with the level of the RSP signal detected by the reception signal level detection portion 617.

The TS management portion 609 manages time slots used by the AU 310. The TS management portion 609 allocates time slots available for the AU 310 against an information transmission request therefrom.

The CRC arithmetic operation portion 610 generates an error detection code by using the ASG signal generated by the ASG generation portion 605. Since this method is widely known in the field of telecommunication, the description is omitted. The range of the CRC arithmetic operation is data except for the SYN portion. As a generated polynomial, $X(15)+X(12)+X(5)+1$ may be used.

The transmission cell process portion 603 adds a 6-bit guard for establishing the synchronization of time slots to information (ATM cell) transmitted from a control portion (not shown in the figure).

The transmission timing control portion 604 accurately keeps the period of the down channel sub frames and informs the ASG signal generation portion 605 of the transmission timing of the ASG signal. In addition, the transmission timing control portion 604 informs the transmission cell process portion 603 of the timing for which information is placed in the time slots. The TS management portion 609 and the transmission cell process portion 603 control which information is placed to which time slot.

The transmission code conversion portion 602 converts digital signals generated in the ASG signal generation portion 605 and the transmission cell process portion 603 into CMI (Coded Mark Inversion) codes, which are known transmission codes.

The electric-to-optical signal conversion portion 601 converts transmission signals into optical signals by a light emitting device such as a laser diode and transmits them to each AU 310 through optical fiber transmission lines.

Then, the construction of the reception side will be described.

The optical signals received by the BSMI 131 through the optical fiber transmission lines are converted into electric signals by the optical-to-electric signal converting portion 611 and then converted into the real data from the CMI codes by the reception code conversion portion 612.

The RSP signal and the transmission information of the received and converted signals are transmitted to the RSP signal analysis portion 613 and the reception cell process portion 615, respectively.

The RSP signal analysis portion 613 extracts the RSP signal from the received signals and analyzes its content. The resultant TEI information is transmitted to the TEI management portion 606. The DTC information is transmitted to the DTC management portion 607 along with the TEI information. The LVC data is transmitted to the LVC management portion 608 along with the TEI information. The TSR information is transmitted to the TS management portion 609. The CRC data is transmitted to the CRC detection portion 614. Since the RES portion is used for future extension, it is simply skipped.

The DTC management portion 607 and the LVC management portion 608 check whether or not various data contained in the ASG signal transmitted from the transmission side has been correctly transmitted to the AU 310 in accordance with the information transmitted from the RSP signal analysis portion 613.

The TS management portion 609 checks whether or not the AU 310 has issued an information transmission request and its content in accordance with the TSR information transmitted from the RSP signal analysis portion 613.

The CRC detection portion 614 determines whether or not the RSP signal has been correctly received in accordance with the CRC data transmitted from the RSP signal analysis portion 613. Since the method for analyzing this signal reception is the same as that of the CRC arithmetic operation portion 610 and is widely known, its description is omitted.

As the result of the analysis, when a bit error is detected, the result is informed to the TS management portion 609, the DTC management portion 607, and the LVC management portion 608. Thus, the data of the RSP signal is invalidated.

Like the ASG signal, the CRC arithmetic operation ranges from the SYN signal.

The reception timing detection portion 616 measures the reception timing of the RSP signal and transmits the resultant information to the DTC management portion 607. The DTC management portion 607 determines whether or not the value of the DTC data transmitted to the AU 310 is correct.

As the result of the determination, when the value of the DTC data is incorrect, it is corrected and transmitted to the AU 310 with the ASG signal.

The reception signal level detection portion 617 detects the level of the signal being received and transmits the result to the LVC management portion 608. The LVC management portion 608 determines whether or not the value of the LVC data is correct in accordance with the result. When the vale of the LVC data is incorrect, the value of the LVC data is corrected and then transmitted to the AU 310 with the ASG signal.

Now that the access control portion of the BSMI 131 has been described.

Then, the construction of the access control portion of the AU 310 opposed to the BSMI 131 will be described.

Figure 45:
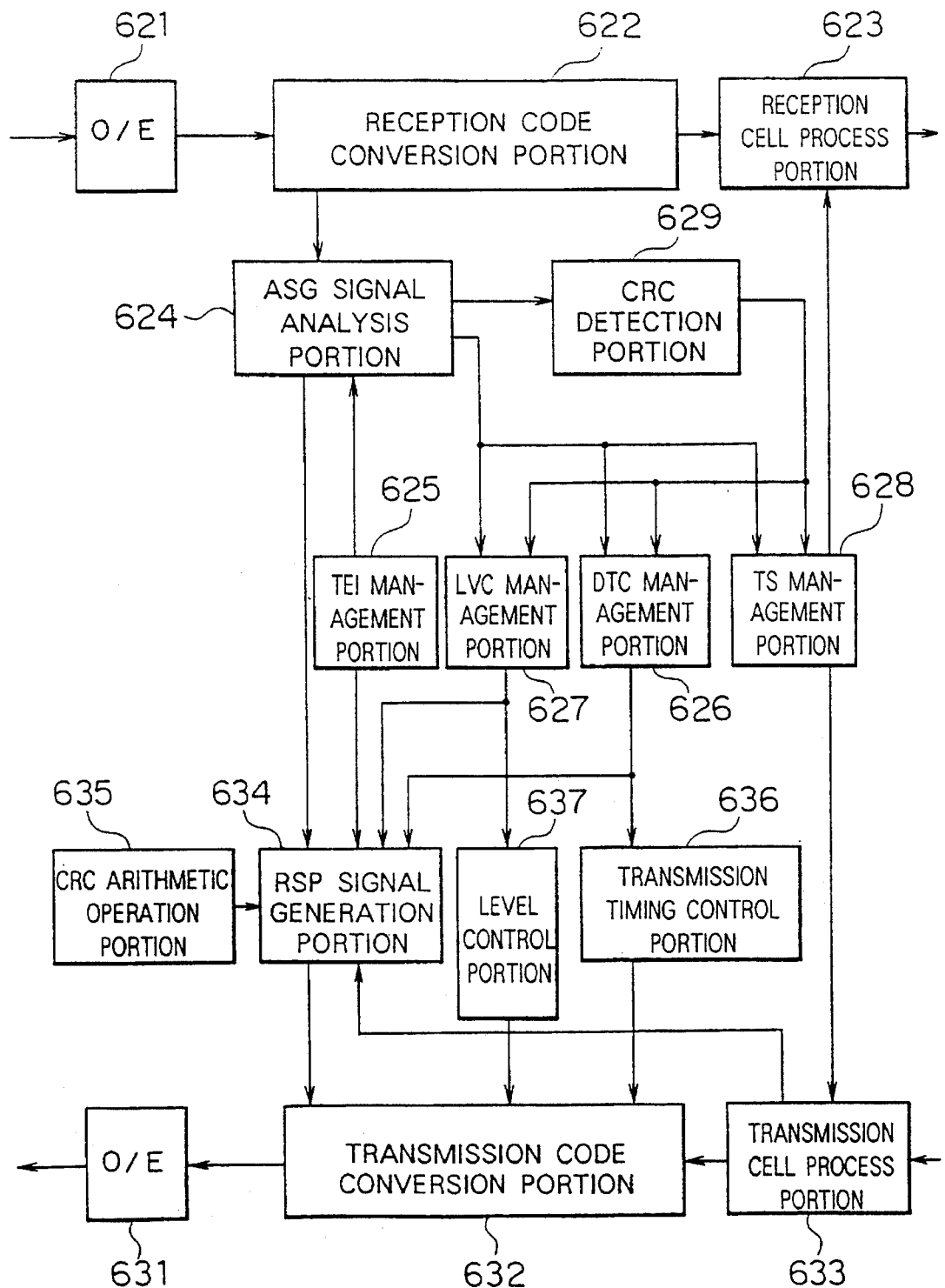
FIG. 45 is a block diagram showing a construction of the access control portion of AU.
Figure 46:
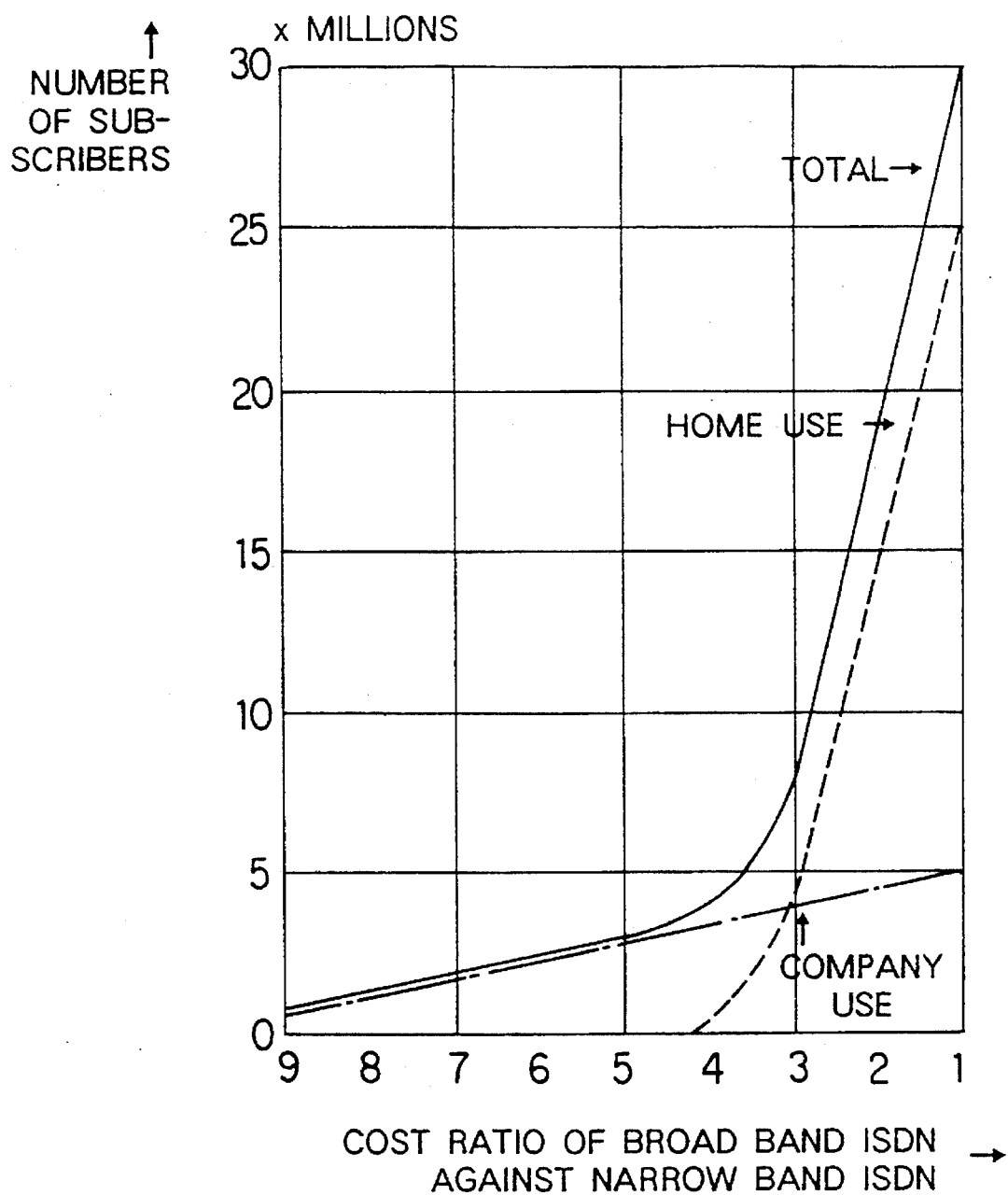
FIG. 46 is a diagram showing a long term demand estimation of broad band ISDN in West Germany.
Figure 47:
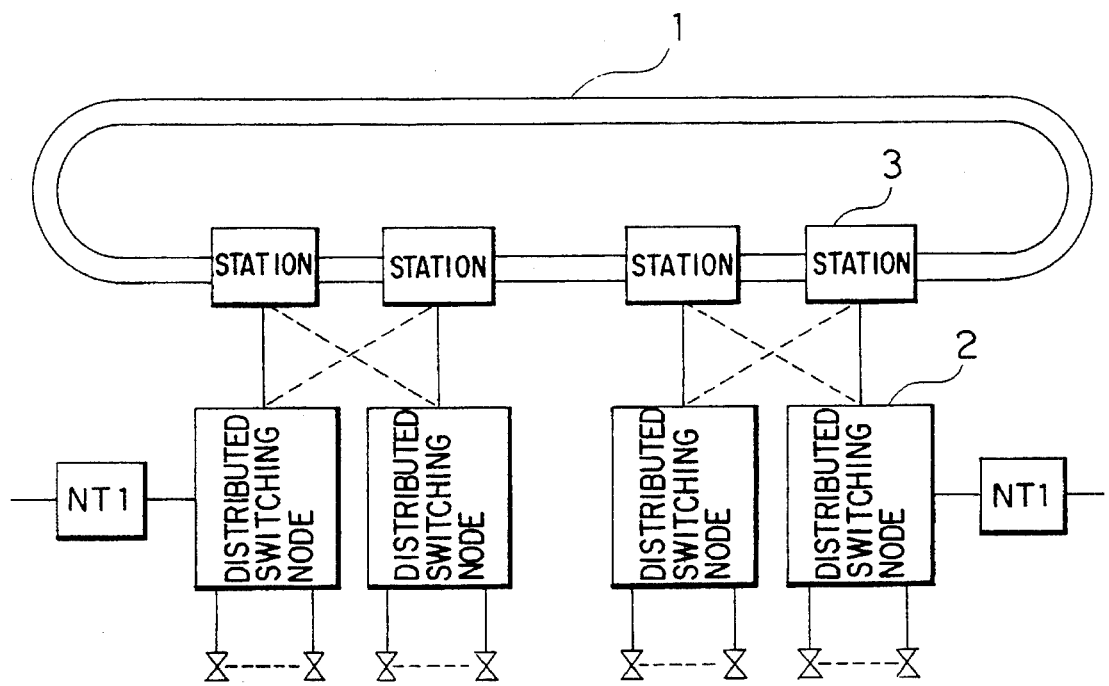
FIG. 47 is a schematic showing a conventional hierarchical network.
Figure 48:
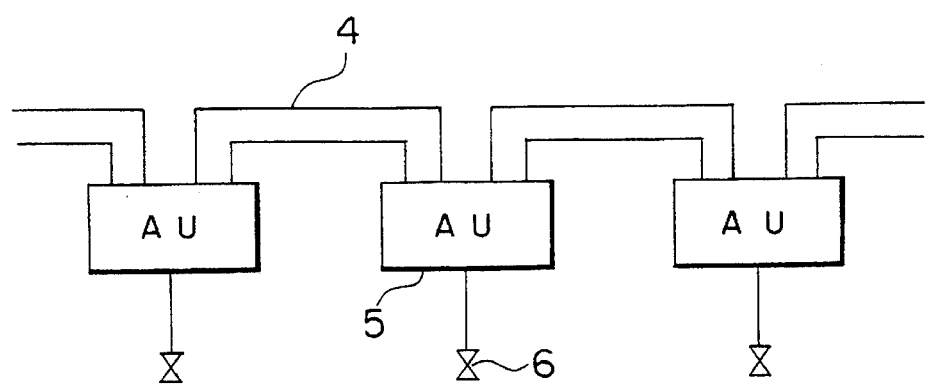
FIGS. 48 and 49 are schematics showing a network in a conventional LAN method.
Figure 49:
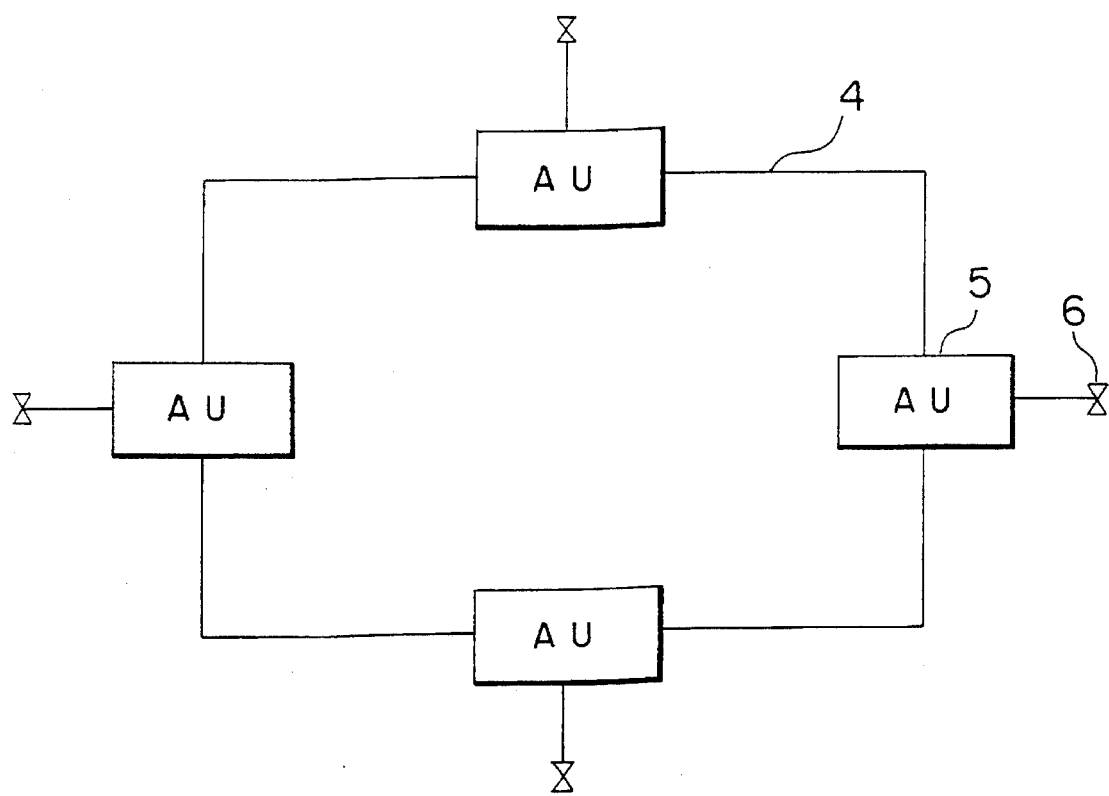

FIG. 45 is a block diagram showing the access control portion of the AU 310.

As shown in the figure, the access control portion of the AU 310 is composed of an optical-to-electric signal conversion portion 621, a reception code conversion portion 622, a reception cell process portion 623, an ASG signal analysis portion 624, a TEI management portion 625, a DTC management portion 626, an LVC management portion 627, a TS (Time Slot) management portion 628, a CRC detection portion 629, an electric-to-optical signal conversion portion 631, a transmission code conversion portion 632, a transmission cell process portion 633, an RSP signal generation portion 634, a CRC arithmetic operation portion 635, a transmission timing control portion 636, and a level control portion 637.

First, the reception operations will be described.

The signals transmitted from the optical fiber transmission line are converted into electric signals by the optical-to-electric signal conversion portion 621. The reception signal conversion portion 622 converts the CMI codes, which are transmission codes, into real data. The ASG signal of the received and converted signals is transmitted to the ASG signal analysis portion 624. The information placed in the time slot portion is transmitted to the reception cell process portion 623.

The ASG signal analysis portion 624 determines whether or not the ASG signal which is input from the reception code conversion portion 622 is addressed thereto in accordance with the information transmitted from the TEI management portion 625 and analyzes the content of the ASG signal addressed thereto.

The DTC information is transmitted to the DTC management portion 626. The LVC information is transmitted to the LVC management portion 627. The TSI information is transmitted to the TS management portion 628. The RTEI signal is transmitted to the RSP signal generation portion 634. The CRC information is transmitted to the CRC detection portion 629. Since the RES portion is reserved for future extension, it is simply skipped.

The CRC detection portion 629 has a function similar to that of the BSMI 131. When a bit error is detected, the CRC detection portion 629 commands the TS management portion 628, the DTC management portion 626, the LVC management portion 627, and the RSP signal generation portion to invalidate the received data.

Then, the transmission operations will be described.

The RSP signal of the transmission signals is generated by the RSP signal generation portion 634. The transmission information signal is generated by the transmission cell process portion 633. The transmission signals are converted into transmission codes such as CMI codes by the transmission code conversion portion 632. The transmission codes are converted into optical signals by the electric-to-optical signal conversion portion 631 and then transmitted to the transmission line.

The RSP signal generation portion 634 adds the SYN signal and so forth to generate the RSP signal in accordance with the information from the TEI management portion 625, the DTC management portion 626, the LVC management portion 627, the TS management portion 628, and the CRC arithmetic operation portion 635 by the RTEI signal transmitted from the ASG signal analysis portion 624. When there is transmission information commanded by the transmission cell process portion 633, various conditions of the information transmission request are set to the TSR signal. On the other hand, since the LVD portion is a signal for detecting the level of the reception signal on the BSMI 131 side, all 1's are set thereto. In addition, since the RES portion is used for future extension, all 1's are set thereto.

The TEI management portion 625 transmits an ID code of a particular AU 310 or that of a particular terminal equipment 300 which is set for example with a dip switch to the RSP signal generation portion 634 and the ASG signal analysis portion 624. This ID code should be uniquely set so that it does not overlap with other ID codes set for other AU's 310.

The DTC management portion 626 and the LVC management portion 627 directly transmit the DTC information and the LVC information which are obtained from the ASG signal to the RSP signal generation portion 634.

Since the function of the CRC arithmetic operation portion 635 of the AU 310 is the same as that of the BSMI 131, its description is omitted.

The transmission timing control portion 636 and the level control portion 637 control the transmission timing and the signal transmission level of the RSP signal being generated in the above mentioned manner.

In the above mentioned construction, the transmission control between the BSMI and each AU can be executed without contradiction.

It is readily apparent to those skilled in the art that the present invention may be used as an extension line interface of public networks besides as a PBX extension line system of company communication network systems.

Moreover, in the above description, as frame periods, 2 ms, 4 ms, and 6 ms were exemplified. Nevertheless, it is also apparent that the present invention is not limited to such frame periods.

Furthermore, in the present invention, the size of the control window area is not limited to those according to the above mentioned embodiments. The size of the control window area may be set in accordance with the maximum distance of the extension line.

Moreover, in the above mentioned embodiments, the transmission rate of 155.52 Mbps was exemplified. Nevertheless, the present invention is not limited to such a value, but may be for example 622.08 Mbps.

In the above description, optical signals were used. Nevertheless, the present invention may be applicable to electric signals through coaxial cables which are standardized by CCITT Recommendation.

As was described above, according to the present invention, since a transmission route is set in accordance with the number of relaying broad band switching nodes present between two terminating broad band switching nodes, the through-put characteristic, and the affecting degree due to occurrence of a detect, the traffic of the entire network is distributed.

In addition, according to the present invention, when the system is started up, transmission routes with the minimum band width necessary for routing control have been set among all broad band switching nodes. Whenever a call takes place, a transmission route and its band width are variably set by means of an intelligent inference mechanism. Furthermore, with an intelligent distribution control where such an intelligent inference mechanism is distributed to each broad band switching node, it is possible to reduce the load of call process and to improve the reliability and the operating efficiency of the network.

Moreover, in the extension line interface, a frame for transmitting information is composed of a control window area and a cell multiplexing area. Thus, a bidirectional transmission among a broad band switching node and a plurality of terminal equipments can be effectively made by using a pair of extension transmission lines.

Furthermore, according to the present invention, since the construction of a frame conforms with the ATM method, different information transmission rates such as H4, H3, H2, H1, H0, and B channels in ISDN can be flexibly selected. Thus, the excellent through-put characteristic and the statistic multiplexing effect brought by the ATM method can be used in the extension line interface.

What is claimed is:

1. A broad band switching network comprising a plurality of broad band switching nodes, and broad band inter-switching-node transmission lines for connecting said broad band switching nodes, the broad band network transmitting information by transmitting a cell, which consists of a header and information field:

each said broad band switching node comprising:

a broad band input/output port for inputting said cell from said broad band inter-switching-node transmission lines and outputting said cell to said broad band inter-switching-node transmission lines;

switching means for demultiplexing said cell inputted through said broad band input/output port and transmitting said cell for multiplexed output to said broad band input/output port; and means for structuring said broad band inter-switching-node transmission lines between said broad band switching nodes in accordance with a condition for substantially equalizing the number of virtual paths of each of said transmission lines and minimizing the summation of the number of virtual paths of all said transmission lines.

2. The broad band switching network as set forth in claim 1, wherein said plurality of broad band switching nodes includes a predetermined number of relaying broad band switching nodes and wherein said condition is determined in accordance with an equally distributed degree of the traffic on said broad band inter-switching-node transmission line, the predetermined number of relaying broad band switching nodes of said plurality of broad band switching nodes present between two terminating broad band switching nodes, a ratio of offered traffic to actual traffic, and an affecting degree due to occurrence of a defect.

3. The broad band switching network as set forth in claim 1, wherein said broad band inter-switching-node transmission line connects said plurality of broad band switching nodes disposed in a peripheral portion and a center portion in a wheel shape in a non-hierarchical state.

4. The broad band switching network as set forth in claim 1, wherein said broad band inter-switching-node transmission line connects said plurality of broad band switching nodes disposed in a peripheral portion and a center portion are connected in a diamond cut shape in a non-hierarchical state.

5. The broad band switching network as set forth in claim 1, wherein a band width of said broad band inter-switching-node transmission line is varied in accordance with a traffic condition of the network.

6. The broad band switching network as set forth in claim 1, wherein said switching means comprises a combination of both a cell switch which is operated in a broad band asynchronous transfer mode and a broad band line switch.

7. The broad band switching network as set forth in claim 1, wherein said two broad band switching nodes, where the transmission route for transmitting said cell is terminated, share an incoming call process and an originating call process.

8. The broad band switching network as set forth in claim 1, wherein a routing path for setting the transmission route for transmitting said cell is always provided among said plurality of broad band nodes.

9. The broad band switching network as set forth in claim 1, wherein said plurality of broad band switching nodes are categorized as a plurality of groups, said broad band switching nodes in each group being connected in a single stroke shape with a multiple wire-core cable housing optical fibers, particular optical fibers of said multiple wire-core cables being led in each of said broad band nodes, said optical fibers being connected to said input/output ports of each of said broad band nodes.

10. A broad band switching network comprising a plurality of broad band switching nodes and broad band inter-switching-node transmission lines for connecting said broad band switching nodes, the broad band network transmitting information by transmitting a cell which consists of a header and information field, and setting transmission routes upon occurrence of a cell and variable band width of the transmission routes with an intelligent inference mechanism;

each said broad band switching node comprising:

a broad band input/output post for inputting said cell from said broad band inter-switching-node transmission lines and outputting said cell to said broad band inter-switching-node transmission lines; and switching means for demultiplexing said cell inputted through said broad band input/output port and transmitting said cell for multiplexed output to said broad band input/output port;

wherein when the broad band switching network is started up, the broad band switching network sets transmission routes with a particular band width among the broad band switching nodes; and when a call takes place, the broad band switching network executes routing control to set transmission routes and variably set the band width of the transmission routes in inference mechanism by using the transmission routes at the start-up;

said intelligent inference mechanism comprising:

a data base which registers data for setting transmission routes upon occurrence of a call and for variably setting the band width of the transmission routes;

first means for processing the transmission route setting in accordance with the data registered in said data base by using a procedure base;

second means for inferring the transmission route and the band width setting in accordance with data registered in said data base by using a knowledge base;

third means for inferring the transmission route and the band width setting in accordance with the data registered in said data base by using a case base;

fourth means for inferring the transmission route and the band width setting by using a search base; and fifth means for learning about the transmission route and the band width setting in accordance with the inference results and process results of said second to fourth means and for accordingly updating the data of said data base.

11. The broad band switching network as set forth in claim 10, wherein said data base registers a single or a plurality of transmission routes between particular broad band switching nodes which terminate a call, said first means selecting one of said transmission routes in accordance with a particular procedure.

12. The broad band switching network as set forth in claim 10, wherein said data base registers at least one of a knowledge with respect to periodical change of the traffic on said broad band switching network, a knowledge with respect to a detection or an estimation of a defect and countermeasures against occurrence of the defect, and a knowledge with respect to traffic equalization of the entire network, deletion of the number of relaying nodes, and through-put characteristic and wherein said second means infers the transmission route and the bond width setting with the knowledge registered in said data base.

13. The broad band switching network as set forth in claim 10, wherein said data base registers past unsuccessful cases of the transmission route and the band width setting selected or inferred by said first means, said second means, or said fourth means and wherein said third means infers the transmission route and the band width setting registered in said data base.

14. The broad band switching network as set forth in claim 10, wherein said fourth means temporarily sets and searches a plurality of transmission routes upon occurrence of one call and then finally sets a transmission route in accordance with priority order.

15. The broad band switching network as set forth in claim 10, wherein said data base is updated in accordance with information with respect to traffic and defect informed from said plurality of broad band switching nodes when necessary.

16. A broad band switching network comprising a plurality of broad band switching nodes, and broad band inter-switching-node transmission lines for connecting said broad band switching nodes, the broad band switching network transmitting information by transmitting a cell which consists of a header and information field;

said broad band switching node comprising:

a broad band input/output port for inputting and outputting said cell to and from said broad band inter-switching-node transmission lines; and switching means for demultiplexing said cell inputted through said broad band input/output port and transmitting said cell for multiplexed output to said broad band input/output port;

wherein an extension transmission line branches off, a root of the branched-off extension transmission line is connected to said broad band switching node, tips of the branched-off extension line are connected to terminal equipments, information being transmitted bidirectionally between said broad band switching nodes and said terminal equipment with a frame having a cell multiplexing area which is divided into a plurality of time slots for multiplexed transmission of said cell and a window area to which a control signal for transmission control is sent.

17. The broad band switching network as set forth in claim 16, wherein part of said plurality of broad band input/output ports are connected to an extension line interface for connecting to a plurality of terminal equipments, an office line interface for connecting broad band office lines, and a dedicated line interface for connecting broad band dedicated lines.

18. The broad band switching network as set forth in claim 17, wherein said extension line interface accommodates a plurality of terminal equipments with multiple drop connections through an optical passive coupler.

19. The broad band switching network as set forth in claim 17, wherein said extension line interface accommodates a plurality of terminal equipments with multiple drop connections using an active line concentration function.

20. The broad band switching network as set forth in claim 17, wherein means for compressing and extending a band width of information of said broad band dedicated lines and means for suppressing a peak traffic on said broad band dedicated lines are provided between said broad band dedicated lines or said broad band office lines, and said broad band switching nodes.

21. The broad band switching network as set forth in claim 17, wherein said switching means comprises;

means for outputting a cell relayed by said broad band switching nodes to a desired broad band input/output port in accordance with a virtual path identifier in a label of said cell, and means for outputting a cell which is outputted to one of said extension line interface, said office line interface, and said dedicated line interface to a desired broad band input/output port in accordance with a logical channel identifier in the label of said cell at said broad band switching node.

22. The broad band switching network as set forth in claim 16, wherein said frame is composed of sub frames equivalent to the maximum number of terminal equipments connected to an extension transmission line.

23. The broad band switching network as set forth in claim 22, wherein said control window area and said cell multiplexing area are provided for each sub frame.

24. The broad band switching network as set forth in claim 16, wherein a delay control area for compensating a transmission delay time necessary for transmission between said terminal equipments and said broad band switching node is provided in said control window area.

25. The broad band switching network as set forth in claim 24, wherein said transmission delay control measures a transmission delay time of the transmission line by using both a transmission timing of a particular control signal which is transmitted by said broad band switching node and a reception timing of a reply signal which is sent back from at least one of the receiving terminal equipments, accordingly obtains a cell transmission timing where a cell transmitted from said terminal equipment is received by said broad band switching node, and informs the cell transmission timing to said terminal equipment.

26. The broad band switching network as set forth in claim 24, wherein said broad band switching node measures the receiving signal level of a particular signal which is transmitted from at least one of said terminal equipments by using said control window, obtains the transmitting signal level of said at least one terminal equipment so that the receiving signal level is in a particular range, and informs said terminal equipment of the transmitting signal level.

27. The broad band switching network as set forth in claim 16, wherein a time slot control signal for informing said terminal equipments of an allocation of time slots available for information transmission is transmitted by using said control window area.

28. The broad band switching network as set forth in claim 27, wherein the allocation of time slots available for said terminal equipments to transmit information is executed in said control window area in accordance with particular information contained in respective time slot allocation request signals transmitted from said terminal equipments.

29. The broad band switching network as set forth in claim 27, wherein time slots available for said terminal equipments to transmit information are allocated in accordance with the number of time slots which have been used by said terminal equipments in the past.

30. The broad band switching network as set forth in claim 28, wherein time slots available for said terminal equipments to transmit information are allocated in accordance with information amount stored in said terminal equipments or the number of time slots required by said terminal equipments.

31. The broad band switching network as set forth in claim 16, wherein each of said terminal equipments transmits a time slot allocation request signal available for transmitting information by using said control window area.

32. The broad band switching network as set forth in claim 16, wherein the allocation of time slots available for said terminal equipments to transmit information is executed for each time slot in said frame.

33. The broad band switching network as set forth in claim 16, wherein the allocation of time slots available for said terminal equipments to transmit information is executed in the same position of each sub frame.

34. The broad band switching network as set forth in claim 13, wherein said transmission control signal is successively transmitted frame by frame from said broad band switching node only to terminal equipments which are recognized as they are connected to said extension transmission line.

35. The broad band switching network as set forth in claim 34, wherein said broad band switching node transmits a control signal to all terminal equipments which are recognized as they are connected to said extension transmission line, transmits a global address control signal which does not allocate any one of said receiving terminal equipments, and recognizes terminal equipments by using a response signal which is sent back from unrecognized terminal equipments which receive the global address control signal to said broad band switching node.

36. The broad band switching network as set forth in claim 35, wherein said terminal equipments determine that they are not recognized when they transmit said response signal and do not receive said control signal until they receive the subsequent global address control signal addressed thereto.

37. The broad band switching network as set forth in claim 36, wherein said terminal equipments wait until a reply of said response signal against said global address control signal for the number of times obtained at random when they have made such a determination.

* * * * *

UNITED STATES PATENT AND TRADEMARK OFFICE
CERTIFICATE OF CORRECTION

PATENT NO. : 5,493,573
DATED : February 20, 1996
INVENTOR(S) : Hiroshi KOBAYASHI et al.

It is certified that error appears in the above-indentified patent and that said Letters Patent is hereby corrected as shown below:

Claim 34, column 40, line 60, "claim 13" should read --claim 16--.

Signed and Sealed this

Seventh Day of October, 1997

Attest:

BRUCE LEHMAN

*Attesting Officer*        Commissioner of Patents and Trademarks

UNITED STATES PATENT AND TRADEMARK OFFICE
CERTIFICATE OF CORRECTION

PATENT NO. : 5,493,573
DATED : February 20, 1996
INVENTOR(S) : Hiroshi Kobayashi, et. al.

It is certified that error appears in the above-identified patent and that said Letters Patent is hereby corrected as shown below:

Title Page, column 1, line 2 of inventors, "Yoshihiro Hidaka" should read --Yoshiharu Hidaka--.

Signed and Sealed this

Thirteenth Day of January, 1998

Attest:

BRUCE LEHMAN

*Attesting Officer*    *Commissioner of Patents and Trademarks*